US009176979B2

(12) United States Patent
Brock et al.

(10) Patent No.: US 9,176,979 B2
(45) Date of Patent: Nov. 3, 2015

(54) SYSTEM AND METHOD FOR ANALYZING DATA

(75) Inventors: Nigel James Brock, Chapel Hill (AU); Geoffrey John George Wilby, Houston, TX (US)

(73) Assignee: X Systems, LLC, Abu Dhabi (AE)

( * ) Notice: Subject to any disclaimer, the term of this patent is extended or adjusted under 35 U.S.C. 154(b) by 29 days.

(21) Appl. No.: 12/853,592

(22) Filed: Aug. 10, 2010

(65) Prior Publication Data

US 2012/0041924 A1 Feb. 16, 2012

(51) Int. Cl.
*G06F 17/30* (2006.01)

(52) U.S. Cl.
CPC ...... *G06F 17/30212* (2013.01); *G06F 17/3007* (2013.01)

(58) Field of Classification Search
CPC ....................... G06F 17/3007; G06F 17/30212
USPC .................. 707/610, 640, 661, 674; 709/203; 703/2; 705/7
See application file for complete search history.

(56) References Cited

U.S. PATENT DOCUMENTS

| | | | | |
|---|---|---|---|---|
| 6,101,447 | A | 8/2000 | Poe, Jr. | |
| 6,205,575 | B1 | 3/2001 | Sherman et al. | |
| 6,820,067 | B1 | 11/2004 | Hammond et al. | |
| 6,826,483 | B1 | 11/2004 | Anderson et al. | |
| 6,904,424 | B1 | 6/2005 | Gusler et al. | |
| 6,980,940 | B1 | 12/2005 | Gurpinar et al. | |
| 7,085,803 | B1 | 8/2006 | Shisler et al. | |
| 7,181,684 | B2 | 2/2007 | Chittu et al. | |
| 7,206,732 | B2 | 4/2007 | Williams et al. | |
| 7,289,942 | B2 | 10/2007 | Yang et al. | |
| 7,480,608 | B2 | 1/2009 | Gabele et al. | |
| 7,502,771 | B2 | 3/2009 | Bouzas et al. | |
| 7,561,997 | B1 | 7/2009 | Miller | |
| 7,584,165 | B2 | 9/2009 | Buchan | |
| 7,590,516 | B2 | 9/2009 | Jourdan et al. | |
| 7,660,711 | B2 | 2/2010 | Pita et al. | |
| 7,720,662 | B1 | 5/2010 | Aldrich | |
| 7,849,440 | B1 | 12/2010 | Englehart | |
| 2003/0097400 | A1* | 5/2003 | Li et al. | 709/203 |
| 2003/0130831 | A1 | 7/2003 | Adir | |
| 2003/0191869 | A1 | 10/2003 | Williams et al. | |
| 2004/0220790 | A1 | 11/2004 | Cullick et al. | |
| 2005/0039123 | A1 | 2/2005 | Kuchinsky et al. | |
| 2005/0273298 | A1* | 12/2005 | Shah | 703/2 |

(Continued)

OTHER PUBLICATIONS

Nomura, et al., "Parallel history matching and associated forecast at the center for interactive smart oilfield technologies", J Supercomput (2007) 41: 109-117.

(Continued)

*Primary Examiner* — Syling Yen
(74) *Attorney, Agent, or Firm* — Brian J. Colandreo; Michael T. Abramson; Holland & Knight LLP

(57) ABSTRACT

A computer-implemented method, computer program product, and computing system for defining at least a portion within a simulation modeling file for copying from an original location, thus defining an identified portion. A destination location is defined for the identified portion. A multi-threaded copying procedure is effectuated to copy the identified portion from the original location to the destination location, thus generating a copied portion of the simulation modeling file. The multi-threaded copying procedure utilizes at least two processing threads.

18 Claims, 56 Drawing Sheets

(56) References Cited

U.S. PATENT DOCUMENTS

| | | | | |
|---|---|---|---|---|
| 2006/0085174 | A1 | 4/2006 | Hemanthkumar et al. | |
| 2006/0224369 | A1 | 10/2006 | Yang et al. | |
| 2006/0265469 | A1 | 11/2006 | Estrade | |
| 2007/0192072 | A1 | 8/2007 | Cullick et al. | |
| 2007/0214381 | A1 | 9/2007 | Goyal et al. | |
| 2007/0294651 | A1 | 12/2007 | Tsai et al. | |
| 2008/0120148 | A1* | 5/2008 | Narayanan et al. | 705/7 |
| 2008/0127132 | A1 | 5/2008 | Wu et al. | |
| 2008/0288304 | A1 | 11/2008 | Nores et al. | |
| 2009/0043555 | A1 | 2/2009 | Busby et al. | |
| 2009/0099778 | A1 | 4/2009 | Kavanagh et al. | |
| 2009/0216695 | A1 | 8/2009 | Baum | |
| 2009/0222246 | A1 | 9/2009 | Do et al. | |
| 2009/0241117 | A1 | 9/2009 | Dasgupta et al. | |
| 2009/0271233 | A1 | 10/2009 | Prange et al. | |
| 2009/0276100 | A1 | 11/2009 | Malki et al. | |
| 2009/0276156 | A1 | 11/2009 | Kragas et al. | |
| 2010/0042953 | A1 | 2/2010 | Stewart et al. | |
| 2011/0119327 | A1* | 5/2011 | Masuda | 709/203 |
| 2011/0179398 | A1 | 7/2011 | Peterson | |
| 2011/0185332 | A1 | 7/2011 | Gauthier et al. | |
| 2011/0208539 | A1 | 8/2011 | Lynn | |
| 2012/0041732 | A1 | 2/2012 | Brock et al. | |
| 2012/0041733 | A1 | 2/2012 | Brock et al. | |
| 2012/0041736 | A1 | 2/2012 | Brock et al. | |
| 2012/0041987 | A1 | 2/2012 | Brock et al. | |
| 2012/0042209 | A1 | 2/2012 | Brock et al. | |

OTHER PUBLICATIONS

Yang, et al., "Reservoir Model Uncertainty Quantification Through Computer-Assisted History Matching", Society of Petroleum Engineers (SPE 109825) (2007) pp. 1-12.

Landmark Releases Drill-to-the-Earth Model System; Breakthrough Technology and Deeper Integration Enable Drilling Operations to Be Viewed Within the Earth Model, BusinessWire article, (2003) pp. 1-2.

5000.0.0 Release Notes (Landmark product information), (Dec. 2007) pp. 1-84.

SIMULINK "Using Simulink" Version 5. 2002, 476 pgs.

* cited by examiner

SYSTEM AND METHOD FOR ANALYZING DATA

TECHNICAL FIELD

This disclosure relates to data processing systems and, more particularly, to data processing systems that that analyze data to make predictions concerning the probability of certain events.

BACKGROUND

Numerous industries use computers to model various situations and make predictions concerning the probable occurrence of certain events. Examples of such industries may include the petroleum industry, the nuclear industry, the weather/geographical prediction industry, and the financial industry.

For example, the petroleum industry relies heavily on using powerful computers and highly specialized software programs to determine underground oil and gas reserves and forecast the likely production from oil field simulations. These simulations using computers allows oil companies to better evaluate the risk of committing to activities that often cost many billions of dollars. The software programs used to carry out this work are often highly specialized/complex, and there are huge amounts of input and output data to be handled and assessed. Unfortunately, this results in the engineers needing to focus on data management and software issues, rather than focusing on the petroleum engineering aspects of the project.

SUMMARY OF DISCLOSURE

In a first implementation, a computer-implemented method includes defining at least a portion within an oil field modeling file for copying from an original location, thus defining an identified portion. A destination location is defined for the identified portion. A multi-threaded copying procedure is effectuated to copy the identified portion from the original location to the destination location, thus generating a copied portion of the oil field modeling file. The multi-threaded copying procedure utilizes at least two processing threads.

One or more of the following features may be included. A number of processing threads to be utilized during the multi-threaded copying procedure may be defined. The identified portion may be a scenario of the oil field modeling file. The copied portion may be a child of the scenario of the oil field modeling file. The identified portion may be an execution of the oil field modeling file. The copied portion may be a child of the execution of the oil field modeling file. A file name may be defined for the copied portion.

In another implementation, a computer program product resides on a computer readable medium and has a plurality of instructions stored on it. When executed by a processor, the instructions cause the processor to perform operations including defining at least a portion within an oil field modeling file for copying from an original location, thus defining an identified portion. A destination location is defined for the identified portion. A multi-threaded copying procedure is effectuated to copy the identified portion from the original location to the destination location, thus generating a copied portion of the oil field modeling file. The multi-threaded copying procedure utilizes at least two processing threads.

One or more of the following features may be included. A number of processing threads to be utilized during the multi-threaded copying procedure may be defined. The identified portion may be a scenario of the oil field modeling file. The copied portion may be a child of the scenario of the oil field modeling file. The identified portion may be an execution of the oil field modeling file. The copied portion may be a child of the execution of the oil field modeling file. A file name may be defined for the copied portion.

In another implementation, a computing system includes at least one processor and at least one memory architecture coupled with the at least one processor. A first software module is executed on the at least one processor and the at least one memory architecture. The first software module is configured to perform operations including defining at least a portion within an oil field modeling file for copying from an original location, thus defining an identified portion. A second software module is executed on the at least one processor and the at least one memory architecture. The second software module is configured to perform operations including defining a destination location for the identified portion. A third software module is executed on the at least one processor and the at least one memory architecture. The third software module is configured to perform operations including effectuating a multi-threaded copying procedure to copy the identified portion from the original location to the destination location, thus generating a copied portion of the oil field modeling file. The multi-threaded copying procedure utilizes at least two processing threads.

One or more of the following features may be included. A number of processing threads to be utilized during the multi-threaded copying procedure may be defined. The identified portion may be a scenario of the oil field modeling file. The copied portion may be a child of the scenario of the oil field modeling file. The identified portion may be an execution of the oil field modeling file. The copied portion may be a child of the execution of the oil field modeling file. A file name may be defined for the copied portion.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
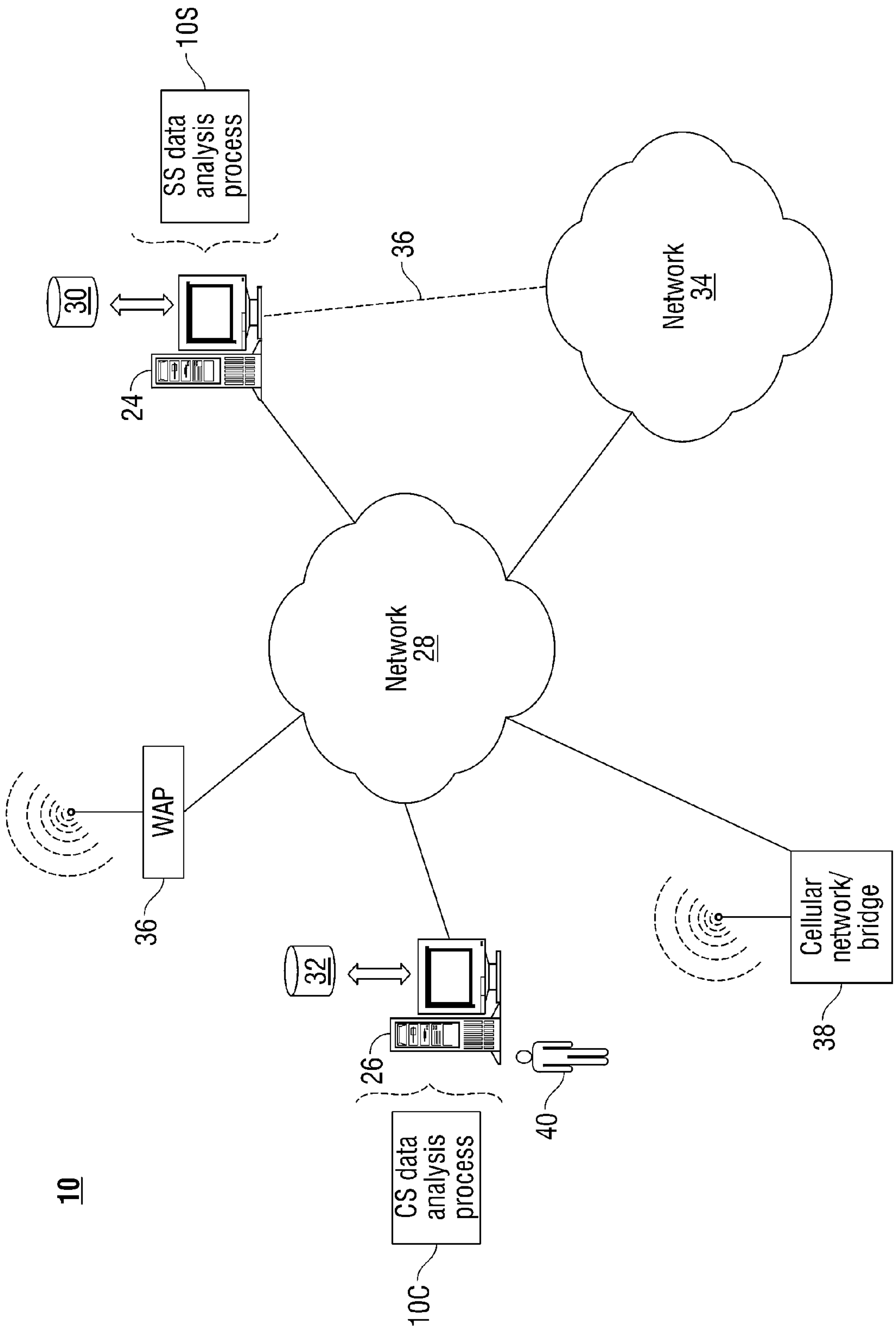
FIG. 1 is a diagrammatic view of a data analysis process executed in whole or in part by a computer coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
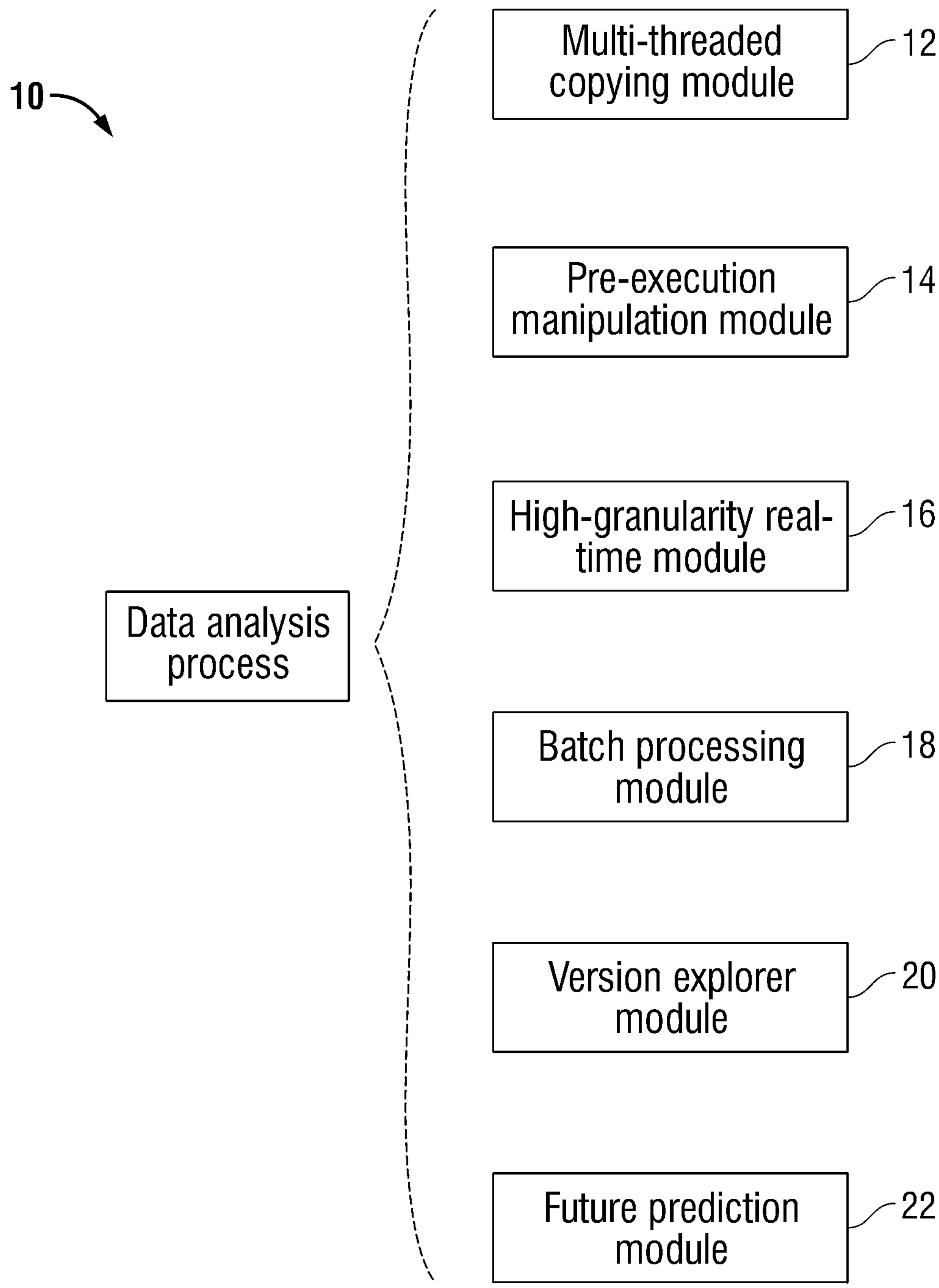
FIG. 2 is a diagrammatic view of the data analysis process of FIG. 1.

Referring to FIGS. 1 & 2, there is shown data analysis process 10. Data analysis process 10 may include a plurality of modules, examples of which may include but are not limited to: multi-threaded copying module 12; pre-execution manipulation module 14; high-granularity, real-time module 16; batch processing module 18; version explorer module 20; and future prediction module 22.

Data analysis process 10 may be a server-side application (e.g., SS data analysis process 10S executed on server computer 24); a client-side application (i.e., CS data analysis process 10C executed on client computer 26); or a hybrid server-side/client-side application (e.g., SS data analysis process 10S executed on server computer 24 in coordination/cooperation with CS data analysis process 10C executed on client computer 26).

If configured as a server-side application (e.g., SS data analysis process 10S) or a hybrid server-side/client-side application (e.g., SS data analysis process 10S in coordination/cooperation with CS data analysis process 10C), all or a portion of data analysis process 10 may reside on and may be executed by server computer 24, which may be connected to network 28 (e.g., the Internet or a local area network). Examples of server computer 24 may include, but are not limited to: a personal computer, a server computer, a series of server computers, a mini computer, a mainframe computer, and a computing cloud. Server computer 24 may execute a network operating system, examples of which may include but are not limited to: Microsoft Windows XP Server™; Novell Netware™; and Redhat Linux™.

If configured as a server-side application (e.g., SS data analysis process 10S) or a hybrid server-side/client-side application (e.g., SS data analysis process 10S in coordination/cooperation with CS data analysis process 10C), all or a portion of the instruction sets and subroutines of data analysis process 10, which may be stored on storage device 30 coupled to server computer 24, may be executed by one or more processors (not shown) and one or more memory architectures (not shown) incorporated into server computer 24. Storage device 30 may include but is not limited to: a hard disk drive; a tape drive; an optical drive; a RAID array; a random access memory (RAM); and a read-only memory (ROM).

If configured as a client-side application (e.g., CS data analysis process 10C) or a hybrid server-side/client-side application (e.g., SS data analysis process 10S in coordination/cooperation with CS data analysis process 10C), all or a portion of data analysis process 10 may reside on and may be executed by client computer 26, which may be connected to network 28 (e.g., the Internet or a local area network). Examples of client computer 26 may include, but are not limited to: a personal computer, a laptop computer, a notebook computer, a tablet computer, a PDA, and a data-enabled cell phone. Client computer 26 may execute an operating system, examples of which may include but are not limited to: Microsoft Windows™; and Redhat Linux™.

If configured as a client-side application (e.g., client-side data analysis process 10C) or a hybrid server-side/client-side application (e.g., server-side data analysis process 10S in coordination/cooperation with client-side data analysis process 10C), all or a portion of the instruction sets and subroutines of data analysis process 10, which may be stored on storage device 32 coupled to client computer 26, may be executed by one or more processors (not shown) and one or more memory architectures (not shown) incorporated into client computer 26. Storage device 32 may include but is not limited to: a hard disk drive; a tape drive; an optical drive; a RAID array; a random access memory (RAM); and a read-only memory (ROM).

For illustrative purposes only, data analysis process 10 will be generically discussed without reference to the computer that is executing data analysis process 10, with the understanding that data analysis process 10 may be a server-side application; a client-side application; or a hybrid server-side/client-side application.

Server computer 24 may execute a web server application, examples of which may include but are not limited to: Microsoft IIS™, Novell Webserver™, or Apache Webserver™, that allows for HTTP (i.e., HyperText Transfer Protocol) access to server computer 24 via network 28. Network 28 may be connected to one or more secondary networks (e.g., network 34), examples of which may include but are not limited to: a local area network; a wide area network; or an intranet, for example. Server computer 24 may be coupled to network 34 via one or more links (e.g., link 36 shown in phantom).

While client computer 26 is shown hardwired to network 28, this is for illustrative purposes only and is not intended to be a limitation of this disclosure, as other configurations are possible and are considered to be within the scope of this disclosure. For example, client computer 26 may be wirelessly coupled to network 28 and/or network 34 using a wireless access point (e.g., WAP 36) and/or a cellular network (e.g., cellular/network bridge 38).

WAP 36 may be, for example, an IEEE 802.11a, 802.11b, 802.11g, Wi-Fi, and/or Bluetooth device that is capable of establishing a secure communication channel (not shown) between client computer 26 and WAP 36.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Cellular/network bridge 38 may be a GSM (i.e., Global System for Mobile Communications) device and/or a CDMA (i.e., Code Division Multiple Access) that is capable of establishing a secure communication channel (not shown) between client computer 26 and cellular/network bridge 38.

While data analysis process 10 is applicable to various types of industries (e.g., the petroleum industry, the nuclear industry, and the weather/geographical prediction industry; the financial industry; all of which are considered to be within the scope of this disclosure), for illustrative purposes only, the following discussion will be directed to the petroleum industry. However, while oil field modeling files are discussed below, it is understood that any simulation modeling file (e.g., for use within the nulcear industry, the petroleum industry, the weather industry, the geological industry) is equally applicable and is considered to be within the scope of this disclosure.

Data analysis process 10 may allow a user (e.g., user 40) of client computer 26 to define a new project for use within e.g., the petroleum industry. An example of such a project may be a project in which a particular oil field (or a group of oil fields) is mathematically modeled (via one or more scenarios) to e.g., make predictions concerning the future production of the oil field, the various flows of crude oil within the oil field, the life span of the oil field, and the general health of the oil field.

Figure 2A:
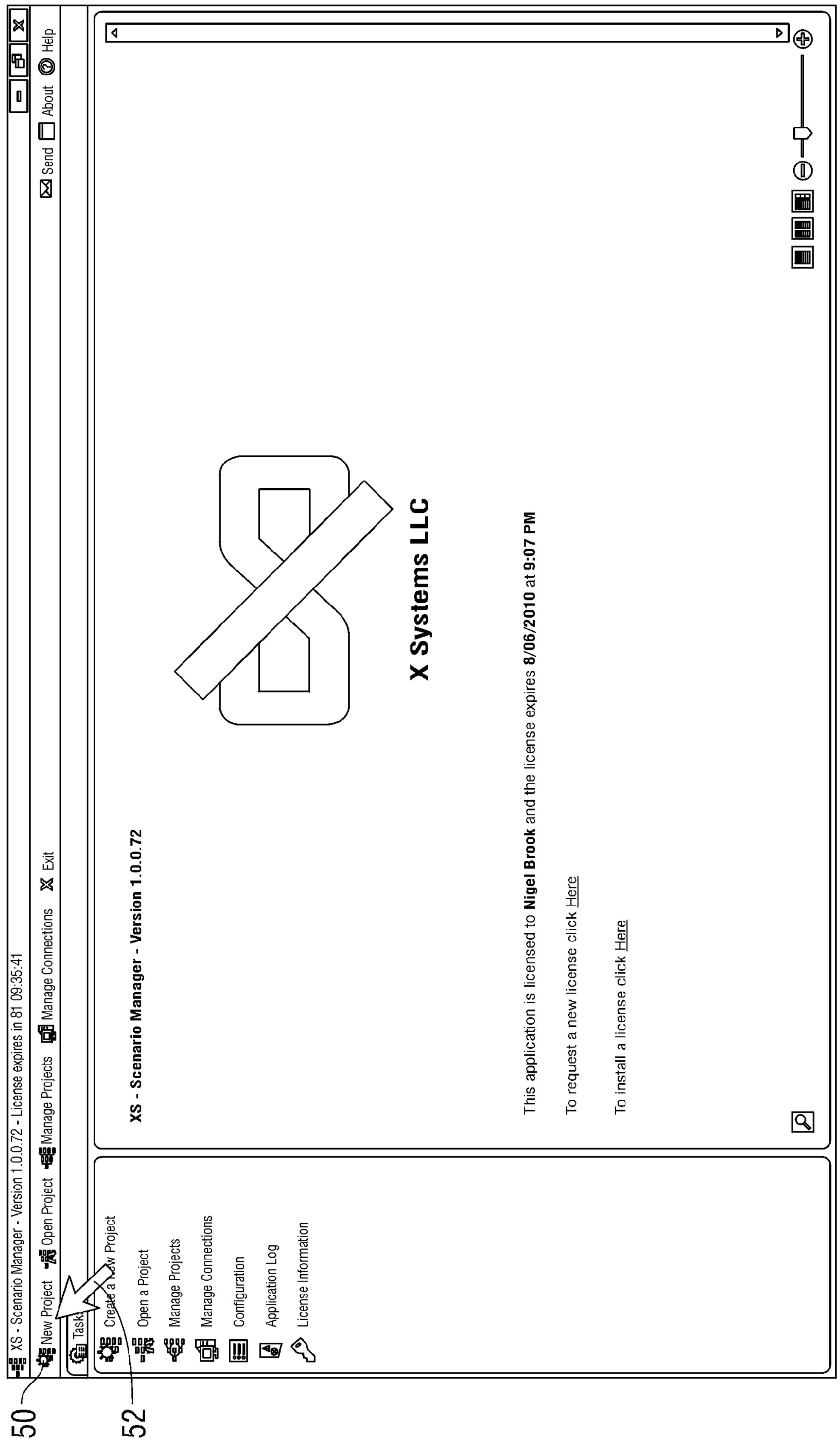
FIGS. 2A-2C are various screenshots rendered by the data analysis process of FIG. 1.

Accordingly and referring also to FIG. 2A, user 40 may select "new project" button 50 using onscreen pointer 52 (e.g., controllable by a pointing device such as a mouse; not shown). As will be discussed below in greater detail, a project may contain multiple root level scenarios and may be graphically visualized in a tree structure, which may be used to navigate the hierarchy of the various scenarios included within the project. Each scenario may contain one or more executions, wherein a scenario may be visualized as a set of executions. Through the use of data analysis process 10, a user (e.g., user 40) may create, run and analyze a plurality of executions within a scenario.

Figure 2B:
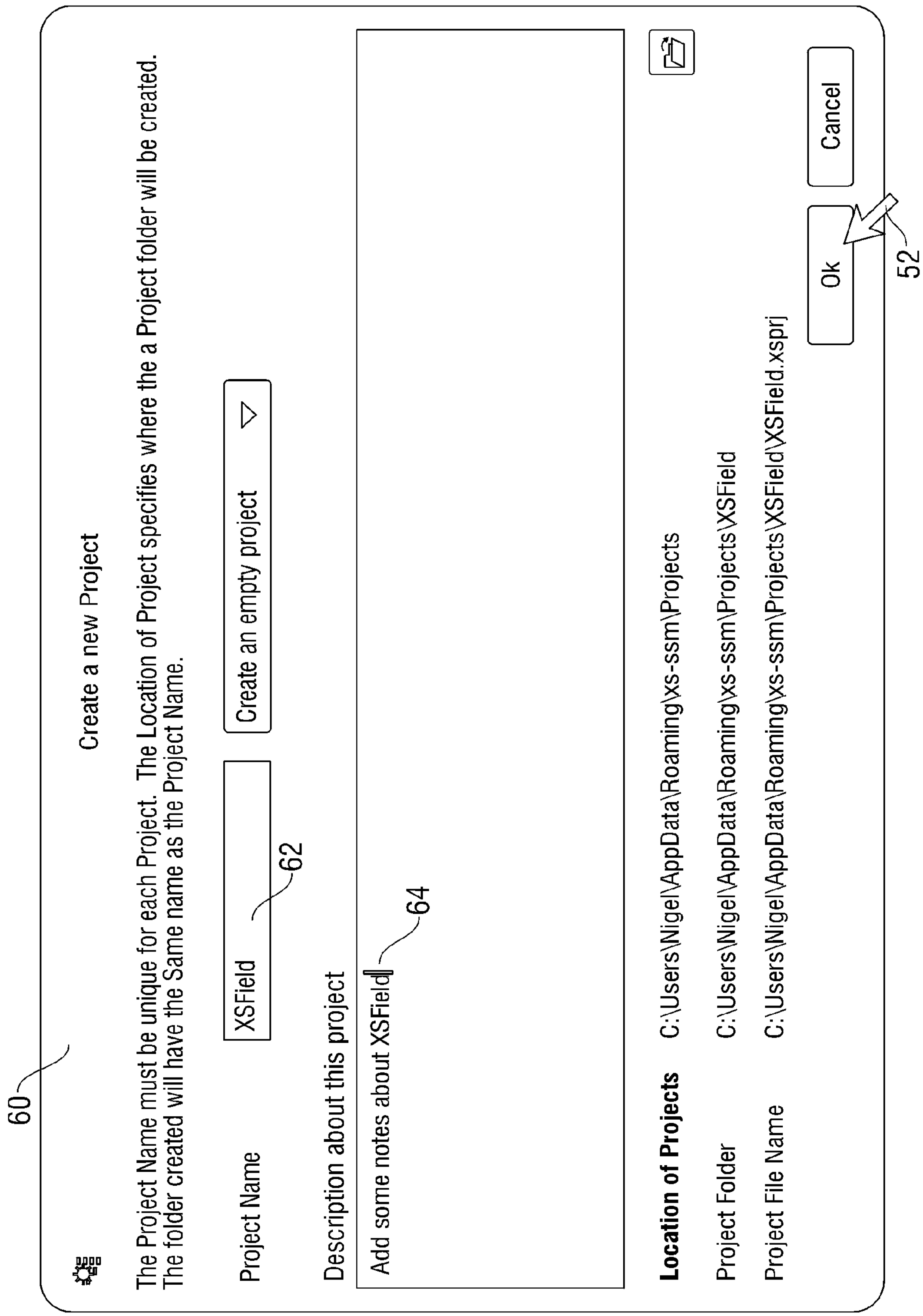

Referring also to FIG. 2B, upon selecting "new project" button 50, data analysis process 10 may render new project window 60 that may allow user 40 to e.g., define a name for the project (within project name field 62) and provide additional notes concerning the project (within notes field 64). In this particular example, the project was named "XSField".

Figure 2C:
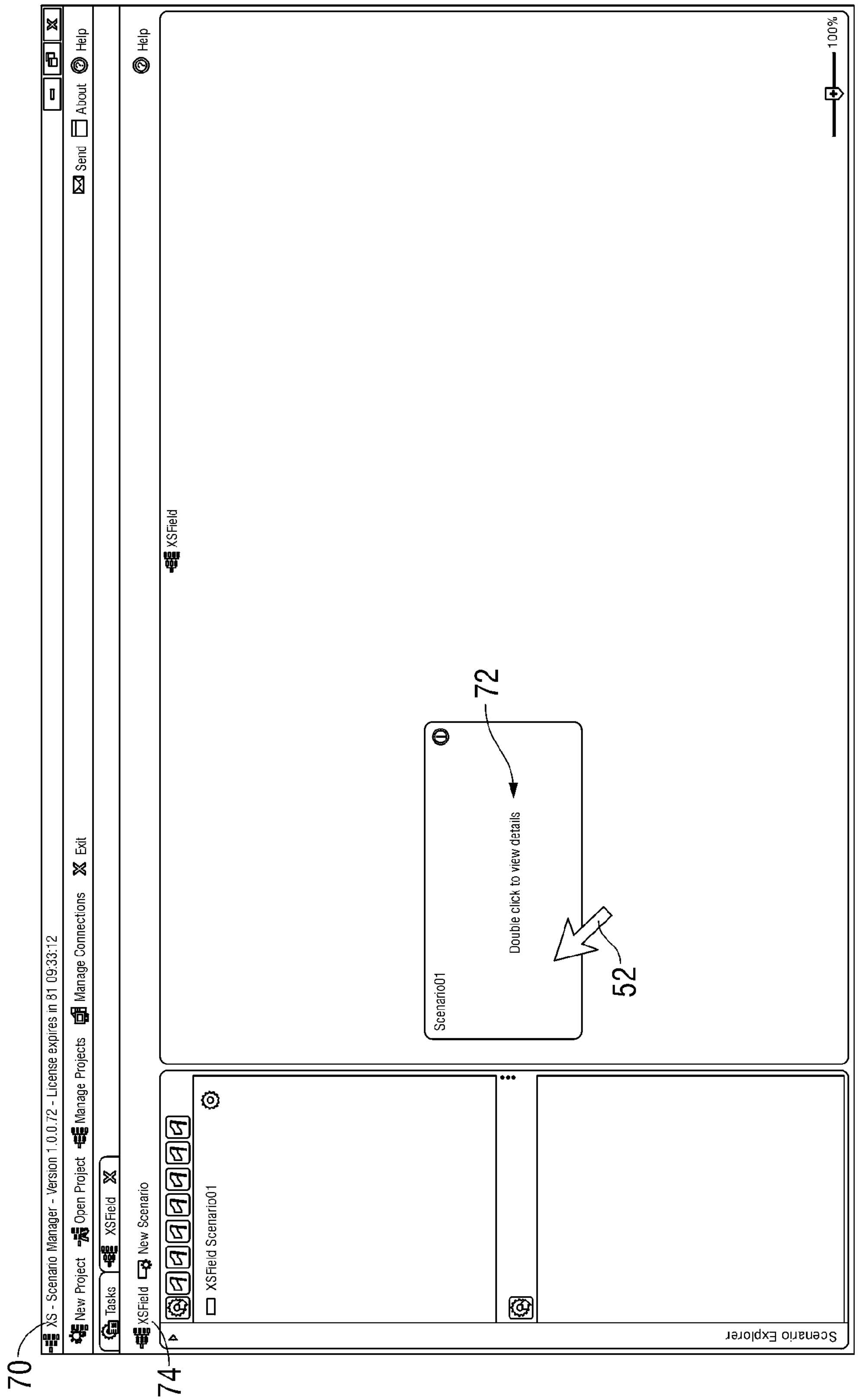

Referring also to FIG. 2C, once the new project is named, data analysis process 10 may render desktop screen 70 that allows user 40 to create scenarios for the newly-created project. Continuing with the above-stated example in which data analysis process 10 is configured to function within the petroleum industry, a scenario may (generally speaking) be one instantiation of the above-referenced project.

Data analysis process 10 may generate an initial (or base) scenario (e.g., scenario 72) for inclusion within the newly-created project, and a scenario may define one or more variables for use within the above-mentioned project (e.g., a mathematical model of an oil field). As discussed above, an oil field modeling file may mathematically model a particular oil field (or a group of oil fields) to e.g., make predictions concerning the future production of the oil field, the various flows of crude oil within the oil field, the life span of the oil field, and the general health of the oil field. As is known in the art, mathematical models of complex systems often include a large quantity of variables. Accordingly, by varying the value associated with each of these variables, the performance and accuracy of the mathematical model may be adjusted.

Figure 2D:
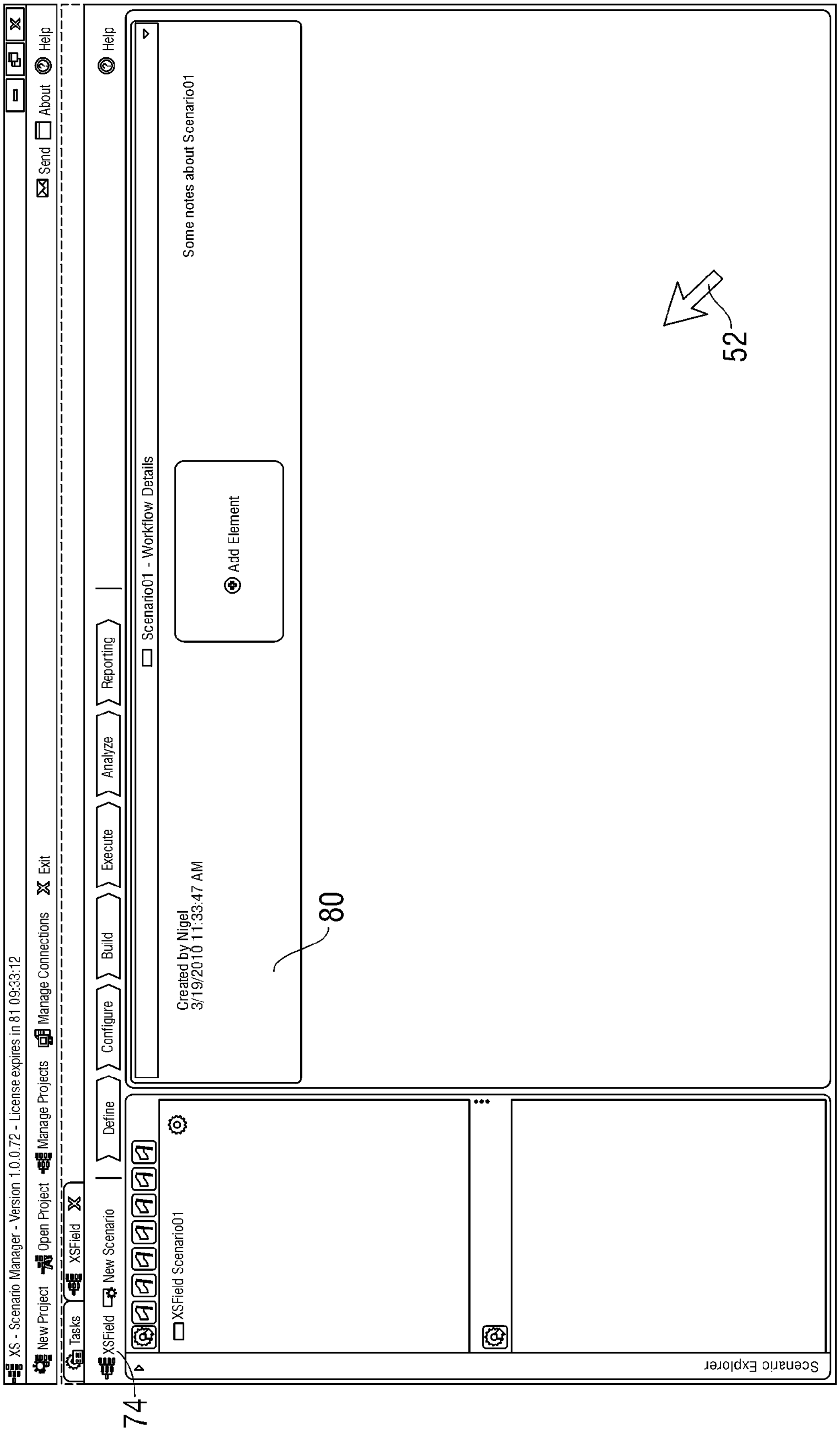

Desktop screen 70 may be configured to display the scenario (e.g., scenario 72) and identify the project by name (e.g., within project name field 74). Referring also to FIG. 2D, once a scenario (e.g., scenario 72) is created for a project, user 40 may select the scenario (via onscreen pointer 52) to view detail window 80 associated with scenario 72. Through detail window 80. data analysis process 10 may allow user 40 to add elements to the scenario. For example, data analysis process 10 may allow user 40 to: add a spreadsheet element; add a script element; and/or add a batch process element. A scenario (e.g., scenario 72) may contain multiple elements, each of which may be configured to pass information to other elements.

Figure 3:
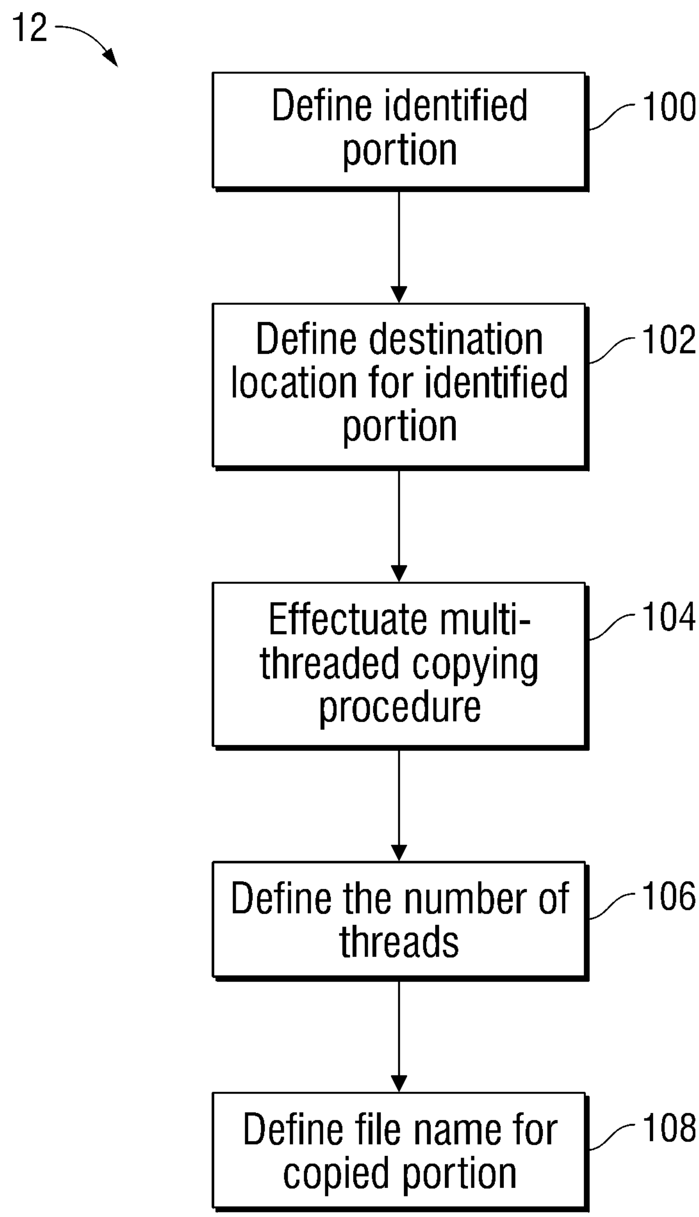
FIG. 3 is a flow chart of the multi-threaded copying module of FIG. 2.

Multi-Threaded Copying Module 12:

As discussed above and referring also to FIG. 3, data analysis process 10 may include a plurality of modules, an example of which may include multi-threaded copying module 12. Multi-threaded copying module 12 may be configured to perform operations including defining 100 at least a portion within an oil field modeling file for copying from an original location, thus defining an identified portion. Multi-threaded copying module 12 may define 102 a destination location for the identified portion and may effectuate 104 a multi-threaded copying procedure (i.e., utilizing at least two processing threads) to copy the identified portion from the original location to the destination location, thus generating a copied portion of the oil field modeling file.

Figure 3A:
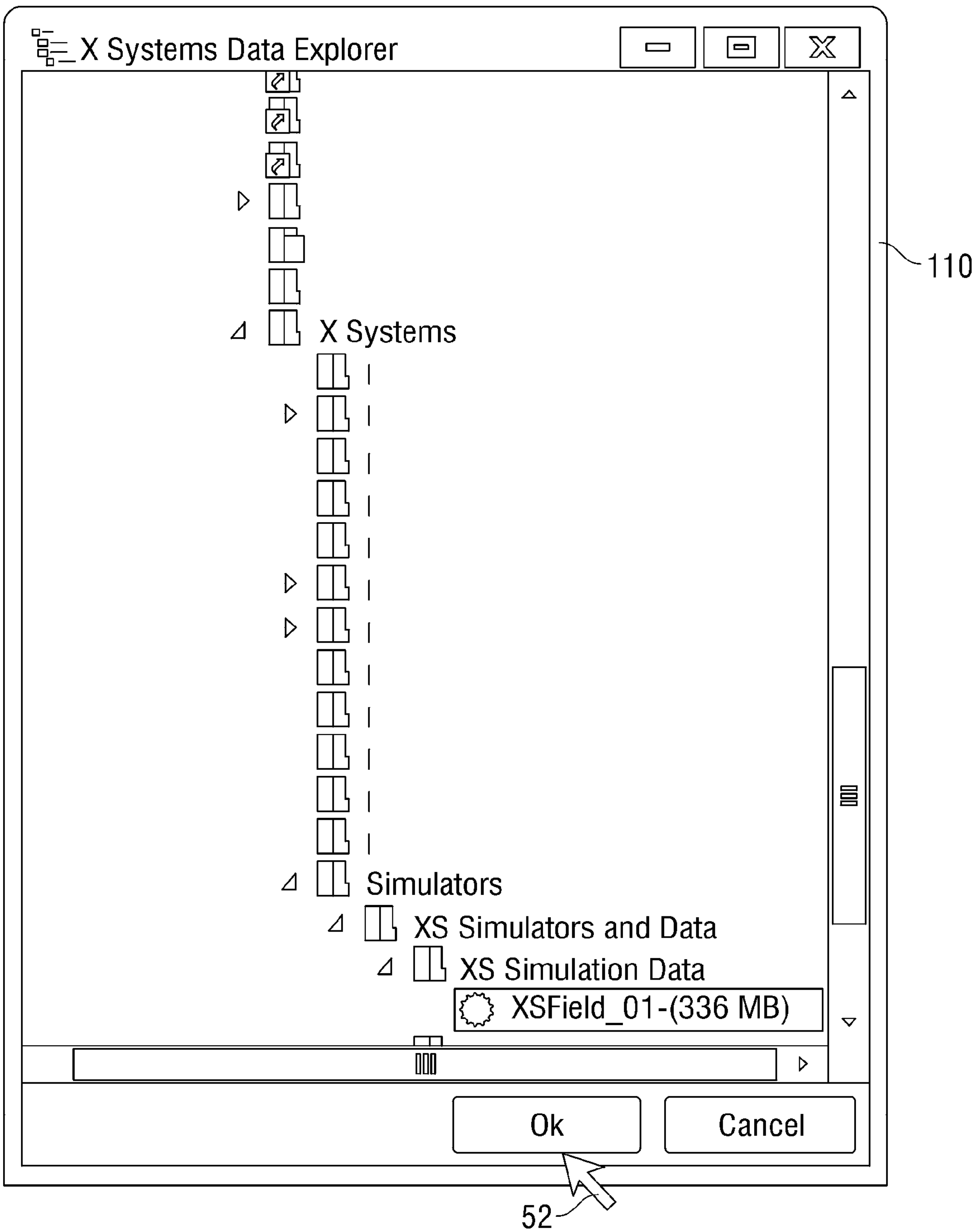
FIGS. 3A-3C are various screenshots rendered by the multi-threaded copying module of FIG. 3.

Continuing with the above-stated example, the mathematical model to be used within the scenario (e.g., scenario 72) may be loaded as a spreadsheet element (assuming that the mathematical model is in the form of a spreadsheet). Alternatively/additionally, multi-threaded copying module 12 may be configured to import a mathematical model in other formats, such as a flat file. Referring also to FIG. 3A, to assist in the importation of such mathematical models, multi-threaded copying module 12 may render element location window 110 that may be configured to allow user 40 to locate the mathematical model (e.g., XSField_01) to be utilized within/imported to e.g., scenario 72.

It is not uncommon for these mathematical modeling files to be quite large (e.g., hundreds of megabytes, if not gigabytes in size) and, therefore, it may take a considerable amount of time to generate a copy of the simulation modeling file. For example and continuing with the above-stated example, assume that the mathematical model is the oil field modeling file, which is considerably large and is residing on a remote server.

Accordingly, multi-threaded copying module 12 may allow user 40 to define 100 the portion of the oil field modeling file to be copied from it original location (e.g., a remote server; not shown). In this particular example, the portion defined 100 within element location window 110 is the complete oil field modeling file. However, this is for illustrative purposes only, as user 40 may define 100 only a sub-portion of the oil field modeling file.

Multi-threaded copying module 12 may allow user 40 to define 102 a destination location (e.g., client computer 26) for the identified portion and may effectuate 104 a multi-threaded copying procedure (i.e., utilizing at least two processing threads) to copy the identified portion (e.g., the entire oil field modeling file) from the original location (i.e., the remote server) to the destination location (e.g., client computer 26), thus generating a copied portion of the oil field modeling file for use within e.g., scenario 72. As the copy procedure effectuated 104 by multi-threaded copying module 12 is a multi-threaded copying procedure, the efficiency of the copying procedure may be enhanced.

As is known in the art, a thread is a small unit of processing that is scheduled by an operating system, often resulting in a plurality of concurrently running tasks. Multiple threads may exist within the same process and may share resources such as memory.

On a single processor computing system, multithreading generally occurs by time-division multiplexing, wherein the processor switches between different threads. On a multiprocessor or multi-core computing system, the threads or tasks may be run at the same time on different processors/cores.

Accordingly, by increasing the quantity of threads used within a copy procedure, the speed at which the copy procedure is performed may be increased. Multi-threaded copying module 12 may be configured to allow a user (e.g., user 40) to define 106 the number of processing threads to be utilized during the above-referenced multi-threaded copying procedure.

Figure 3B:
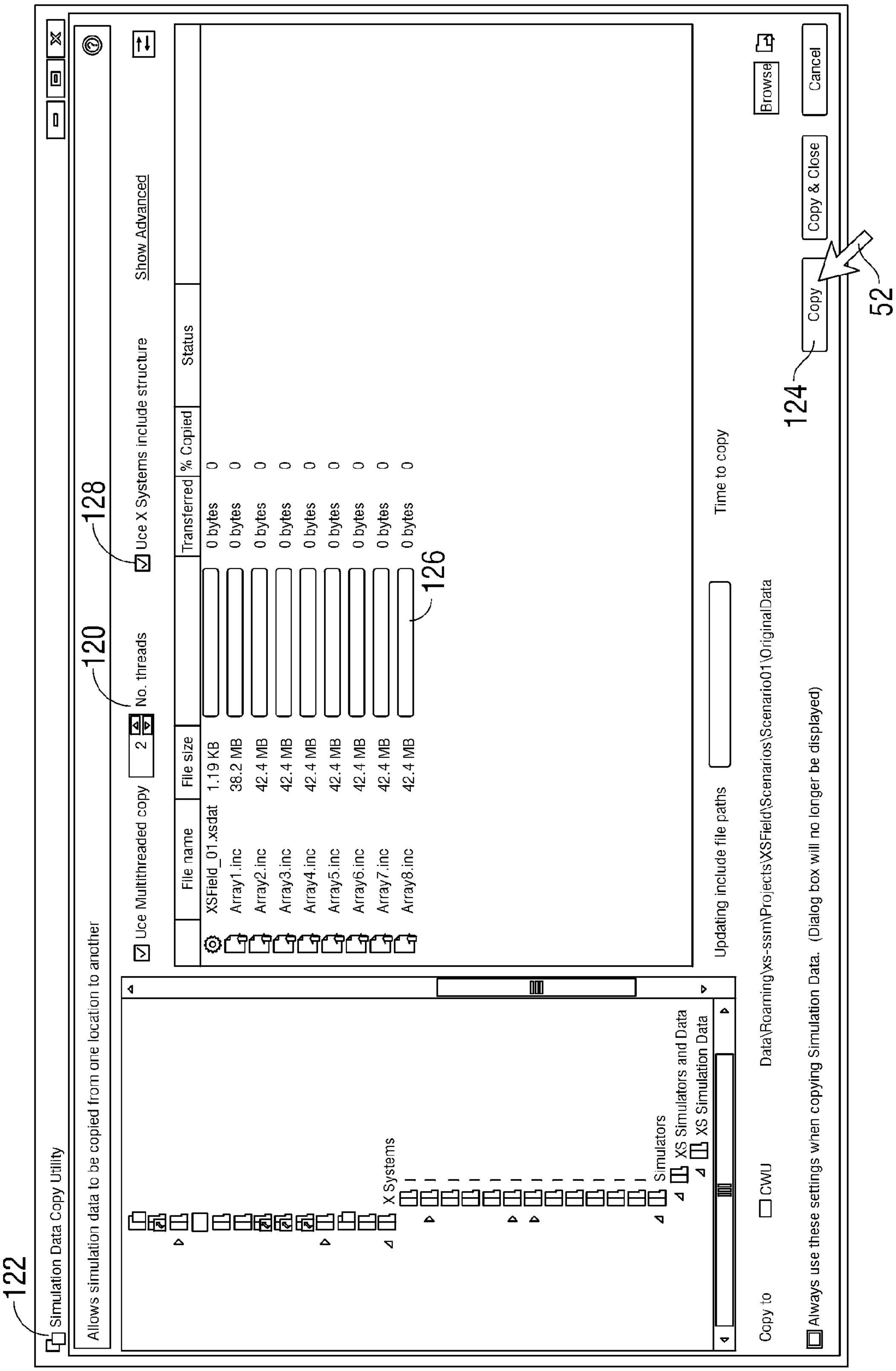
Figure 3C:
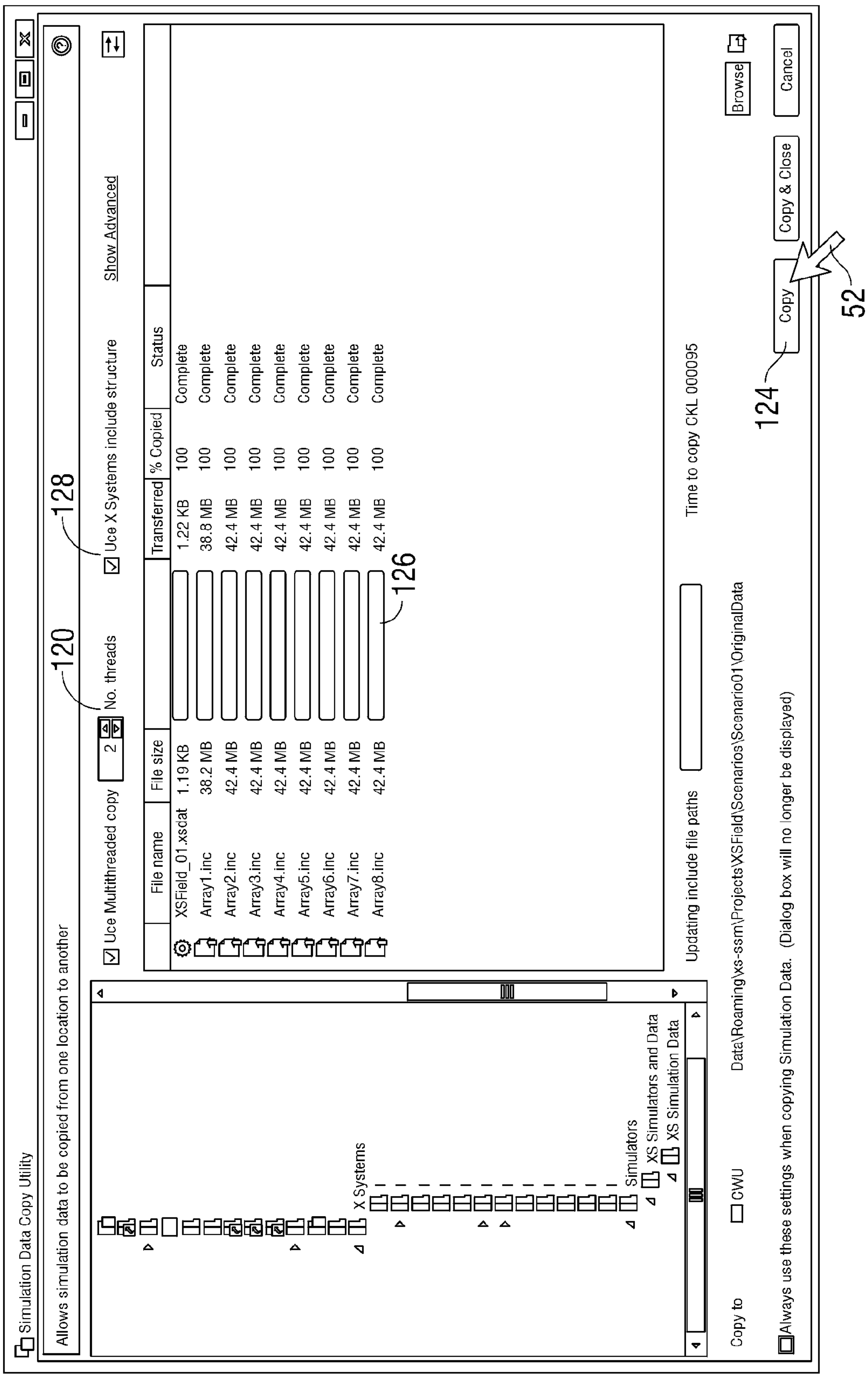

Accordingly and referring also to FIG. 3B, the quantity of threads utilized by multi-threaded copying module 12 may be defined 106 upward or downward via thread-quantity adjustment field 120 included within copy window 122. Once the appropriate quantity of threads is selected, the copying procedure may be effectuated 104 by selecting copy button 124 with onscreen pointer 52. One or more status indicators (e.g., status indicator 126) may define the status of copying the various elements included within the identified portion of the oil field modeling file. Referring also to FIG. 3C, the status indicators (e.g., status indicator 126) may be repeatedly updated until the copying procedure is completed.

While multi-threaded copying module 12 is described above as allowing a user (e.g., user 40) to copy an oil field modeling file into a newly-created scenario (e.g., scenario 72), this is for illustrative purposes only and is not intended to be a limitation of this disclosure, as other configurations are possible and are considered to be within the scope of this disclosure.

For example, the identified portion to be copied may be a scenario (e.g., scenario 72) of the oil field modeling file (as defined within the above-referenced project) and the copied portion may be a child of the scenario of the oil field modeling file (as will be discussed later). Further, the identified portion may be an execution of a scenario of the oil field modeling file (as defined within the above-referenced project) and the copied portion may be a child of the execution of the oil field modeling file (as will be discussed later). When creating new files (e.g., either of the above-described child files), multi-threaded copying module 12 may be configured to allow a user (e.g., user 40) to define 108 a file name for the copied portion (i.e., either of the above-described child files).

Additionally, multi-threaded copying module 12 may be configured to consolidate various files (e.g., include files) that are referenced in simulation modeling files when performing the above-referenced copy function to build a scenario, wherein these files may be located at various locations across a network. In the event that user 40 wishes to consolidate these files when performing the above-referenced copy function, user 40 may select the "use xSystem include structure" checkbox using onscreen pointer 52.

Pre-Execution Manipulation Module 14:

As discussed above, data analysis process 10 may generate an initial (or base) scenario (e.g., scenario 72) for inclusion within the newly-created project (as defined within project name field 74), wherein the scenario (e.g., scenario 72) may define (in this example) an oil field modeling file (e.g., XSField_01). As discussed above, this oil field modeling file (e.g., XSField_01) may mathematically model a particular oil field (or a group of oil fields) to e.g., make predictions concerning the future production of the oil field, the various flows of crude oil within the oil field, the life span of the oil field, and the general health of the oil field. As is known in the art, mathematical models of complex systems (such as oil fields) often include a large quantity of variables. Accordingly, by varying the value associated with each of these variables, the performance and accuracy of the mathematical model (e.g., XSField_01) may be adjusted.

Figure 4:
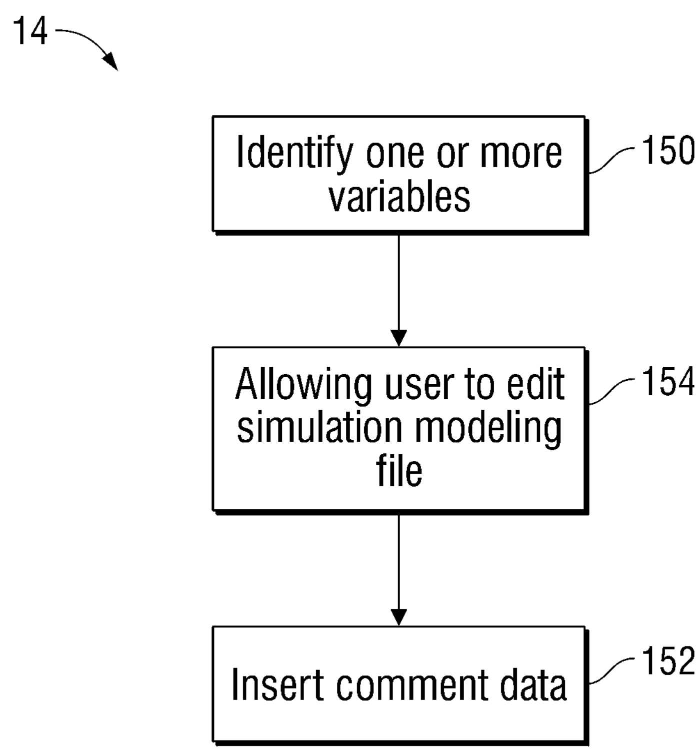
FIG. 4 is a flow chart of the pre-execution manipulation module of FIG. 2.

As discussed above and referring also to FIG. 4, data analysis process 10 may include a plurality of modules, an example of which may include pre-execution manipulation module 14. Pre-execution manipulation module 14 may be configured to perform operations including identifying 150 one or more variables included within at least a portion of an oil field modeling file (e.g., XSField_01). Pre-execution manipulation module 14 may insert 152 comment data into at least a portion of the oil field modeling file (e.g., XSField_01) to define one or more values for each of one or more variables.

Figure 4A:
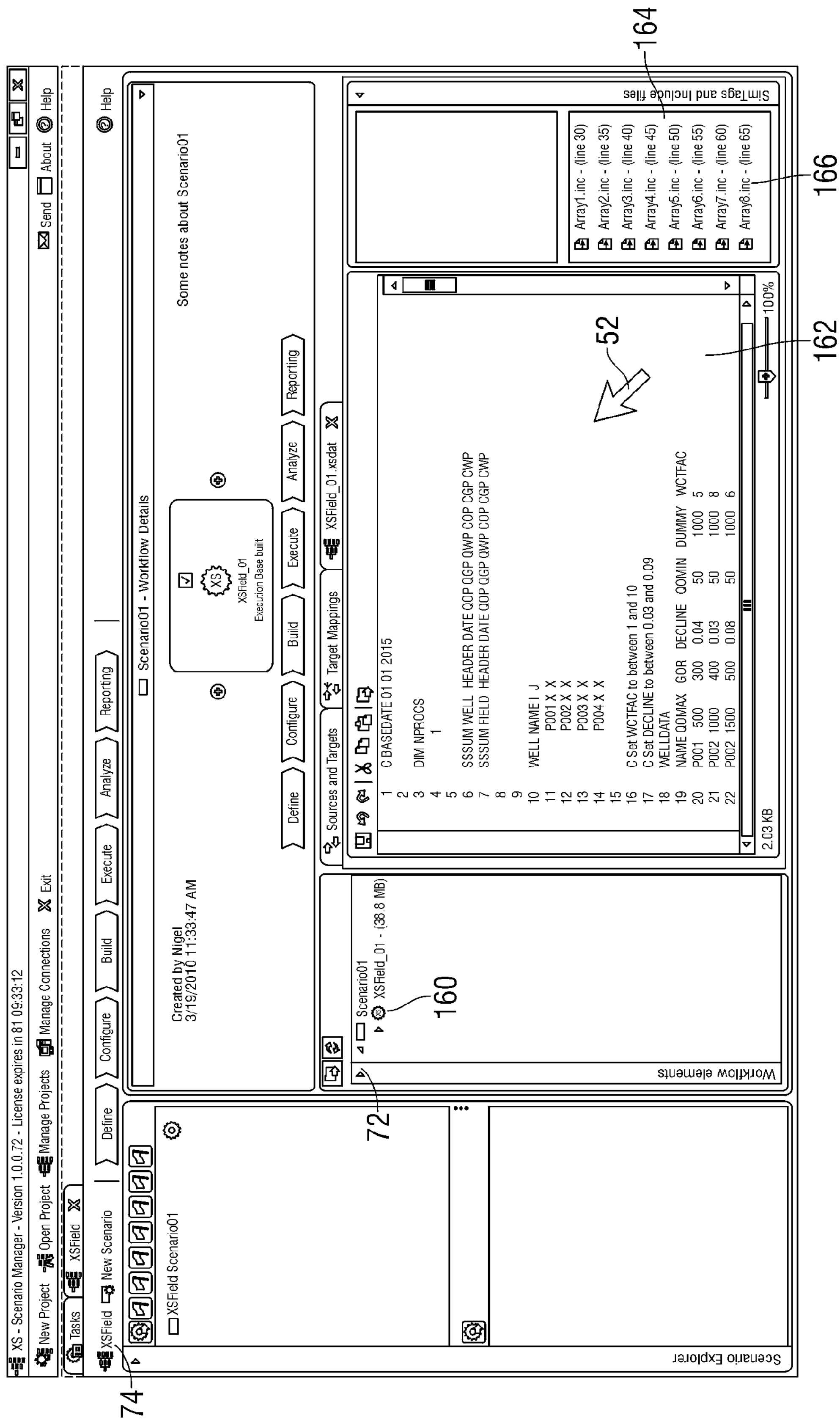
FIGS. 4A-4E are various screenshots rendered by the pre-execution manipulation module of FIG. 4.

Continuing with the above-stated example, pre-execution manipulation module 14 may allow user 40 to identify 150 one or more variables included within the oil field modeling file (e.g., XSField_01). For example and referring also to FIG. 4A, user 40 may select oil field modeling file 160 using onscreen pointer 52. Once selected, pre-execution manipulation module 14 may render detail window 162 that provides a detail view of oil field modeling file 160. The individual files (e.g., files 164) included within oil field modeling file (e.g., XSField_01) may be defined within directory window 166.

Via detail window 162 and directory window 166, pre-execution manipulation module 14 may allow a user (e.g., user 40) to edit 154 the various components of the oil field modeling file (e.g., XSField_01). Accordingly, by allowing user 40 to edit 154 the oil field modeling file (e.g., XSField_01), pre-execution manipulation module 14 may allow user 40 to insert 152 the above-referenced comment data into the oil field modeling file (e.g., XSField_01) to define values for variables within the oil field modeling file (e.g., XSField_01). Examples of such comment data may include but is not limited to metadata.

Figure 4B:
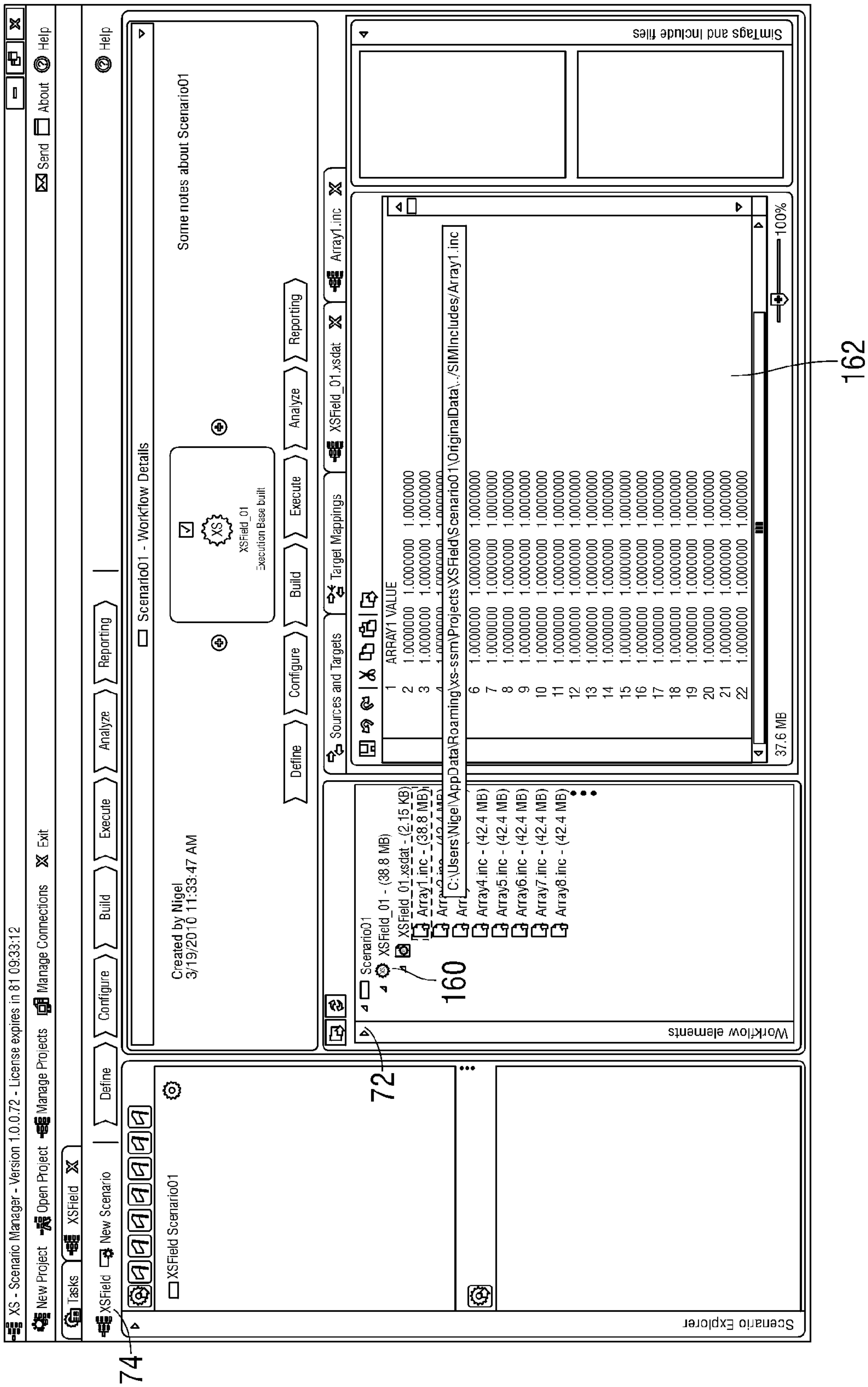
Figure 4C:
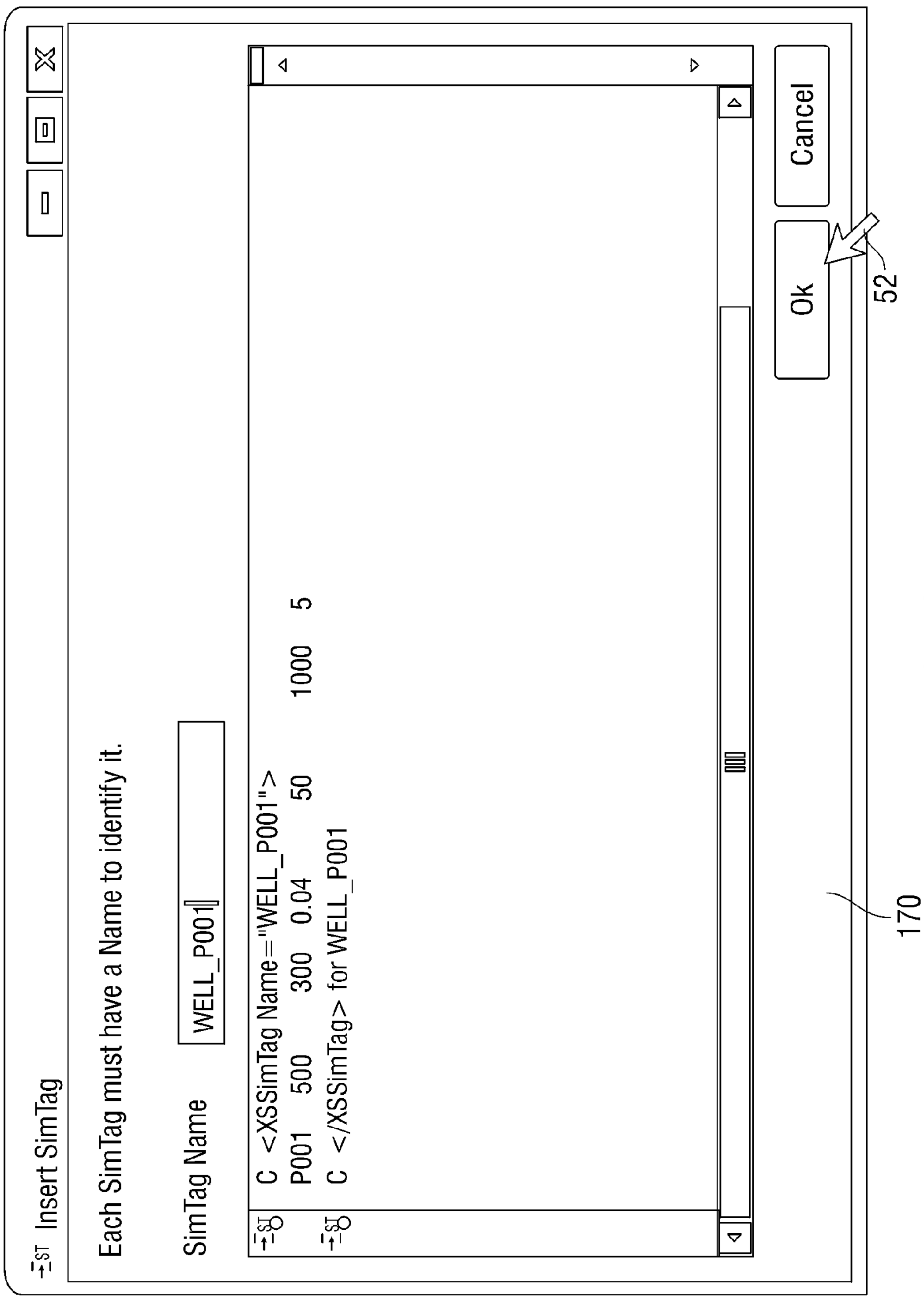
Figure 4D:
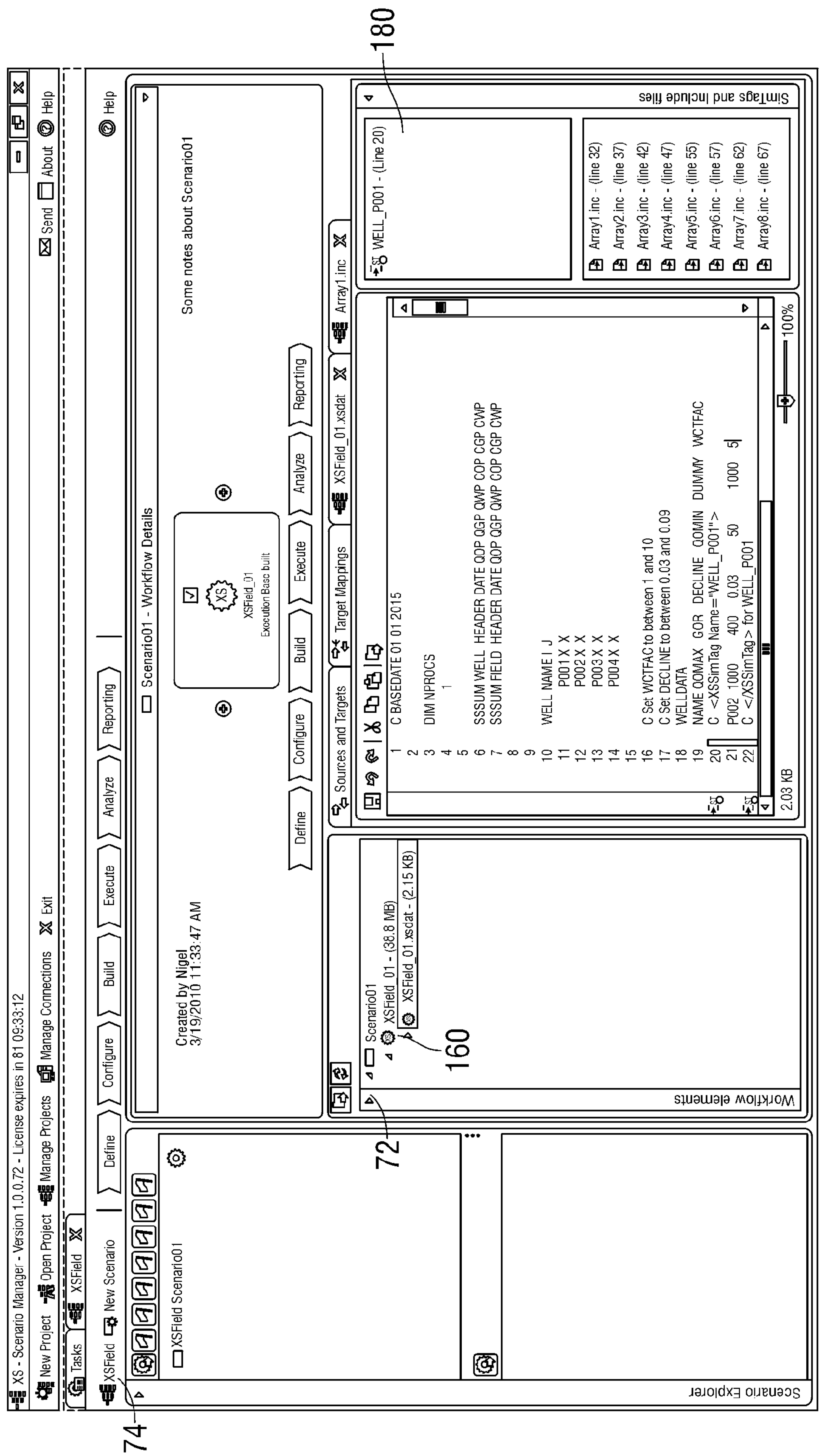
Figure 4E:
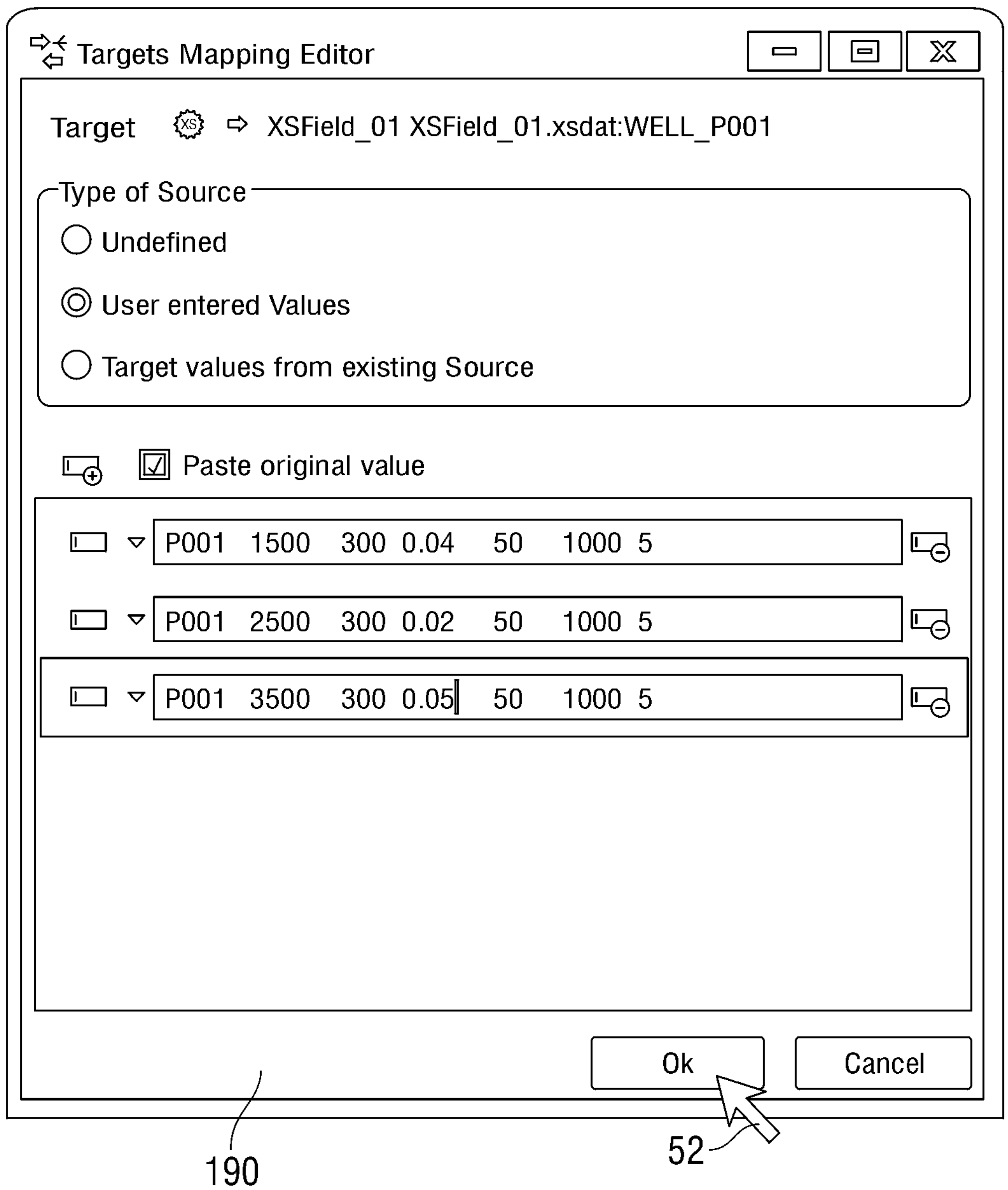

Continuing with the above-stated example, assume that user 40 wants to edit the "Array1" file included within the oil field modeling file (e.g., XSField_01). Accordingly, user 40 may select the "Array1" file within directory window 166 using onscreen pointer 52. Referring also to FIG. 4B, pre-execution manipulation module 14 may render the contents of the "Array1" file within detail window 162. User 40 may then select a portion of the contents of "Array1" files (from within detail window 162) using onscreen pointer 52. Upon making the selection and referring also to FIG. 4C, pre-execution manipulation module 14 may render comment generation window 170, which may allow user 40 to insert 152 comment data into the selected portion of the oil field modeling file (e.g., XSField_01). Comment generation window 170 may further allow user 40 to define a name for the comment data inserted. In this particular example, the name defined is "WELL_P001". Referring also to FIG. 4D, once inserted 152, the comment data will appear within comment data window 180. Referring also to FIG. 4E, user 40 may then select "WELL_P001" from within comment data window 180 using onscreen pointer 52 and comment detail window 190 for comment data "WELL_P001" may be rendered by pre-execution manipulation module 14.

In this particular example, user 40 provided three sets of unique values for the variables associated with comment data "WELL_P001". Accordingly, pre-execution manipulation module 14 may allow user 40 to insert 152 the comment data into the oil field modeling file (e.g., XSField_01) to define a plurality of values for variables included within the oil field modeling file. In this particular example, the variables being defined are the initial oil flow rate and oil decline rate of the well. When a plurality of values are defined (as shown in FIG. 4E), the plurality of values may be executed within an automated batch execution process (to be discussed below in greater detail).

While in this particular example, user 40 provided three sets of unique values for the variables associated with comment data "WELL_P001", this is for illustrative purposes only and is not intended to be a limitation of this disclosure, as other configurations are possible and are considered to be within the scope of this disclosure. For example, the number of sets of values (and whether each value defined is unique) may be increased or decreased depending upon the needs of e.g., user 40.

Figure 5:
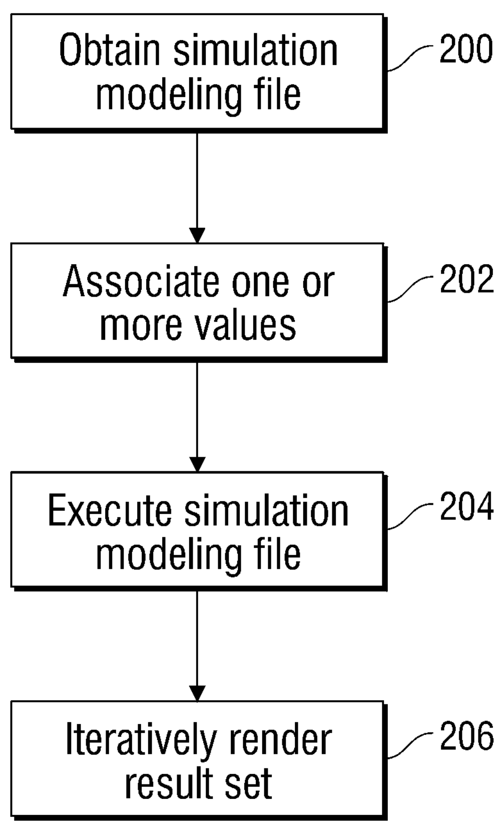
FIG. 5 is a flow chart of the high-granularity, real-time module of FIG. 2.
Figure 5A:
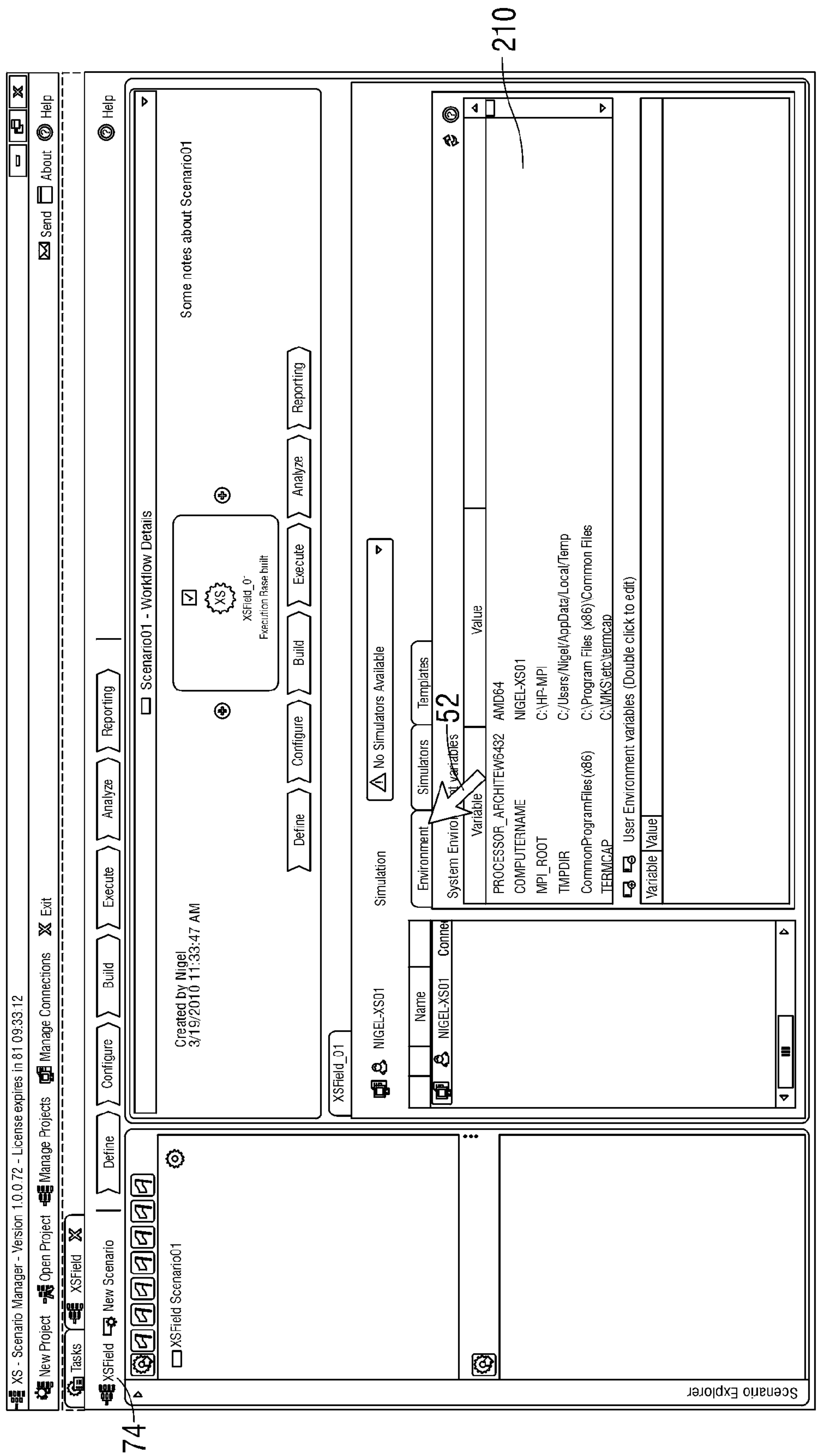
FIGS. 5A-5O are various screenshots rendered by the high-granularity, real-time module of FIG. 5.
Figure 5B:
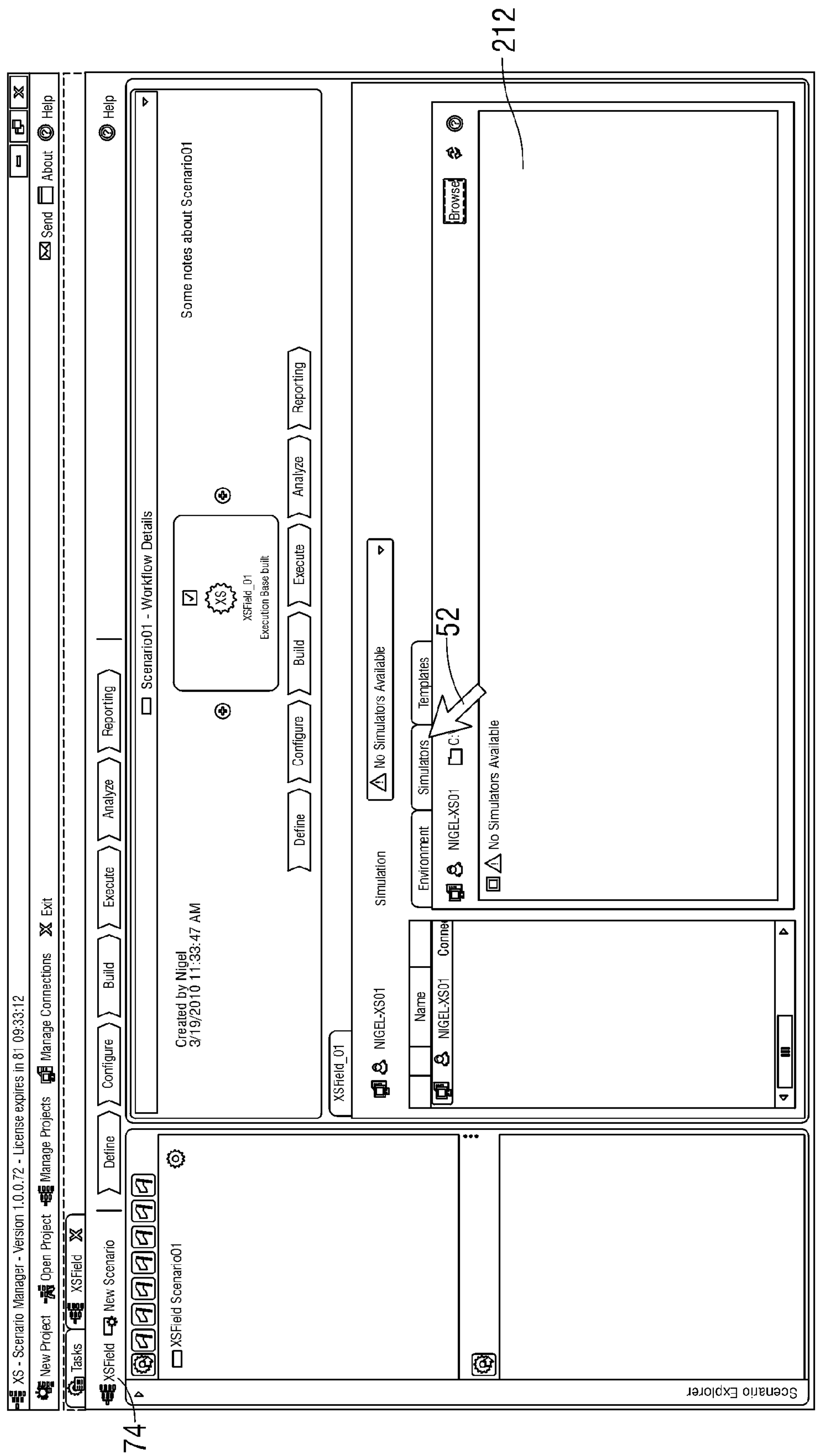
Figure 5C:
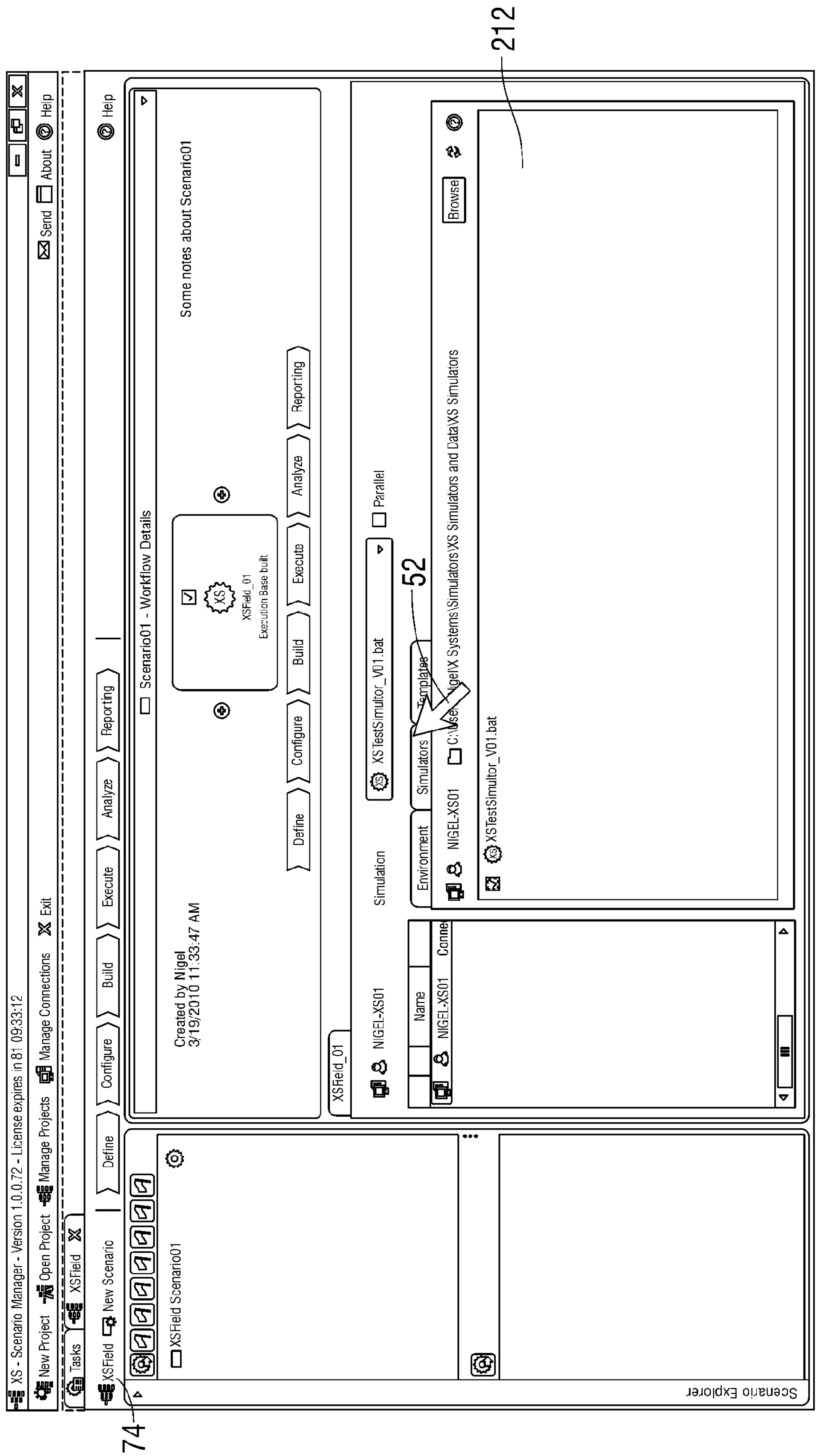
Figure 5D:
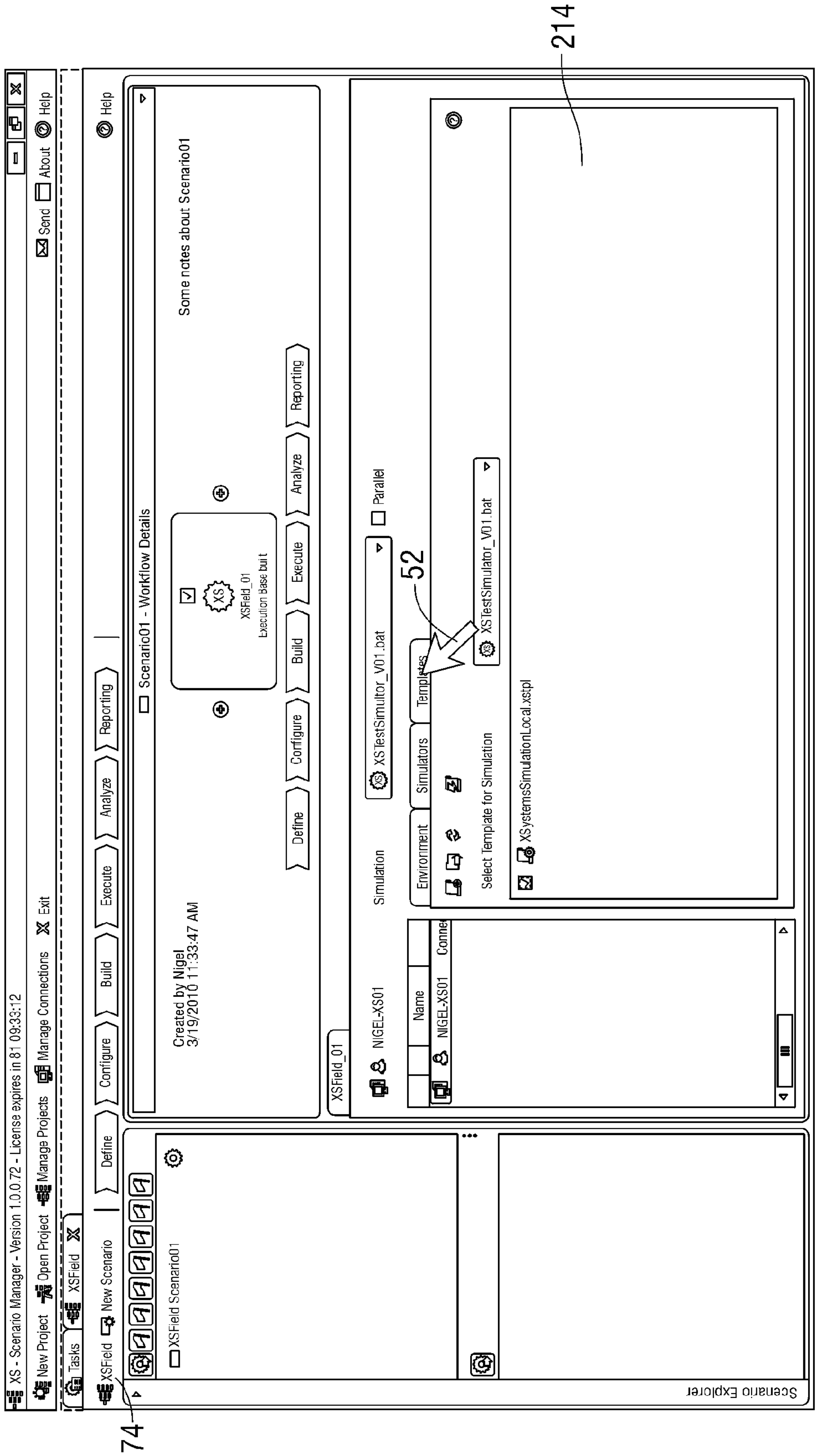

While in this particular example, pre-execution manipulation module 14 is described above as allowing user 40 to manually identify 150 one or more variables and manually insert 152 comment data into at least a portion of the oil field modeling file (e.g., XSField_01) to define one or more values for each of the one or more variables, this is for illustrative purposes only and is not intended to be a limitation of this disclosure, as other configurations are possible and are considered to be within the scope of this disclosure. For example, pre-execution manipulation module 14 may be configured to automatically identify 150 (via one or more user-defined rules) one or more variables within oil field modeling file (e.g., XSField_01) and automatically insert 152 (via one or more user-defined rules) comment data into the oil field modeling file (e.g., XSField_01) to define one or more values for each of one or more variables, High-Granularity Real-Time Module 16:

As discussed above and referring also to FIG. 5, data analysis process 10 may include a plurality of modules, an example of which may include high-granularity, real-time module 16. High-granularity, real-time module 16 may be configured to perform operations including obtaining 200 an oil field modeling file (e.g., XSField_01). High-granularity, real-time module 16 may associate 202 one or more values with variables included within the oil field modeling file (e.g., XSField_01). In the above-described example, user 40 provided three sets of unique values for the variables associated with comment data "WELL_P001", wherein the variables being defined were the initial oil flow rate and oil decline rate of the well. While in this example, three unique values are defined for a variable within oil field modeling file (e.g., XSField_01), this is for illustrative purposes only, as the number of values defined may be increased/decreased depending on the complexity of the calculations to be performed on oil field modeling file (e.g., XSField_01). High-granularity, real-time module 16 may execute 204 the oil field modeling file (e.g., XSField_01) to generate at least one result set (i.e. an execution), which may be iteratively rendered 206 while the result set(s) are generated. Accordingly, as the number of unique values associated 202 by the user (e.g., user 40) with a variable within the oil field modeling file (e.g., XSField_01) increases/decreases, the number of result sets generated by high-granularity, real-time module 16 also increases/decreases respectively.

Accordingly and as discussed above, through the use of multi-threaded copying module 12 included within data analysis process 10, user 40 may define at least a portion within an oil field modeling file for copying from an original location, thus allowing user 40 to obtain 200 an oil field modeling file (e.g., XSField_01).

Further and as discussed above, through the use of pre-execution manipulation module 14 included within data analysis process 10, user 40 may be allowed to identify one or more variables included within the oil field modeling file (e.g., XSField_01), thus allowing user to associate 202 one or more values with each of the variables included within the oil field modeling file (e.g., XSField_01).

Continuing with the above-stated example and referring also to FIGS. 5A-5D, once the oil field modeling file (e.g., XSField_01) is obtained 200 and one or more values are associated 202 with each of the variables included within the oil field modeling file (e.g., XSField_01), high-granularity, real-time module 16 may render configuration windows 210, 212, 214 which may be selectable via a plurality of tabs using onscreen pointer 52. Through the use of configuration windows 210, 212, 214, user 40 may be allowed to configure future executions and the machines on which these executions will be performed.

Examples of the type of information definable via configuration windows 210, 212, 214 may include but are not limited to the name of the computer(s) on which the execution(s) will be performed, the type of computer(s) on which the execution(s) will be performed, the manner in which the execution(s) will be performed, and the format of the output generated by the execution(s). Accordingly, once properly configured, high-granularity, real-time module 16 may execute 204 the oil field modeling file (e.g., XSField_01) to generate at least one result set (i.e. an execution), which may be iteratively rendered 206 while the result set(s) are generated.

Figure 5E:
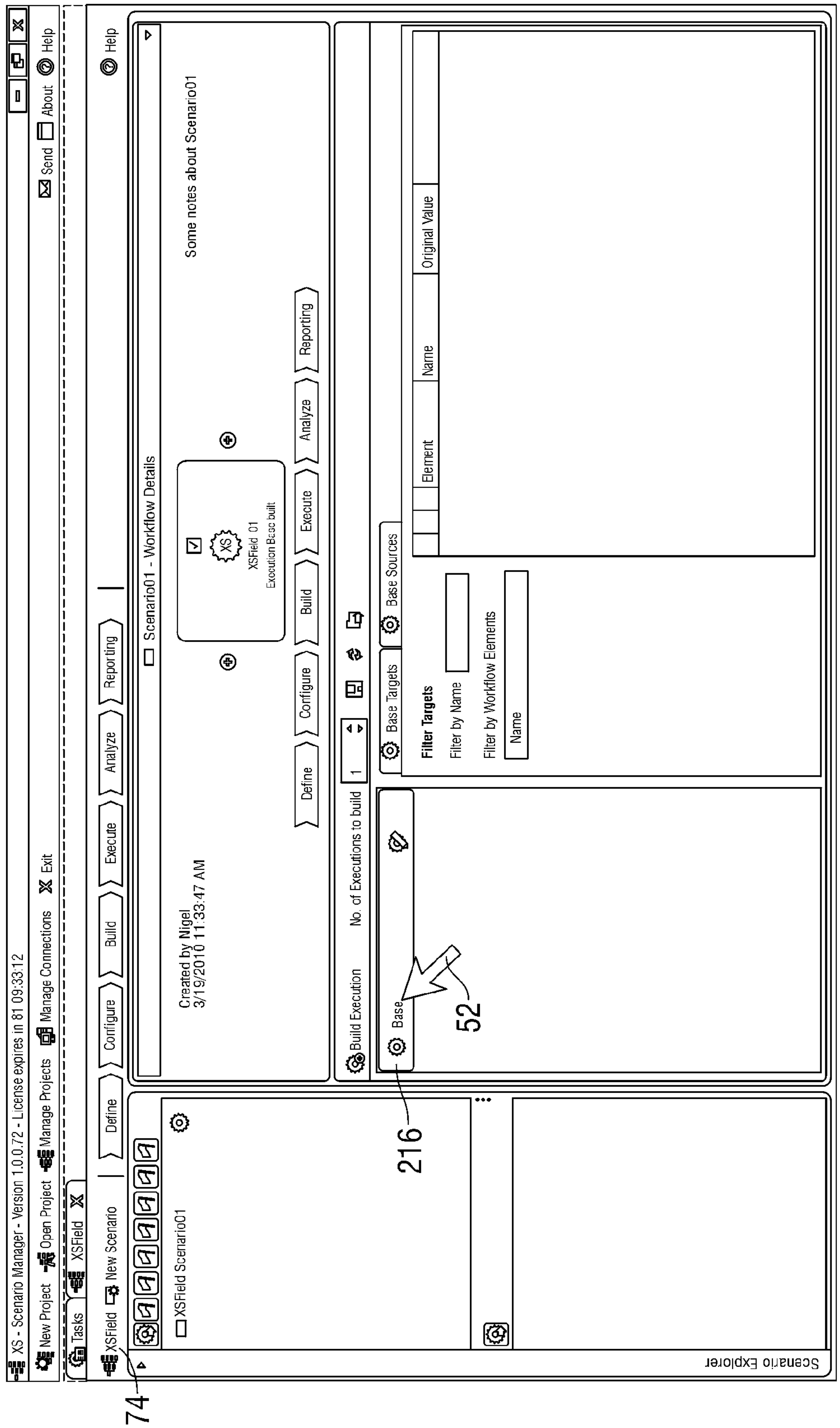

Typically, each variable within the oil field modeling file (e.g., XSField_01) may be predefined to a default (i.e., base) value and the user of high-granularity, real-time module 16 may associate 202 additional values for particular variables within the oil field modeling file (e.g., XSField_01) that may be utilized during successive executions of the oil field modeling file (e.g., XSField_01). Accordingly and referring also to FIG. 5E, whenever oil field modeling file (e.g., XSField_01) is first loaded for execution, high-granularity, real-time module 16 may automatically define a base execution (e.g., base execution 216) that uses these default values for the variables defined within oil field modeling file (e.g., XSField_01). Therefore, if user 40 associates 202 an additional value for a variable included within the oil field modeling file (e.g., XSField_01), high-granularity, real-time module 16 may define a second execution that is based upon the value associated 202 by the user; in addition to the base execution that was defined by high-granularity, real-time module 16 based upon the default value of the variable included within the oil field modeling file (e.g., XSField_01).

Figure 5F:
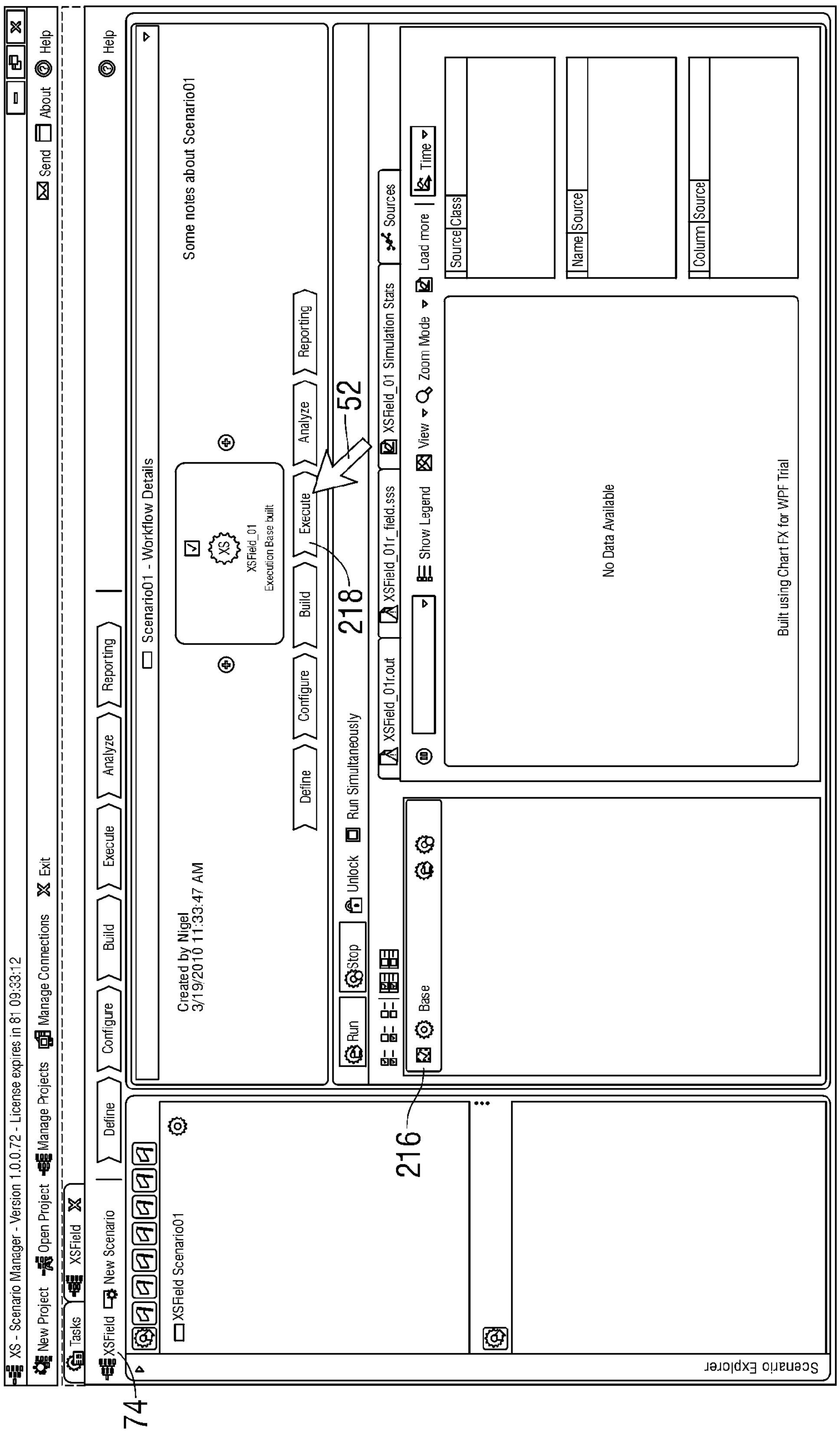

Referring also to FIG. 5F, in order to see the result set associated with base execution 216, high-granularity, real-time module 16 may allow user 40 to select base execution 216 for processing (e.g., by selecting base execution 216 with onscreen pointer 52) and selecting "execute" button 218 (using onscreen pointer 52).

Figure 5G:
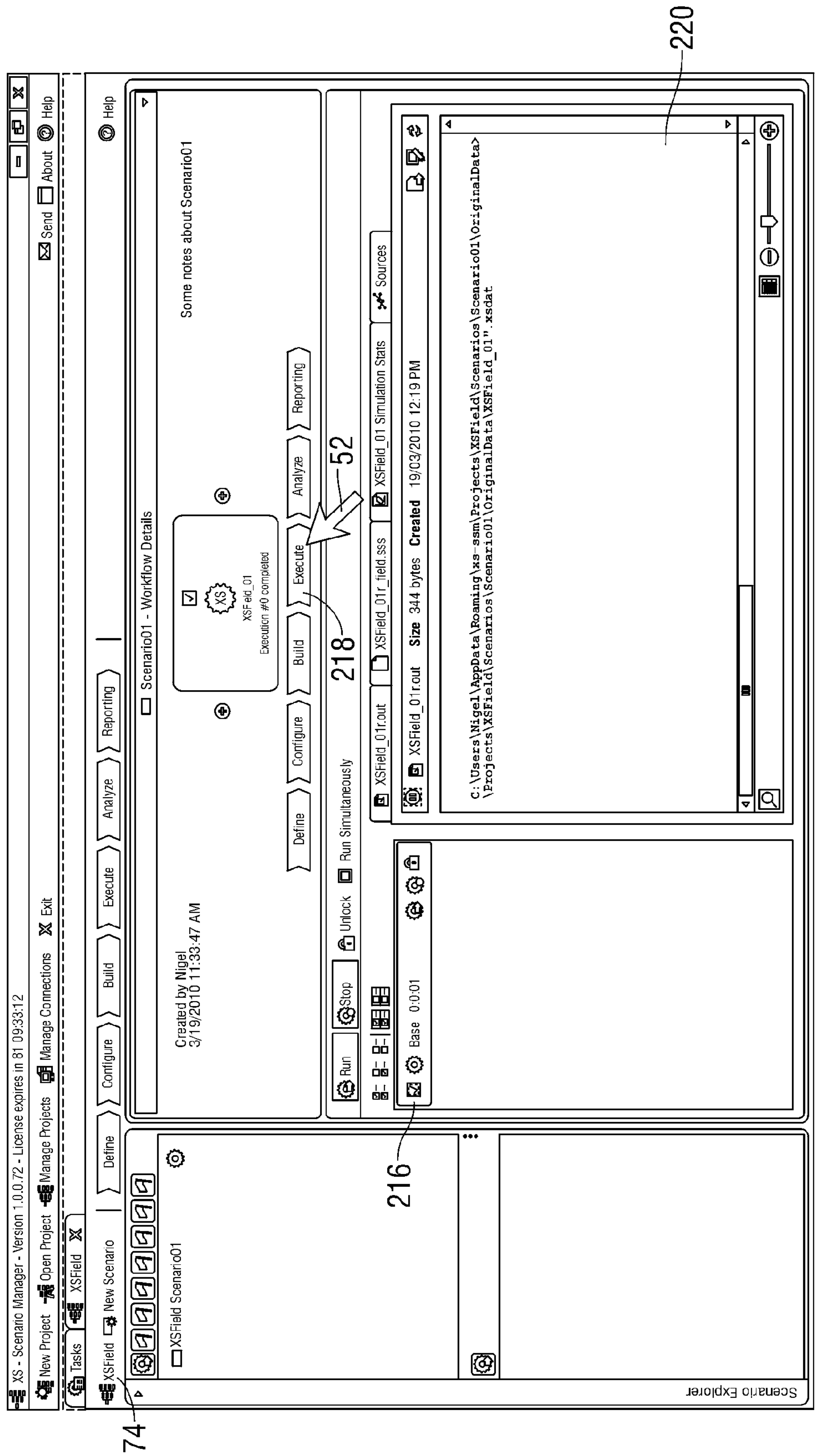

Referring also to FIG. 5G, once "execute" button 218 is selected (using onscreen pointer 52), high-granularity, real-time module 16 may execute 204 base execution 216 to generate a result set (i.e. an execution), which may be iteratively rendered 206 while the result set(s) are generated in result window 220.

Figure 5H:
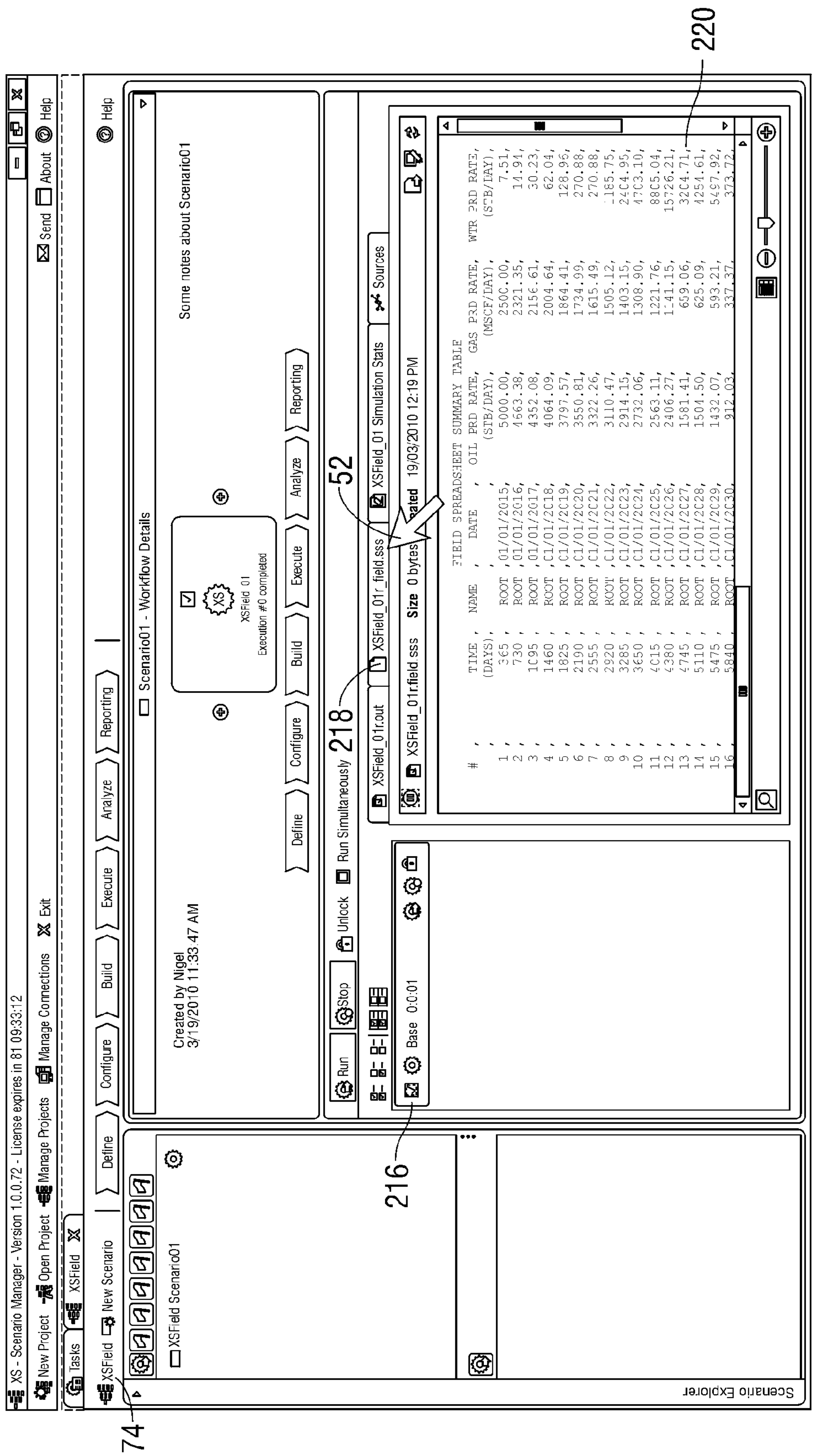
Figure 5I:
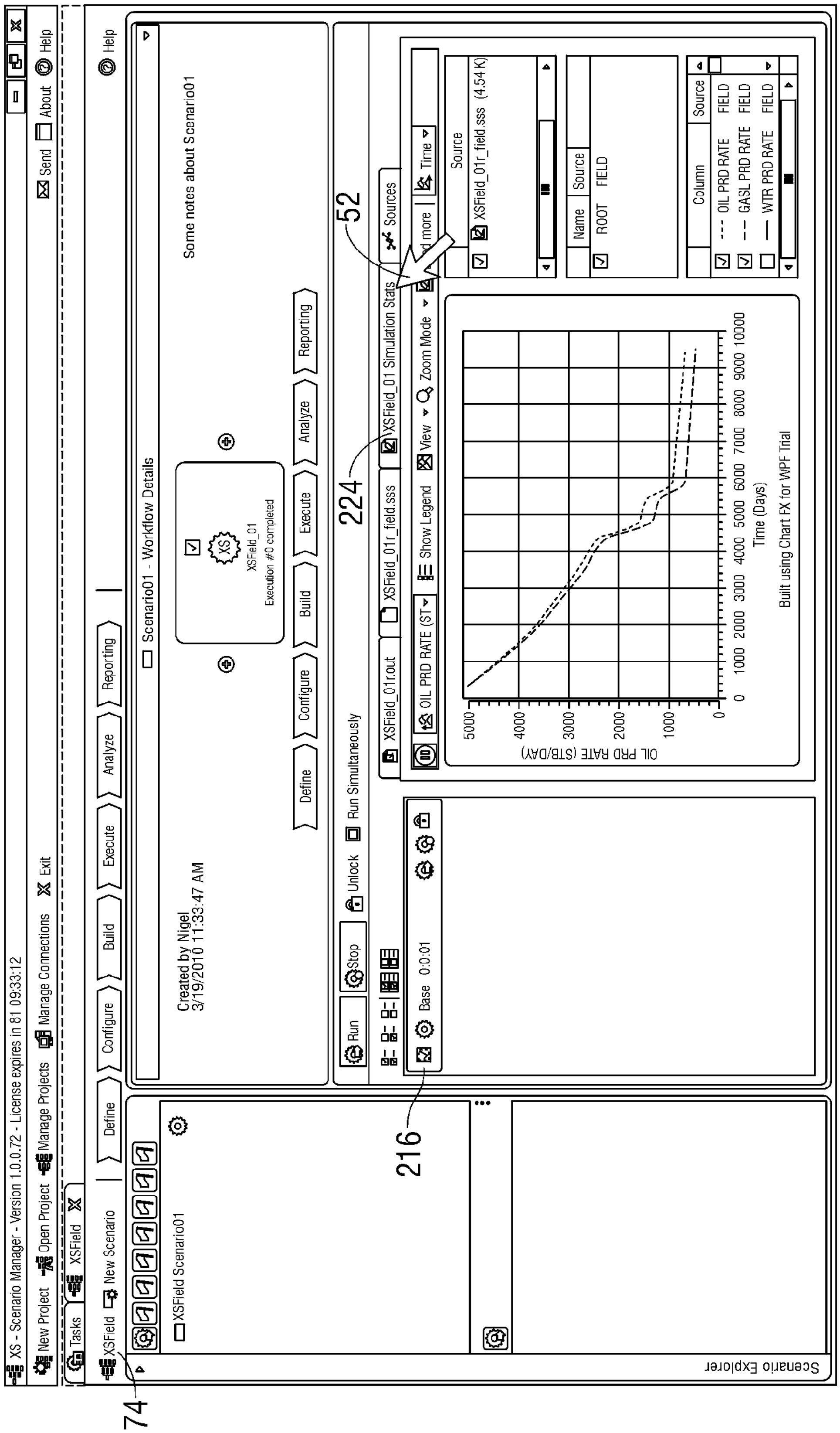

Referring also to FIGS. 5H-5I, when high-granularity, real-time module 16 iteratively renders 206 the result set for base execution 216, high-granularity, real-time module 16 may render 206 the result set tabularly (i.e., as a table) and/or graphically (i.e., as a graph). Result window 220 may be a multi-tabbed window that allows user 40 to e.g., select tab 222 to see the tabular results that were rendered 206 by high-granularity, real-time module 16. Alternatively/additionally, user 40 may e.g., select tab 224 to see the graphical results that were rendered 206 by high-granularity, real-time module 16.

Figure 5J:
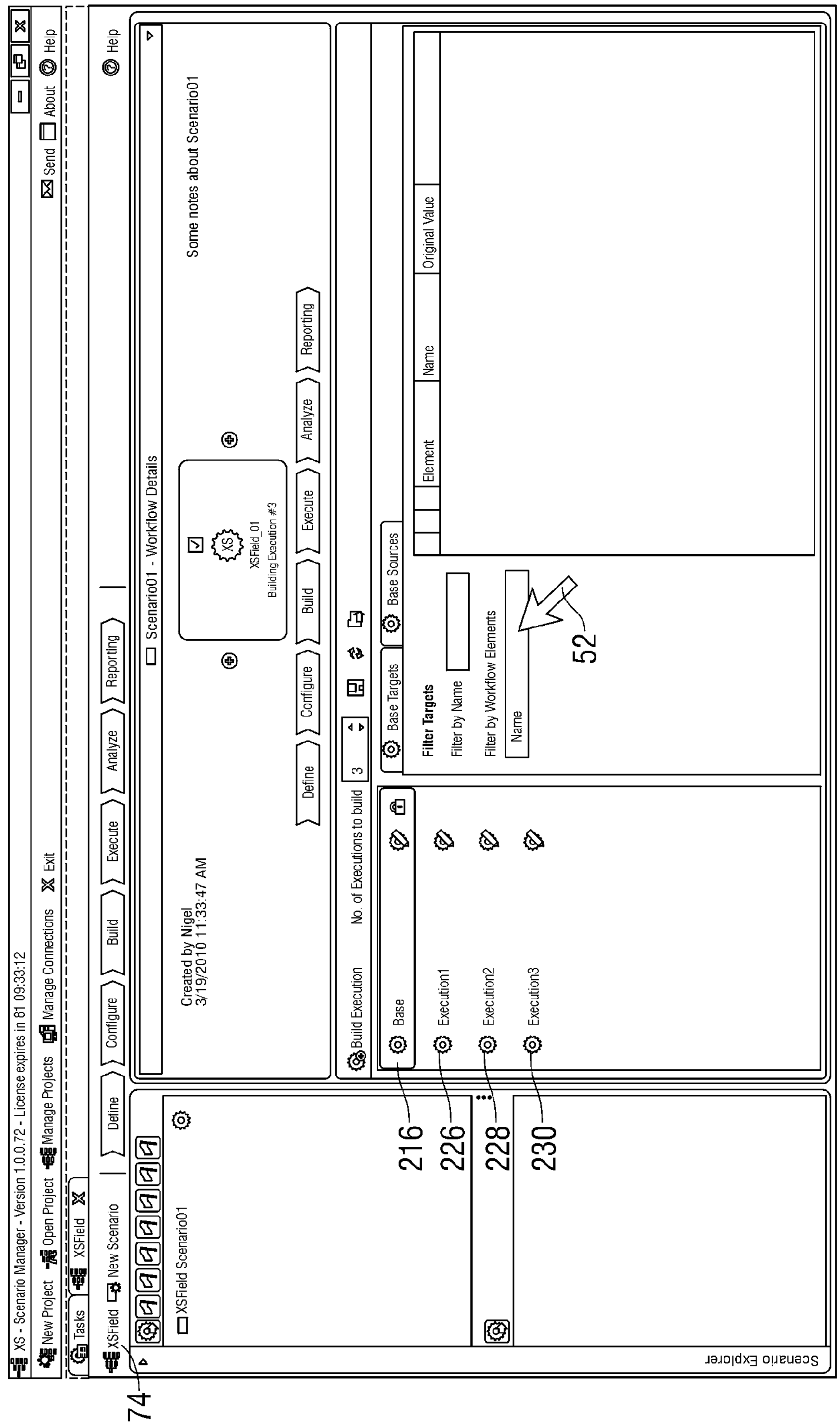

As discussed above, as the number of unique values associated 202 by the user (e.g., user 40) with a variable within the oil field modeling file (e.g., XSField_01) increases/decreases, the number of result sets generated by high-granularity, real-time module 16 also increases/decreases respectively. Referring to FIG. 5J, since in this example, three unique values are defined for a valuables within oil field modeling file (e.g., XSField_01), a total of four executions (e.g., base execution 216, execution 226, execution 228, execution 230) are available for processing by high-granularity, real-time module 16. Accordingly a total of four result sets may be rendered 206 by high-granularity, real-time module 16.

Figure 5K:
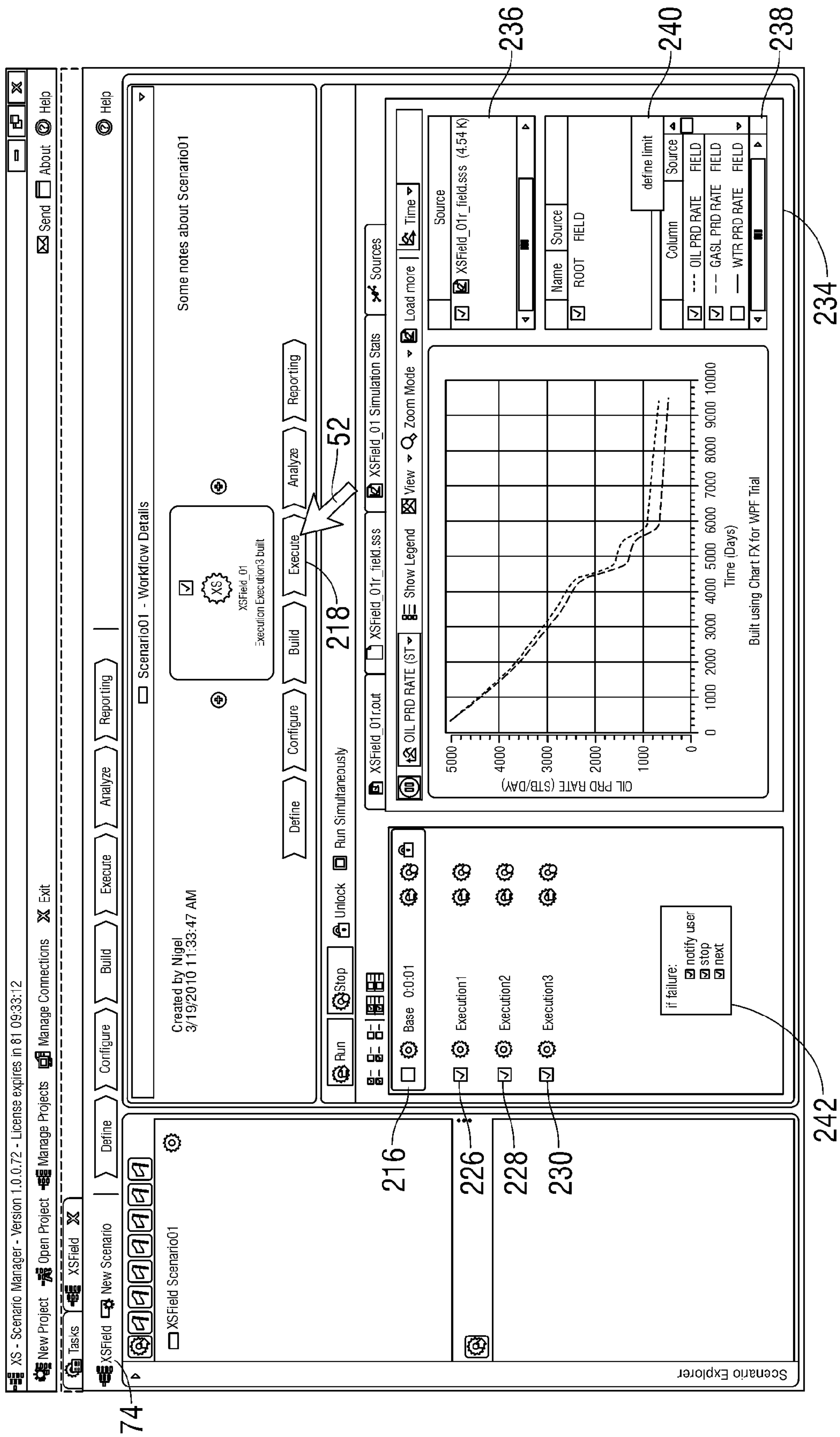
Figure 5L:
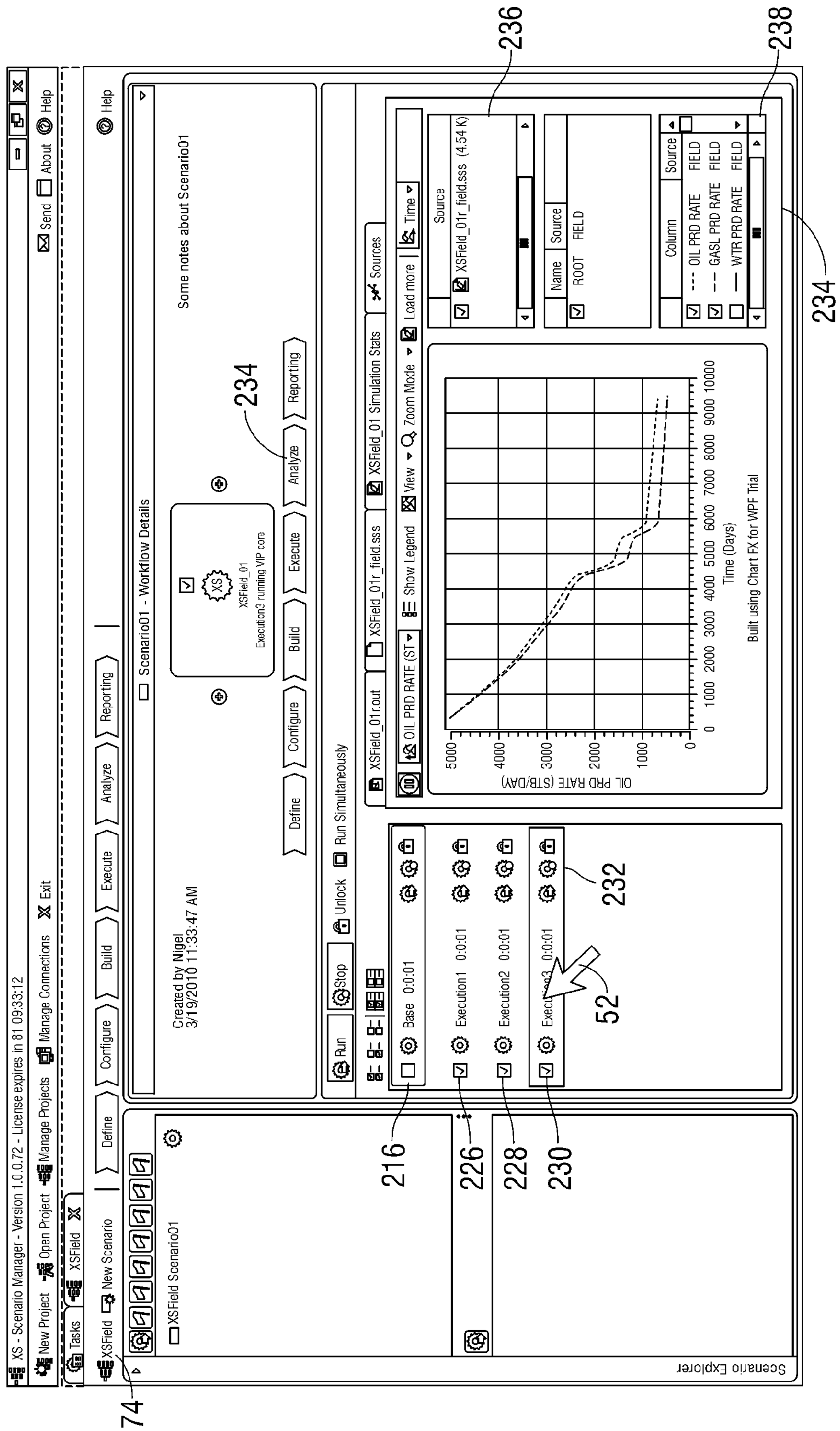

As shown in FIG. 5K, several executions (e.g., execution 226, execution 228, execution 230) may be selected (using onscreen pointer 52) for execution 204 so that results may be iteratively rendered 206 for each execution. As discussed above, in order to initiate execution 204, user 40 may select "execute" button 218 using onscreen pointer 52. As shown in FIG. 5L and once selected, a result set may be generated for each execution that was processed by high-granularity, real-time module 16. The availability of a result set for analysis is indicated by the presence of a result set icon in result set column 232. Once a result set is generated for an execution, user 40 may select the appropriate execution using onscreen pointer 52 and select "analyze" button 234 to see the result set related to the selected execution.

Figure 5M:
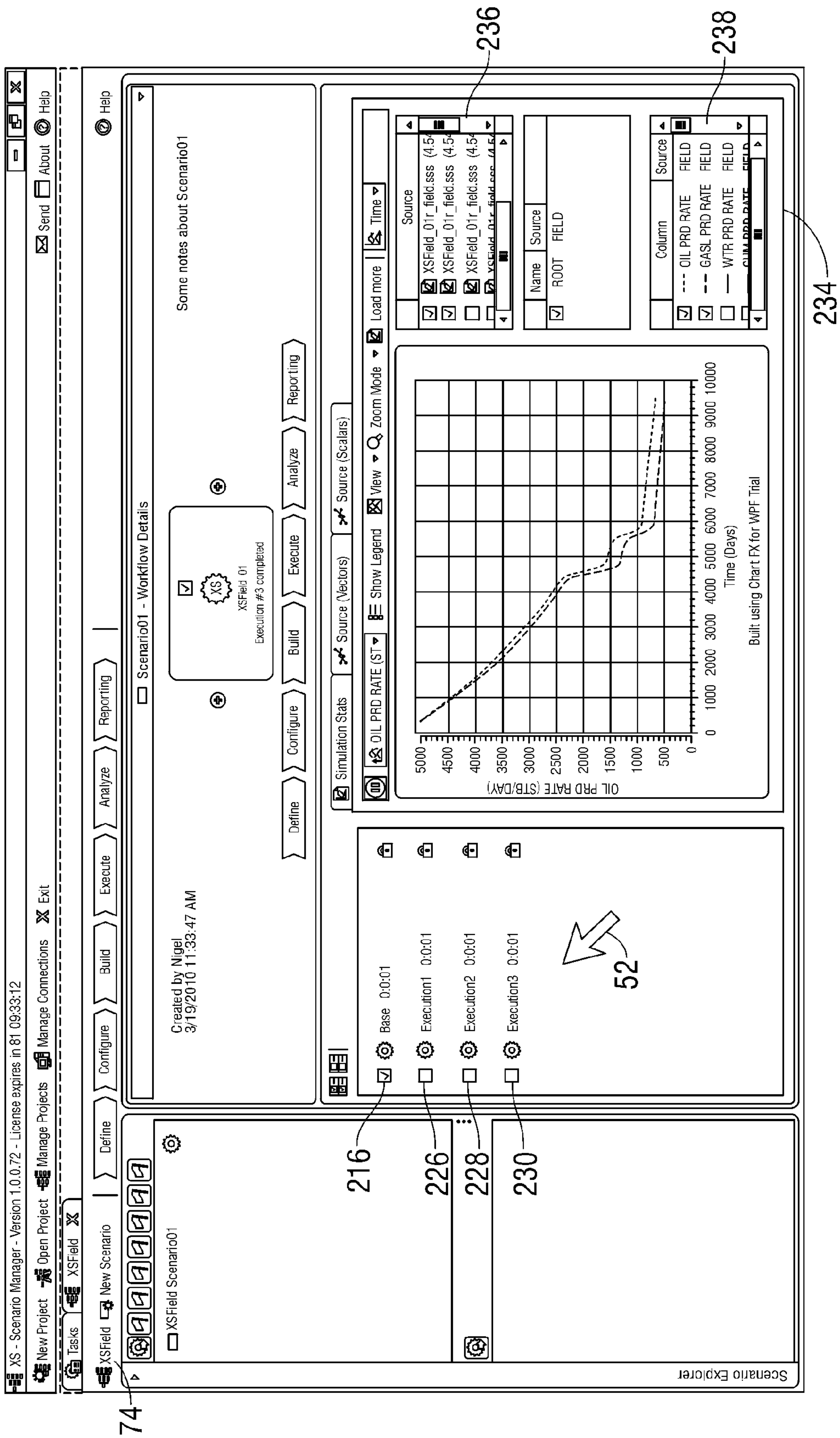
Figure 5N:
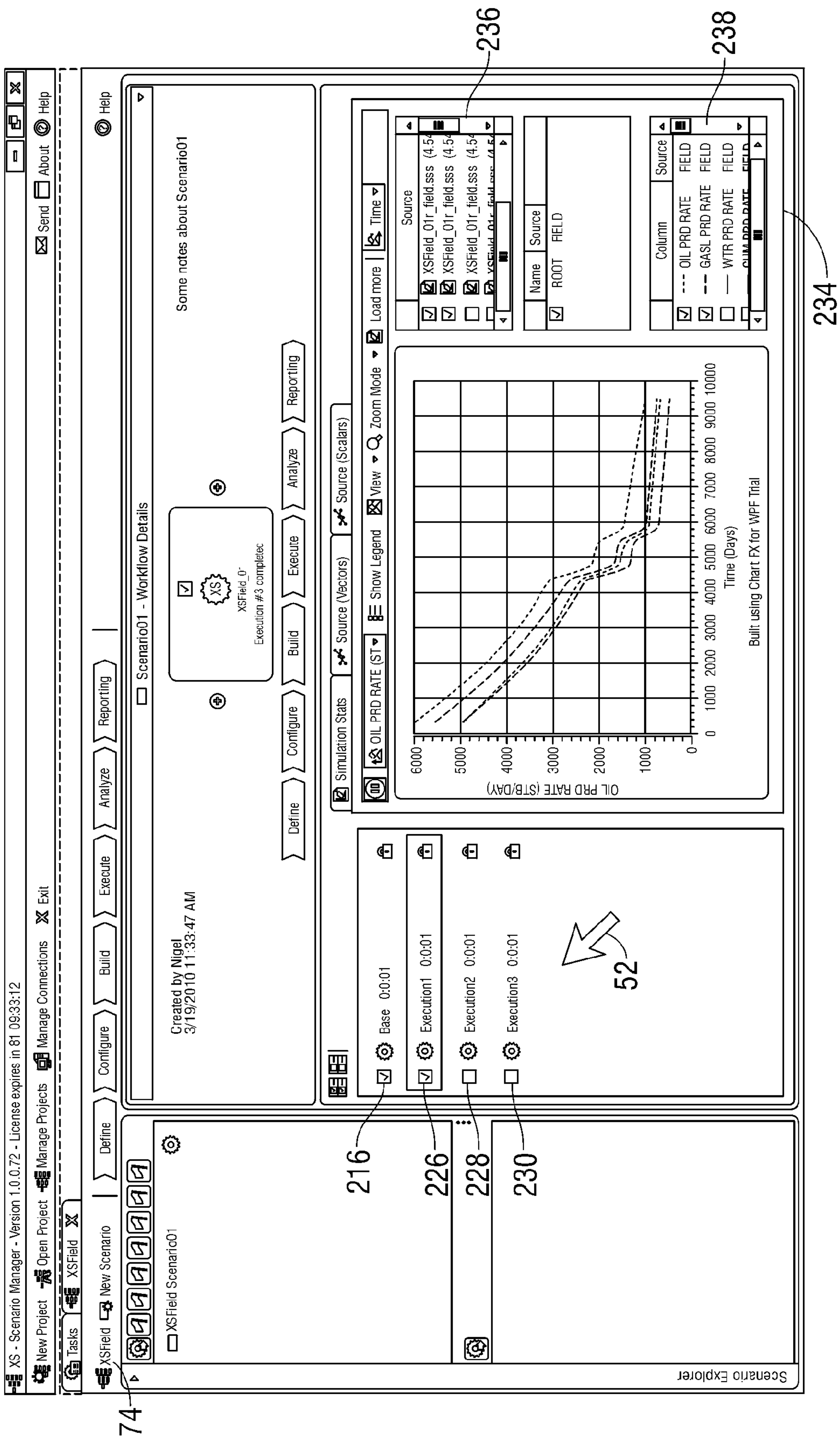
Figure 50:
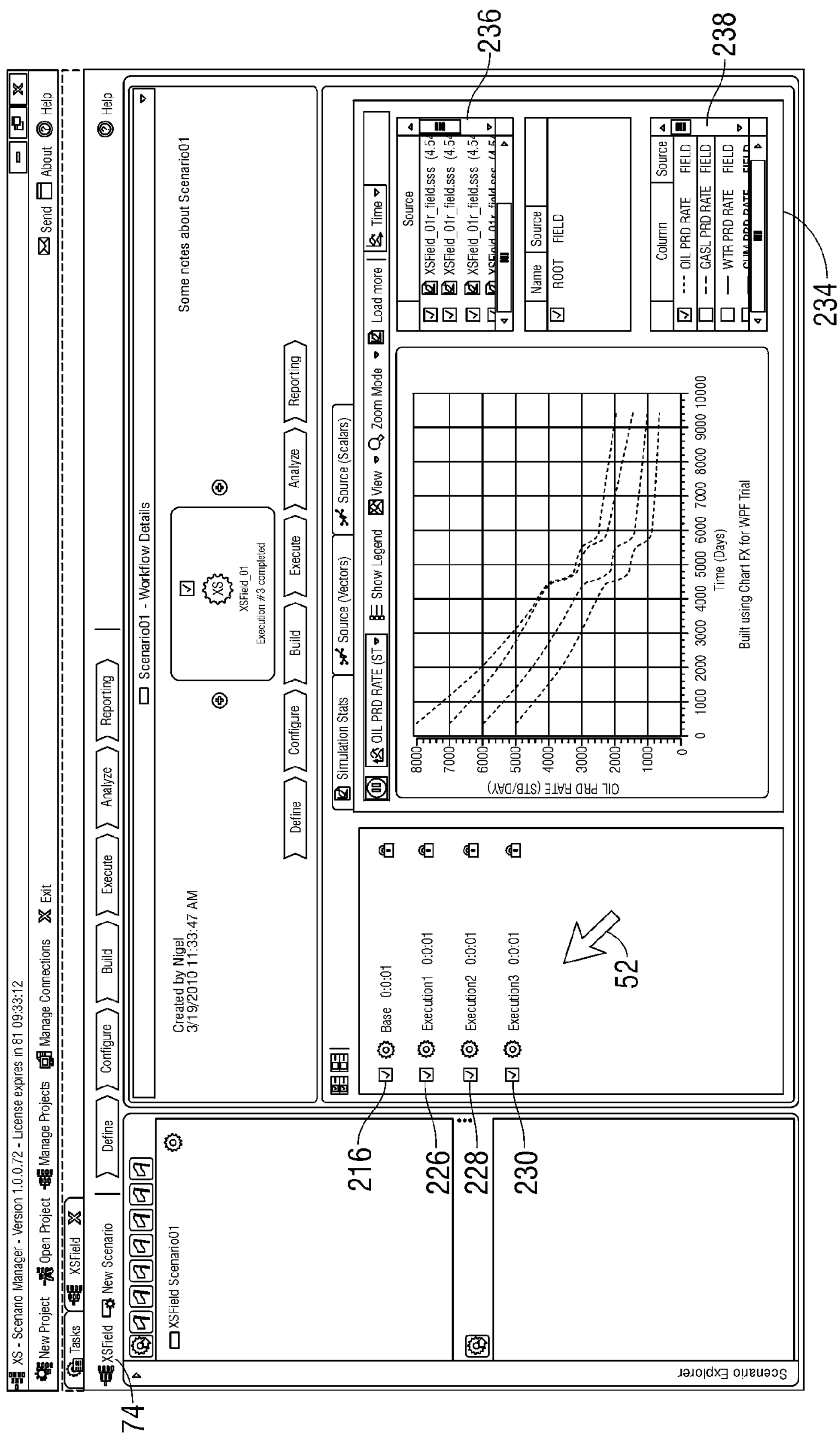

The quantity and granularity of the data displayed within result window 220 may be based upon the needs/preferences of user 40. For example, the value of two variables within a single execution (i.e., base execution 216) is shown in FIG. 5M; the value of two variables within two executions (i.e., base execution 216 and execution 226) is shown in FIG. 5N; and the value of a single variable within four executions (i.e., base execution 216, execution 226, execution 228 and execution 230) is shown in FIG. 5O.

As discussed above and as is known in the art, mathematical models (e.g., XSField_01) often contain a large quantity of variables. Accordingly, high-granularity, real-time module 16 may render data selection area 234 that allows user 40 to e.g., select the data source (using data source window 236) and the discrete variables (using discrete variable window 238) for iteratively rendering 206 within result window 220. For example: two discrete variables are shown selected (within discrete variable window 238) from a single data source in FIG. 5M; two discrete variables are shown selected (within discrete variable window 238) from two data sources in FIG. 5N; and one discrete variable is shown selected (within discrete variable window 238) from four data sources in FIG. 5O. Accordingly, through the use of data selection area 234 generally (and data source window 236 and discrete variable window 238 specifically), user 40 may have the result sets iteratively rendered 206 by high-granularity, real-time module 16 at whatever level of granularity they desire.

As discussed above, high-granularity, real-time module 16 may iteratively render 206 the result set for the various selected executions. Accordingly, the completed portions of a result set are made available to user 40 by high-granularity, real-time module 16, thus eliminating the need for user 40 to wait until the entire result set is completed before beginning to review the same. Accordingly, for tabular result sets, the tabular data will scroll across the screen as the result set is generated. Further, for graphical result sets, the graphical data will sweep across the screen as the result set is generated.

Batch-Processing Module 18:

As discussed above and as is known in the art, mathematical models (e.g., XSField_01) often contain a large quantity of variables. Further, such mathematical modeling files may be quite large (e.g., hundreds of megabytes, if not gigabytes in size) and, therefore, it may take a considerable amount of time to perform the above-described executions and generate the above-described result sets, regardless of the quantity and computational ability of the computer systems/clusters/clouds performing the computational tasks. For example, it is not uncommon for an execution and the above-described result set generation to take several days/weeks to be completed. As the computational time required to perform such executions and generate such results sets is typically purchased on an "as needed" basis, not only does a bad result set waste time, but it also wastes money.

Figure 6:
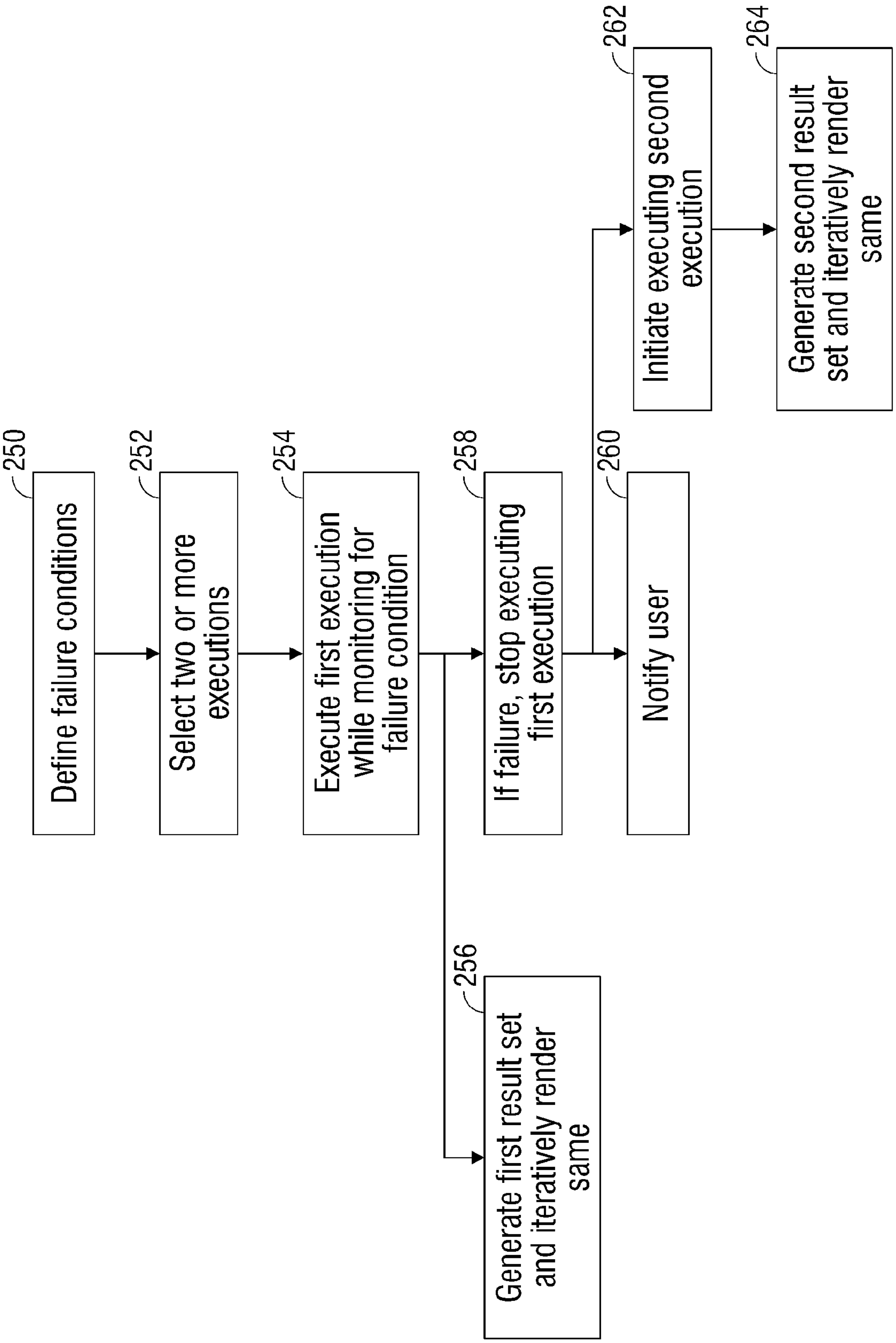
FIG. 6 is a flow chart of the batch processing module of FIG. 2.

As discussed above and referring also to FIG. 6, data analysis process 10 may include a plurality of modules, an example of which may include batch processing module 18. Batch processing module 18 may be configured to perform operations including allowing a user to define 250 one or more failure conditions. Batch processing module 18 may allow user 40 to select 252 two or more executions from a plurality of available executions based upon an oil field modeling file, thus defining two or more selected executions. Batch processing module 18 may execute 254 a first of the two or more selected executions while monitoring for the occurrence of the one or more failure conditions.

For example and referring again to FIG. 5K, user 40 may define 250 one or more failure conditions for e.g., one or more of the discrete variables listed within discrete variable window 238. Examples of the types of failure condition may include but are not limited to: exceeding a high limit and falling below a low limit. Combination failures may also be indicated, such as a failure being defined as variable "A" exceeding "X" while variable "B" falling below Y". User 40 may set these limits via e.g., limit pop up menu 240 that may be rendered by batch processing module 18 when user 40 "right clicks" on their pointing device.

Once these failure conditions are defined, batch processing module 18 may render failure reaction menu 242 (e.g., when user 40 "right clicks" on their pointing device) that allows user 40 to define the manner in which batch processing module 18 reacts to the occurrence of such a failure condition.

As discussed above, user 40 may select 252 several executions (e.g., execution 226, execution 228, execution 230) using onscreen pointer 52 for execution. Once selected, batch processing module 18 may execute 254 a first (e.g., execution 226) of the selected execution sequence (e.g., executions 226, 228, 230) while monitoring for the occurrence of the one or more failure conditions defined 250 above.

In the absence of the occurrence of one of the above-described failure conditions while processing execution 226, batch processing module 18 may generate 256 a result set based upon the e.g., execution 226. As discussed above, this result set may be iteratively rendered as it is generated. Accordingly, the completed portions of the result set for e.g., execution 226 may be made available to user 40 by batch processing module 18, thus eliminating the need for user 40 to wait until the entire result set is completed before beginning to review the same. Accordingly, for tabular result sets, the tabular data will scroll across the screen as the result set is generated. Further, for graphical result sets, the graphical data will sweep across the screen as the result set is generated.

In the event that one of the above-described failure conditions occurs with respect to execution 226, batch processing module 18 may react in accordance with the manner defined within failure reaction menu 242. For example, in the event of the occurrence of the one or more failure conditions, batch processing module 18 may: stop 258 the execution of e.g., execution 226; notify 260 user 40 of the occurrence of the failure condition with respect to execution 226; and/or initiate execution 262 of the next execution in the execution sequence (e.g., execution 228).

When processing execution 228, in the absence of the occurrence of one of the above-described failure conditions, batch processing module 18 may generate 264 a result set based upon e.g., execution 228. As discussed above, this result set may be iteratively rendered as it is generated. Accordingly, the completed portions of the result set for e.g., execution 228 may be made available to user 40 by batch processing module 18, thus eliminating the need for user 40 to wait until the entire result set is completed before beginning to review the same. Accordingly, for tabular result sets, the tabular data will scroll across the screen as the result set is generated. Further, for graphical result sets, the graphical data will sweep across the screen as the result set is generated.

In the event that one of the above-described failure conditions occurs with respect to execution 228, batch processing module 18 may react in accordance with the manner defined within failure reaction menu 242 until the entire execution sequence (in this example, executions 226, 228, 230) is processed.

Version Explorer Module 20:

As discussed above, while multi-threaded copying module 12 was described above as allowing a user (e.g., user 40) to copy an oil field modeling file into a newly-created scenario (e.g., scenario 72), this was for illustrative purposes only and was not intended to be a limitation of this disclosure, as other configurations are possible and are considered to be within the scope of this disclosure.

For example, the identified portion to be copied may be a scenario (e.g., scenario 72) of the oil field modeling file (as defined within the above-referenced project) and the copied portion may be a child of the scenario of the oil field modeling file (as will be discussed later). Further, the identified portion may be an execution of a scenario of the oil field modeling file (as defined within the above-referenced project) and the copied portion may be a child of the execution of the oil field modeling file (as will be discussed later).

Figure 7:
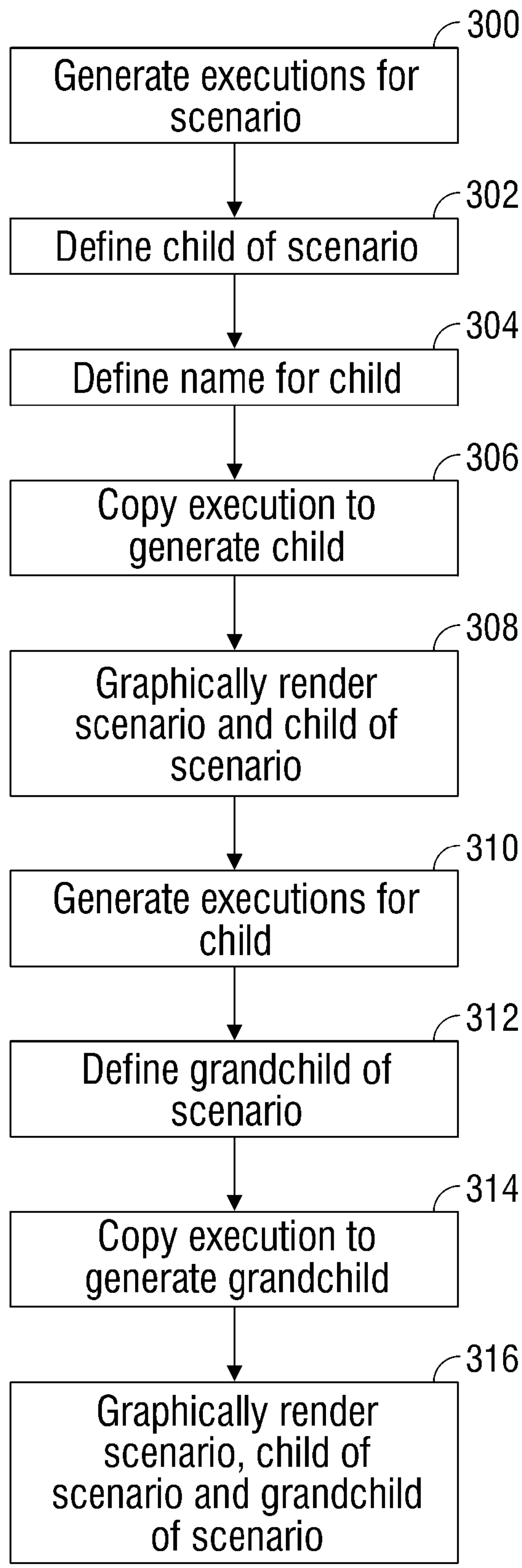
FIG. 7 is a flow chart of the version explorer module of FIG. 2.

As discussed above and referring also to FIG. 7, data analysis process 10 may include a plurality of modules, an example of which may include version explorer module 20. Version explorer module 20 may be configured to perform operations including generating 300 one of more executions of a scenario concerning an oil field modeling file. Version explorer module 20 may define 302 one of the one or more executions of the scenario as a child of the scenario, wherein one or more values are associated with one or more variables included within the child of the scenario. Version explorer module 20 may graphically render 304 the scenario and the child of the scenario.

Figure 7A:
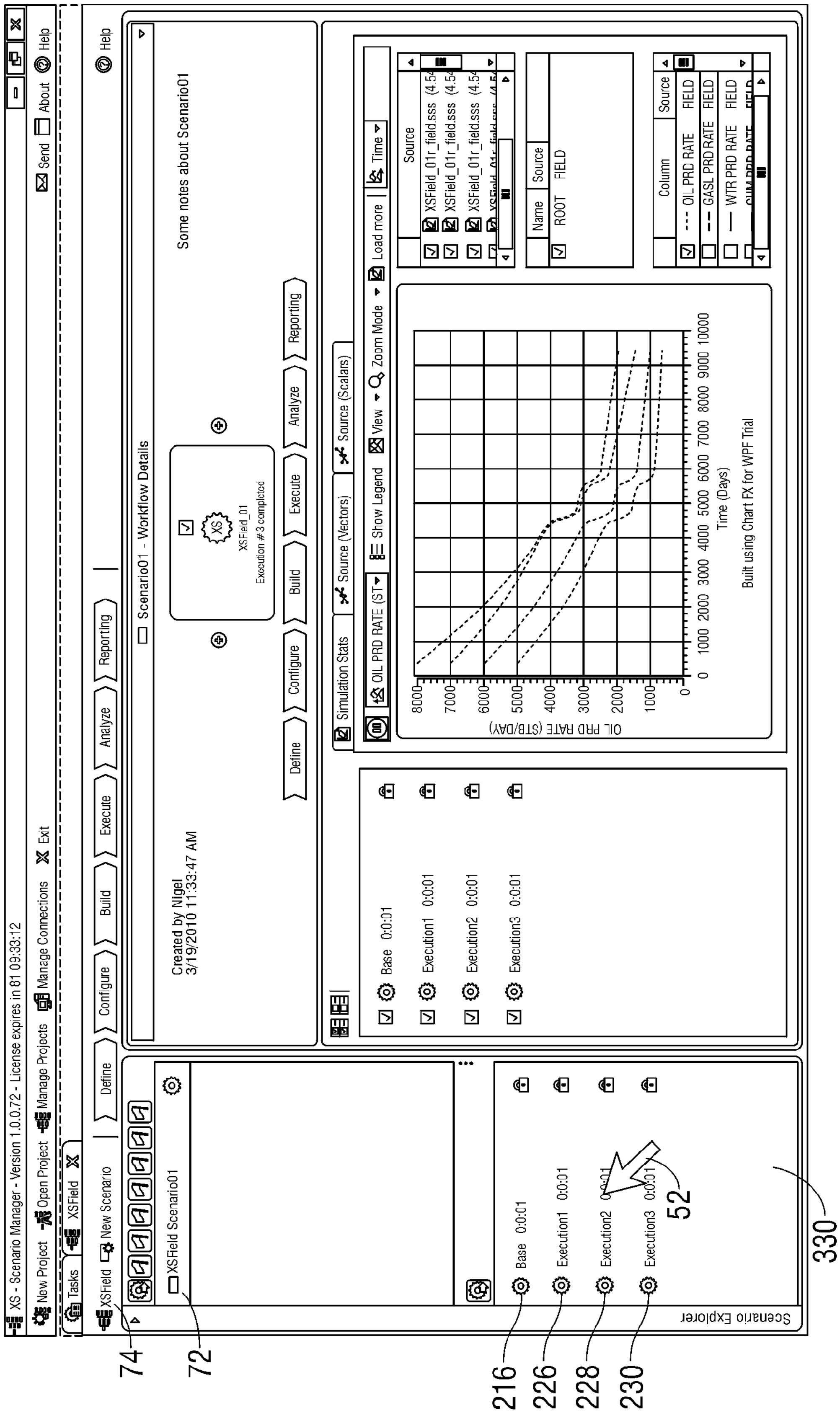
FIGS. 7A-7U are various screenshots rendered by the version explorer module of FIG. 7.
Figure 7B:
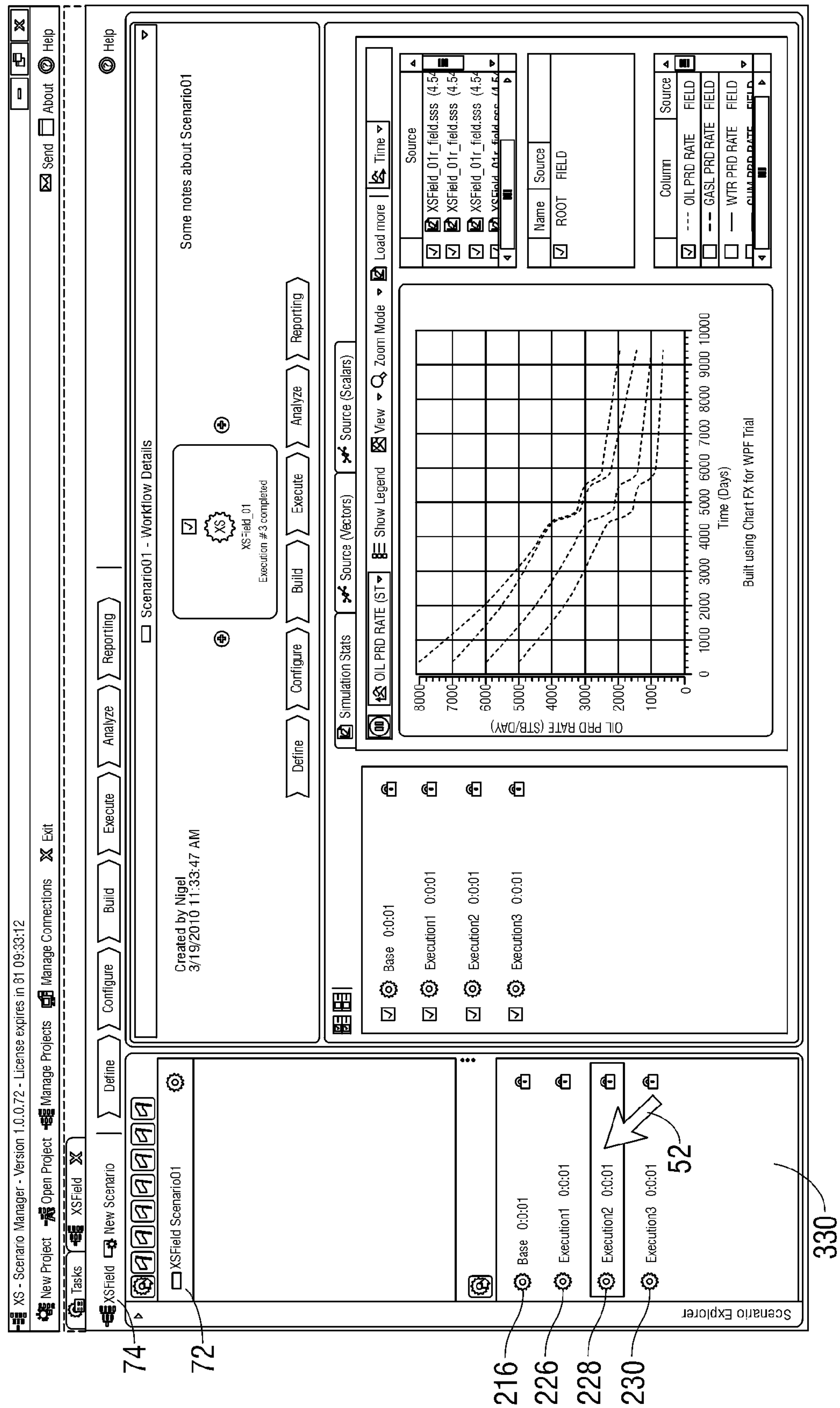
Figure 7C:
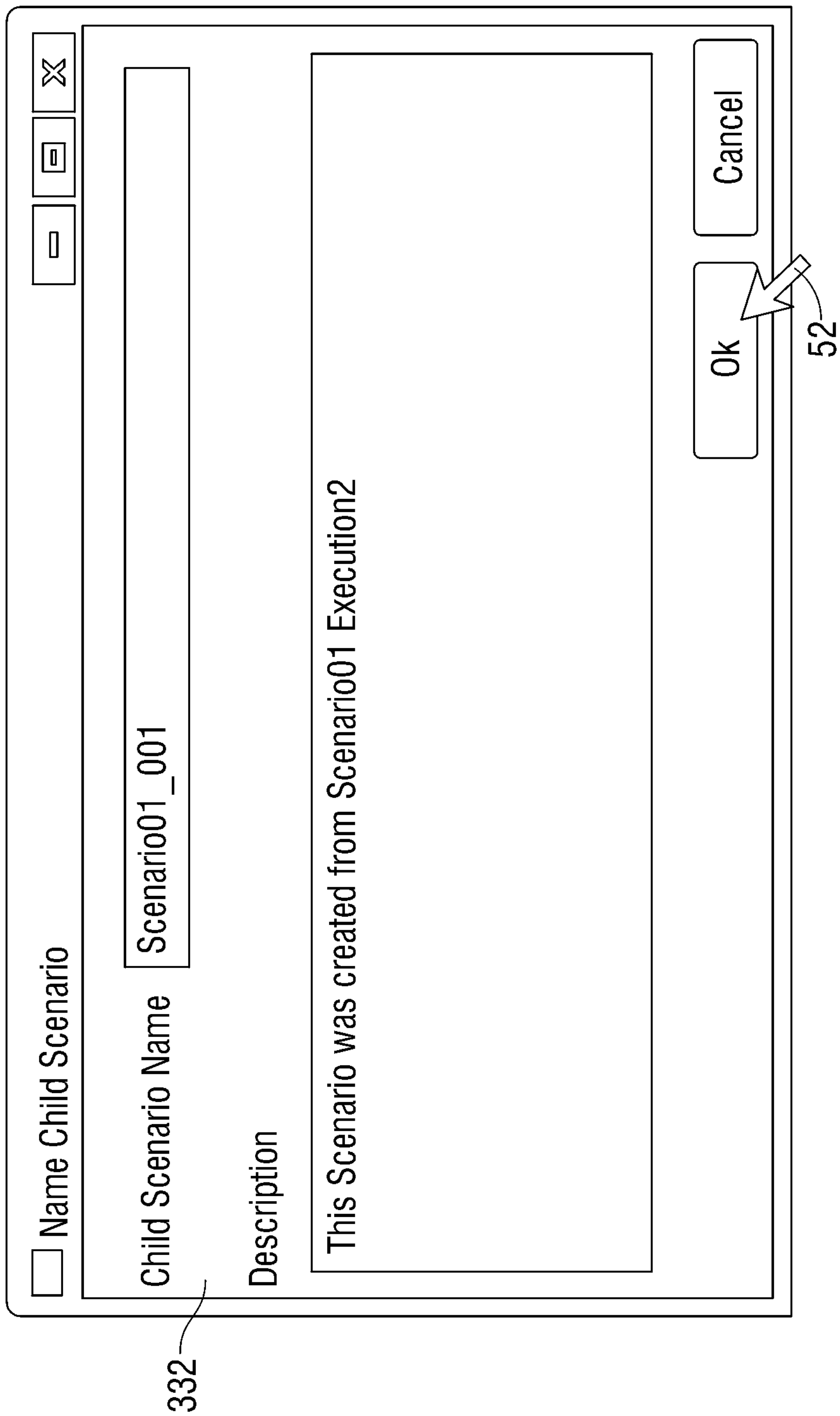
Figure 7D:
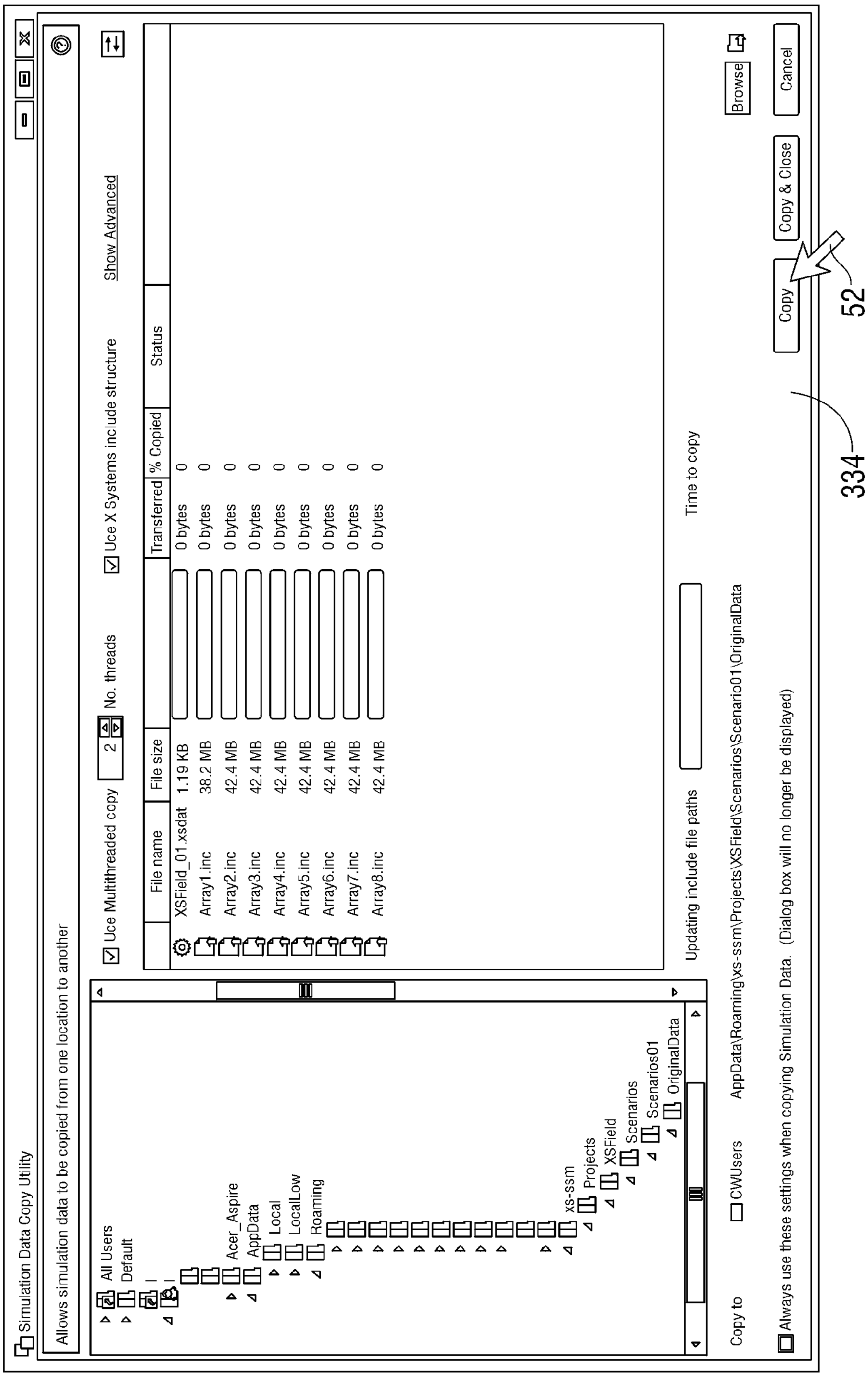

Continuing with the above-stated example and referring also to FIGS. 7A-7B, version explorer module 30 may allow user 40 to review the executions previously generated 300 concerning the oil field modeling file (e.g., XSField_01), as itemized within executions window 330 that was rendered by version explorer module 30. Specifically, version explorer module 30 may allow user 40 to define 302 an execution (e.g., execution 228) that user 40 wishes to make a child of e.g., scenario 72. For example and referring also to FIG. 7C, once an execution (e.g., execution 228) is defined 302, version explorer module 20 may render naming window 332 that allows user 40 to define 306 a file name (e.g., "Scenario01_001") for the child of scenario 72. Once a name for the child of scenario 72 is defined 306, user may select the "Ok" button using onscreen pointer 52. Upon selecting okay and referring also to FIG. 7D, version explorer module 20 may render copy window 334, wherein user 40 may select the "copy" button and version explorer module 20 may copy 308 execution 228 to generate the child of scenario 72. When copying 308 execution 228 to generate the child 336 of scenario 72, the copy procedure may be performed in a multi-threaded fashion similar to that described above concerning the initial generation of scenario 72.

Figure 7E:
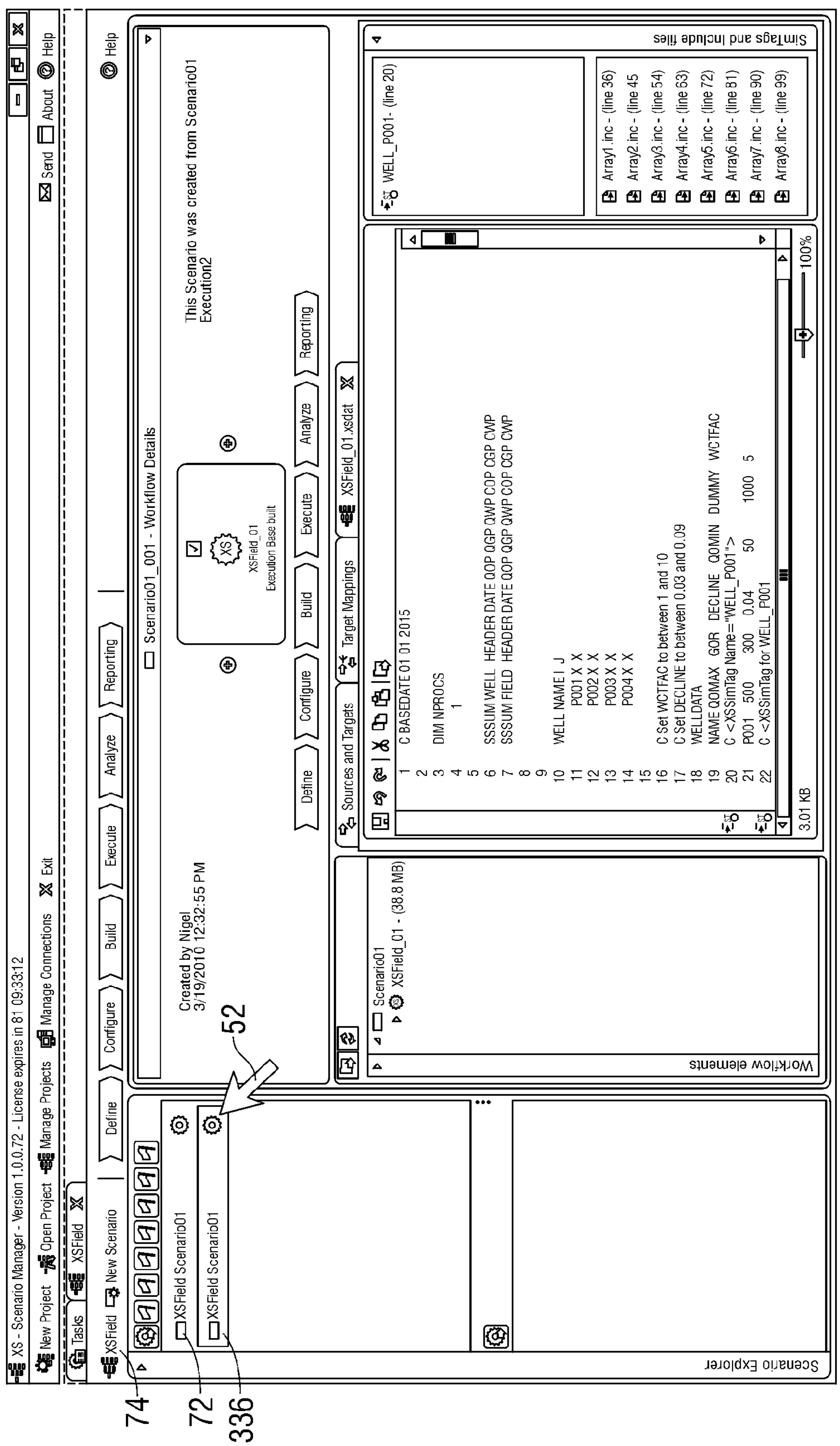
Figure 7F:
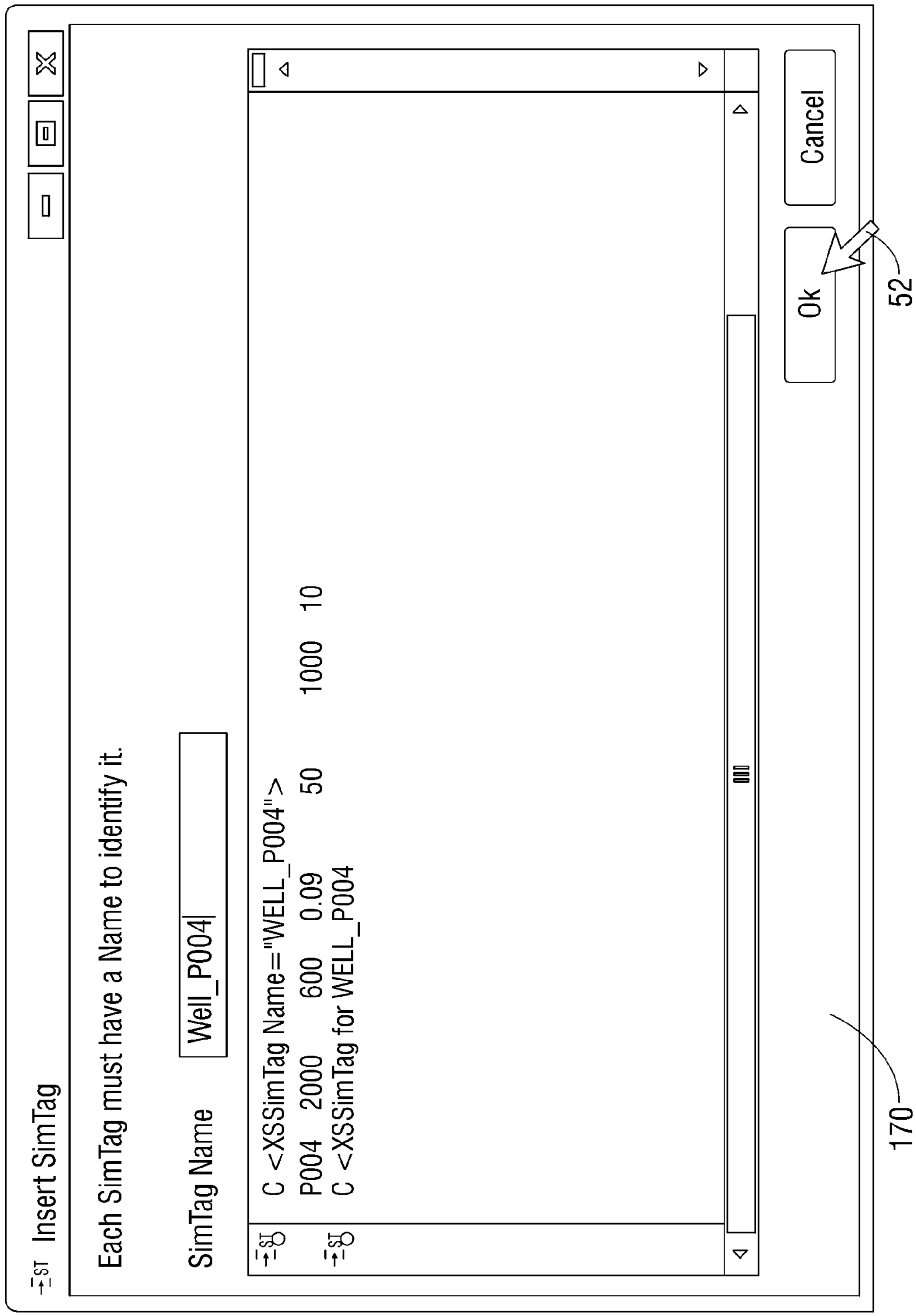
Figure 7G:
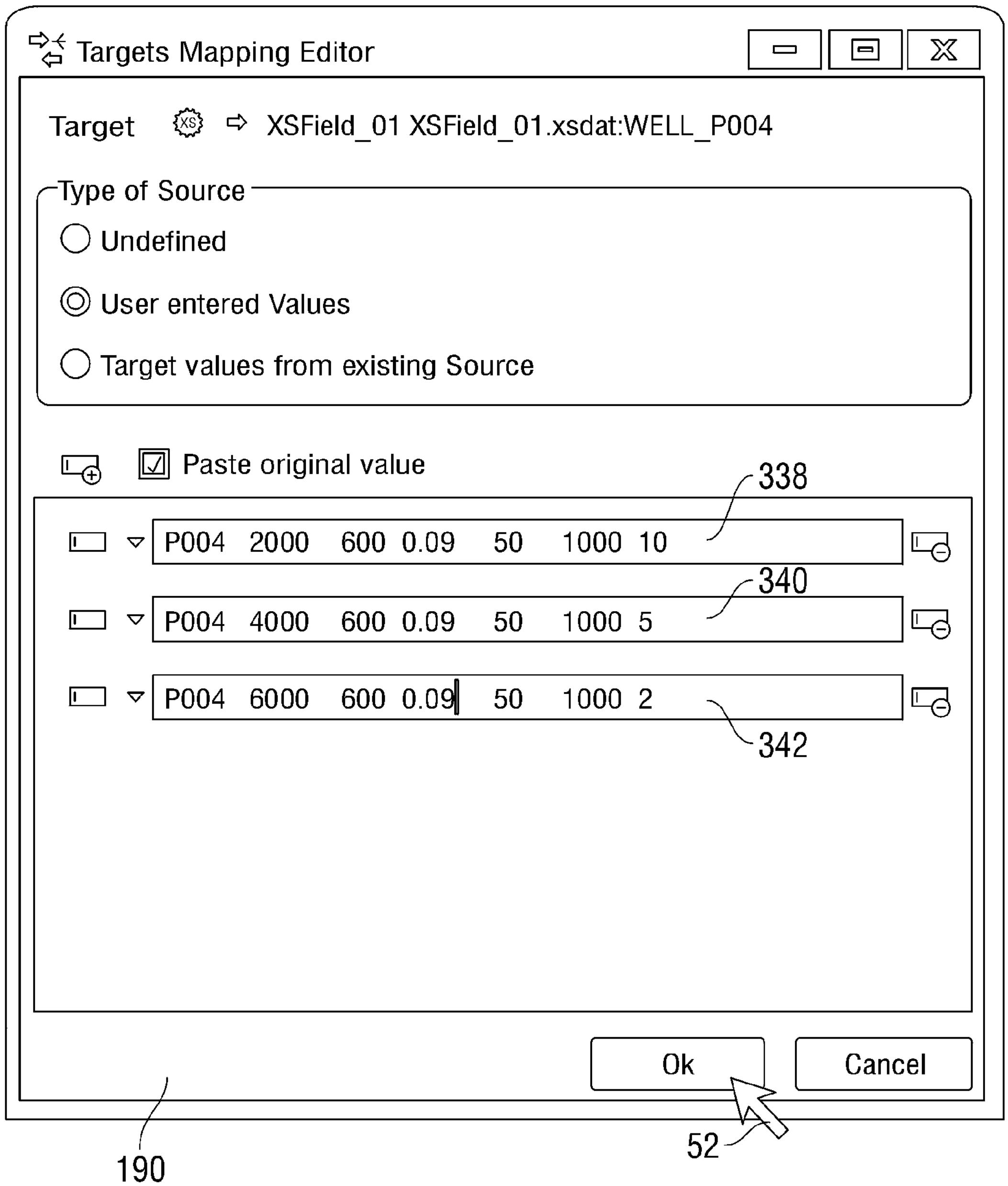
Figure 7H:
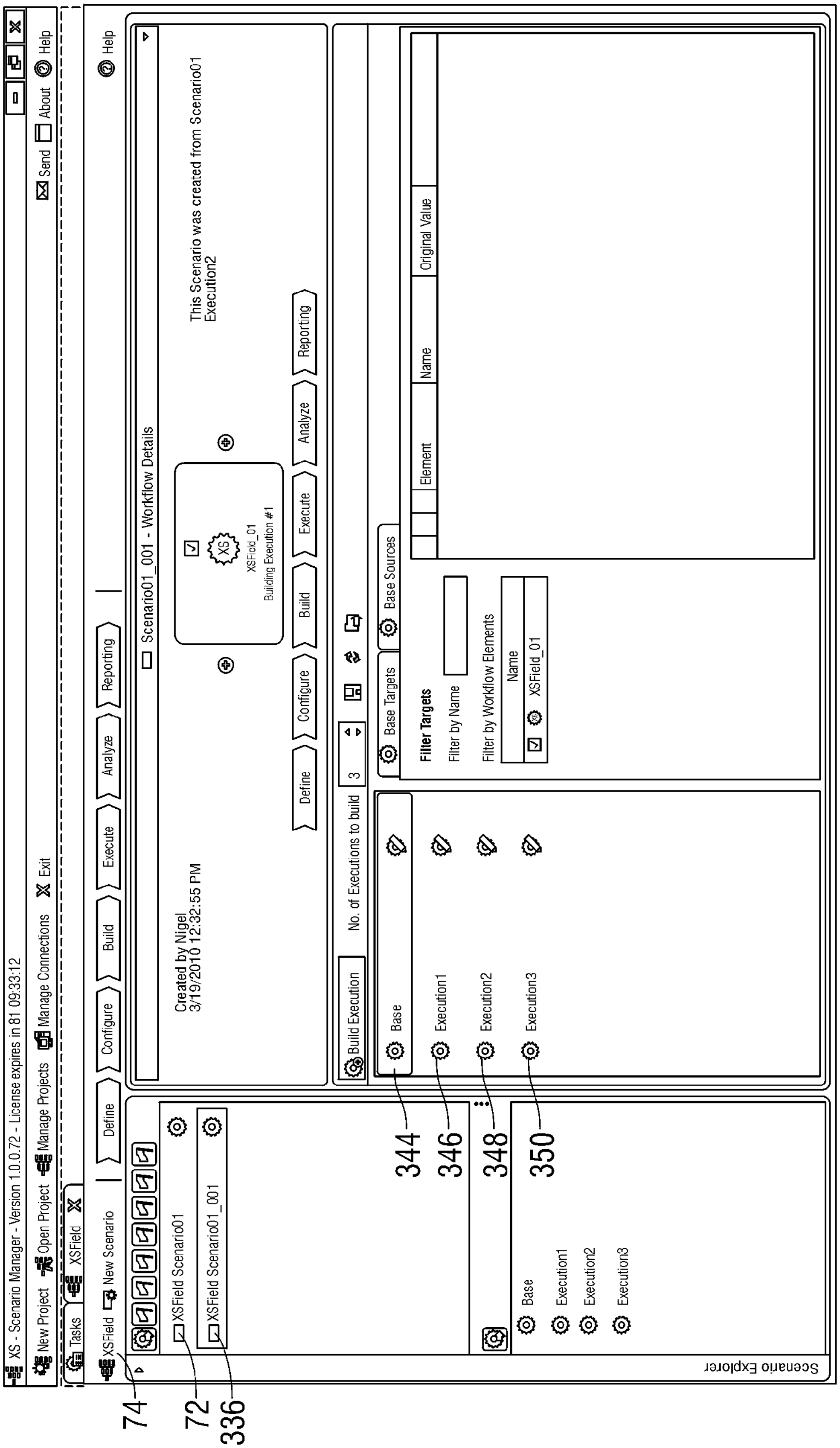
Figure 7I:
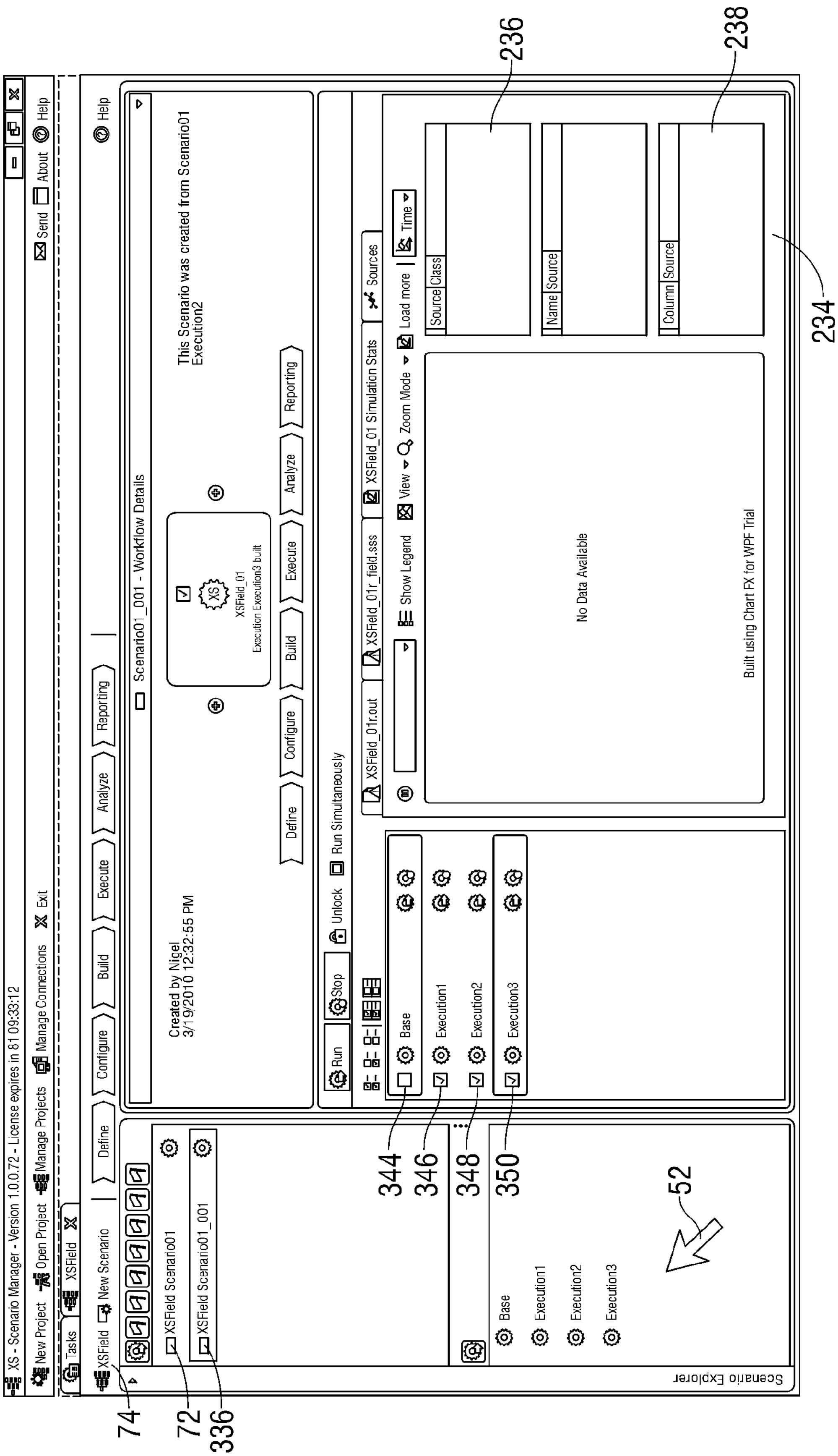
Figure 7J:
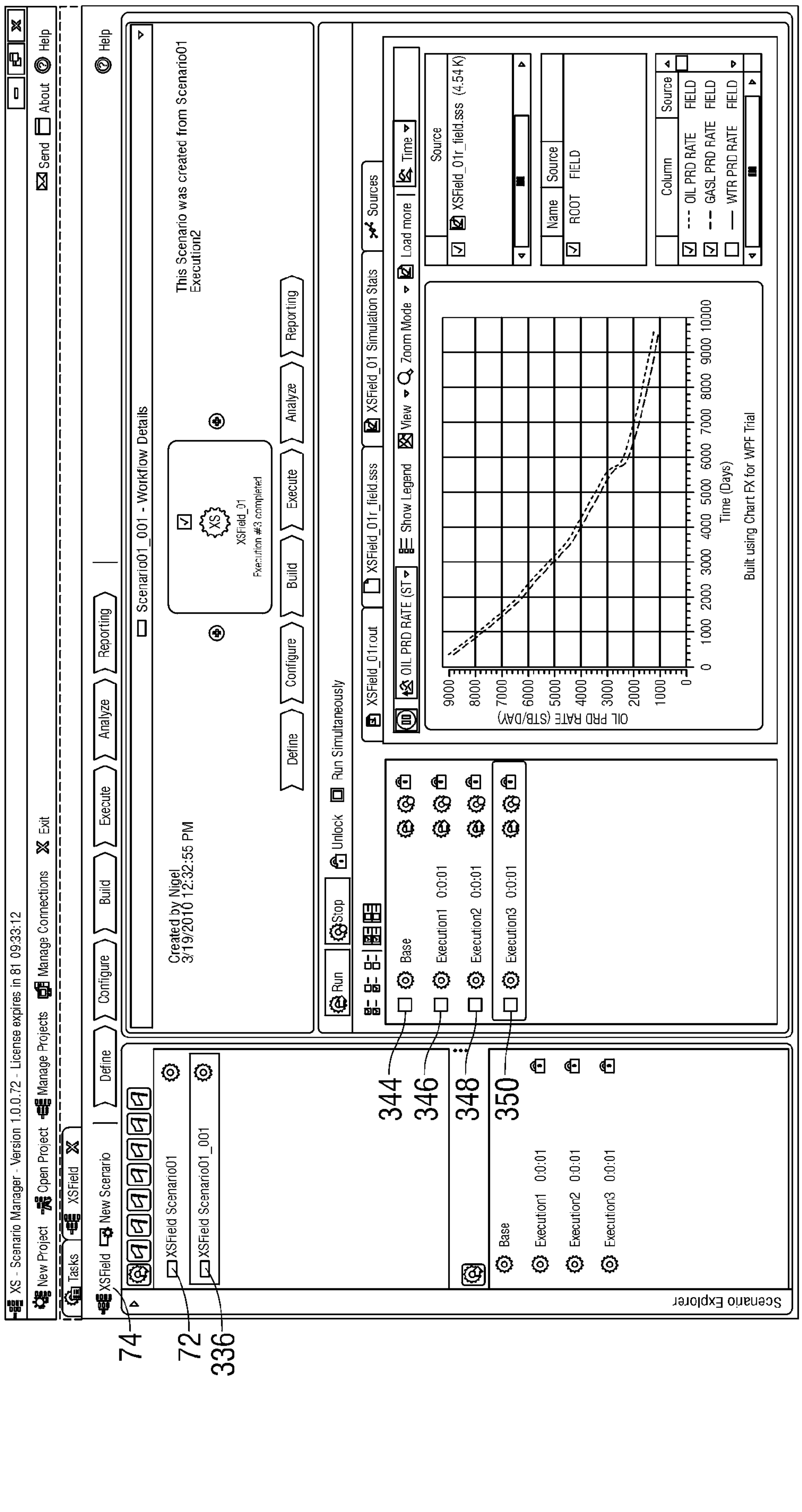
Figure 7K:
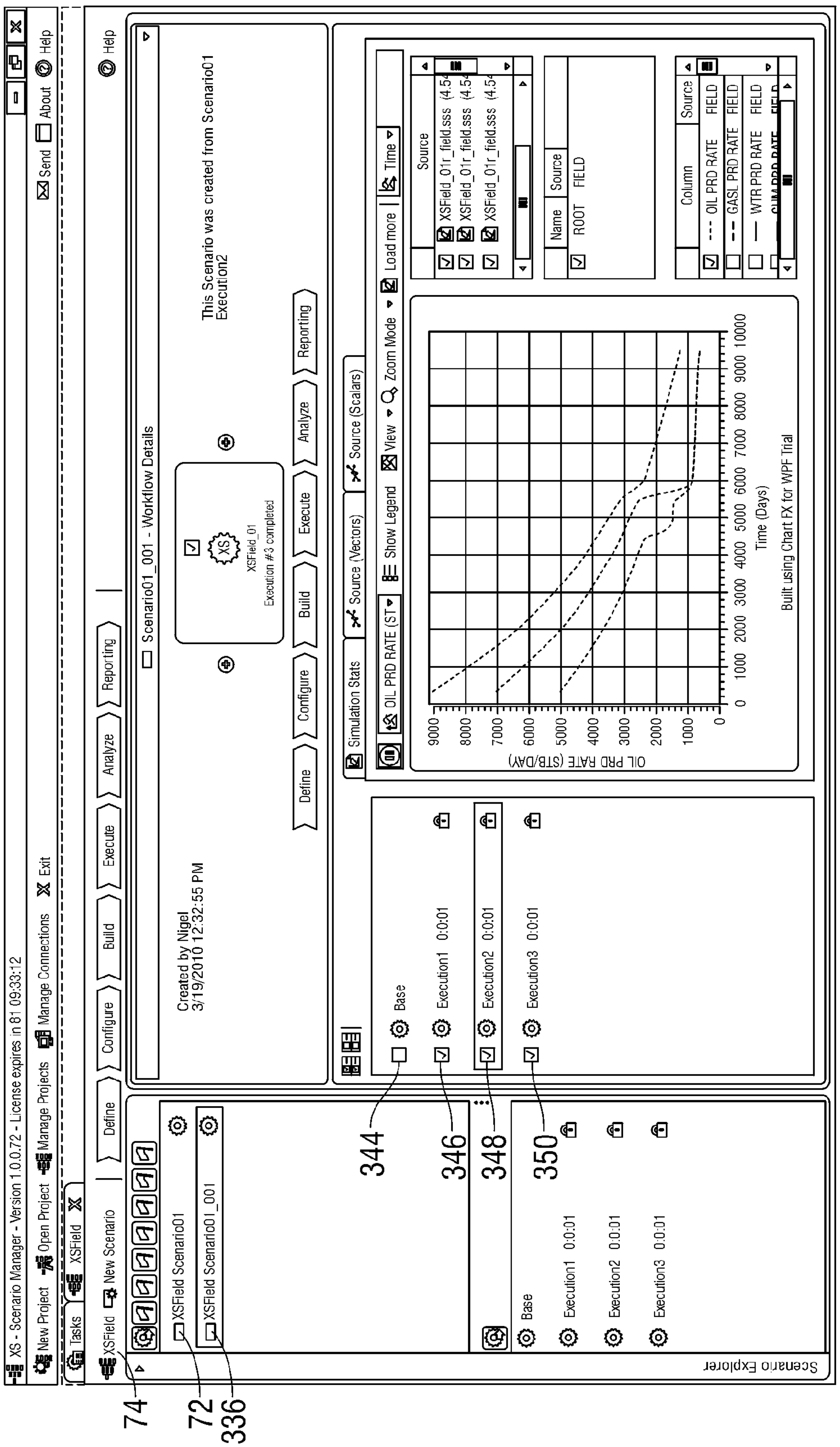

As described above with respect to the manner in which executions 216, 226, 228, 230 were generated based upon scenario 72, version explorer module 20 may allow user 40 to generate 310 various executions that are based upon child 336 of scenario 72. For example, FIG. 7E-7G show the manner in which version explorer module 20 may render comment generation window 170, which may allow user 40 to insert comment data and define a name (e.g., "WELL_P004") for the comment data inserted. Version explorer module 20 may also render comment detail window 190 for comment data "WELL_P004". In this particular example, user 40 provided three sets of unique values (e.g., values 338, 340, 342) for the variables associated with comment data "WELL_P004". Accordingly, version explorer 302 may allow user 40 to insert comment data into child 336 of scenario 72 to define a plurality of values for variables included within child 336 of scenario 72.

FIGS. 7H-7K illustrate the manner in which version explorer module 20 may allow user 40 to generate 310 various executions (e.g., base execution 344, execution 346, execution 348, execution 350) that are based upon child 336 of scenario 72.

Figure 7L:
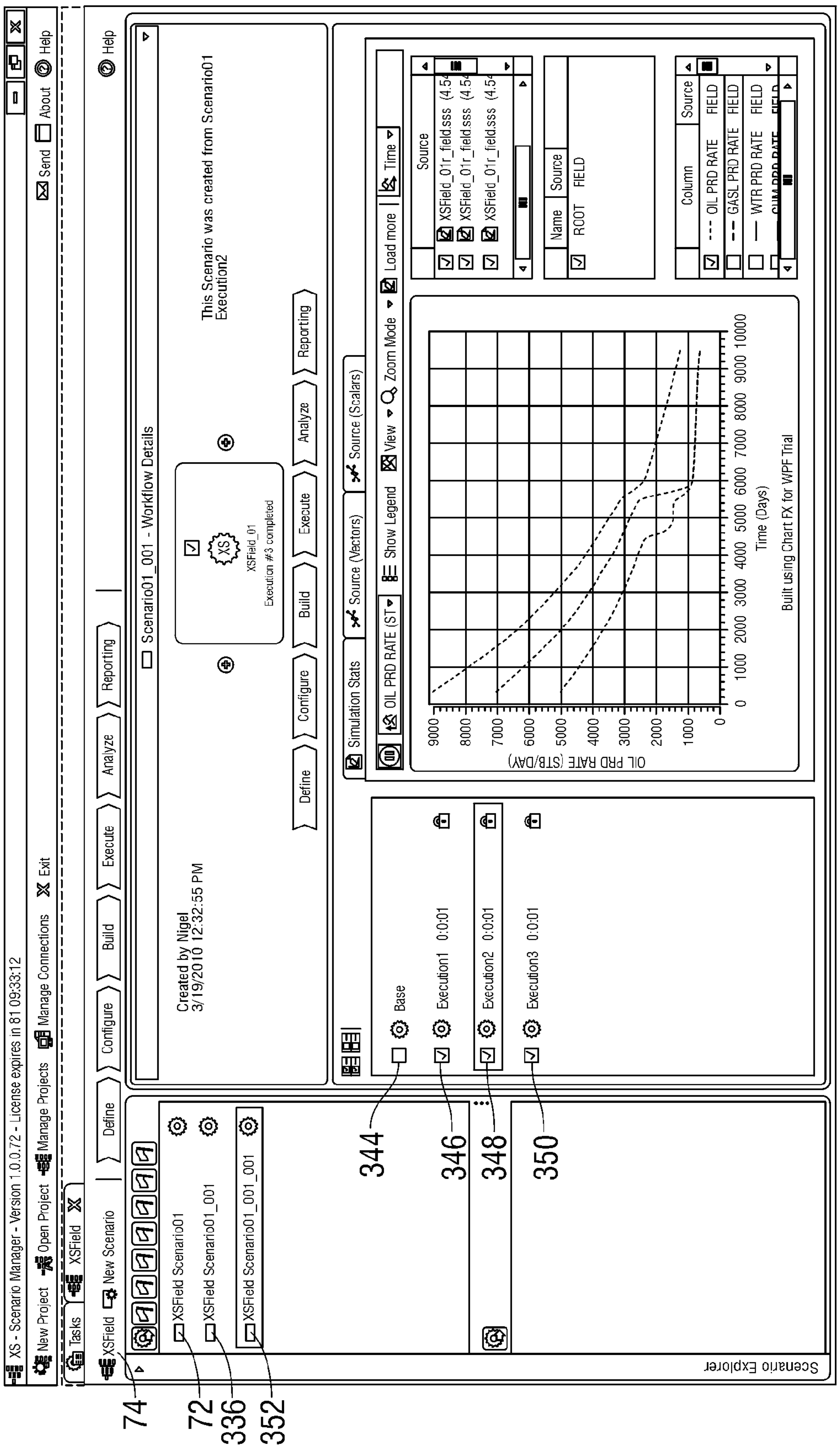
Figure 7M:
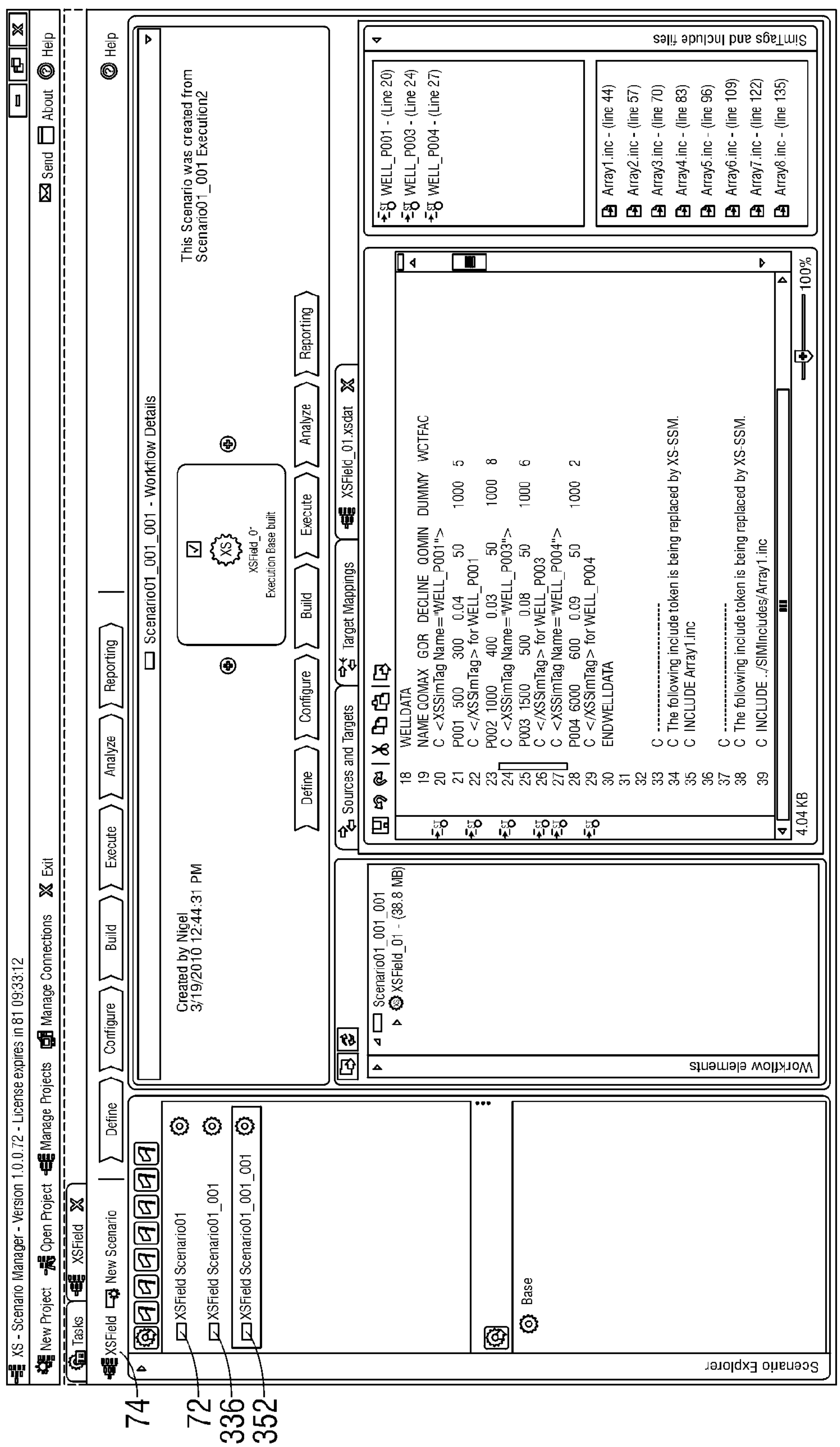

Referring also to FIG. 7L-M, version explorer module 20 may allow user 40 to define 312 one or more executions (e.g., execution 348) chosen from the executions (e.g., base execution 344, execution 346, execution 348, execution 350) of child 336 of scenario 72 as grandchild 352 of scenario 72 (i.e., a child of child 336 of scenario 72).

Once the execution (e.g., execution 348) is defined, version explorer module 20 may allow user 40 to define a file name (e.g., "Scenario01_001_001") for grandchild 352 of scenario 72 and copy 314 execution 348 to generate grandchild 352 of scenario 72. When copying 314 execution 348 to generate grandchild 352 of scenario 72, the copy procedure may be performed in a multi-threaded fashion similar to that described above concerning the initial generation of scenario 72.

Figure 7N:
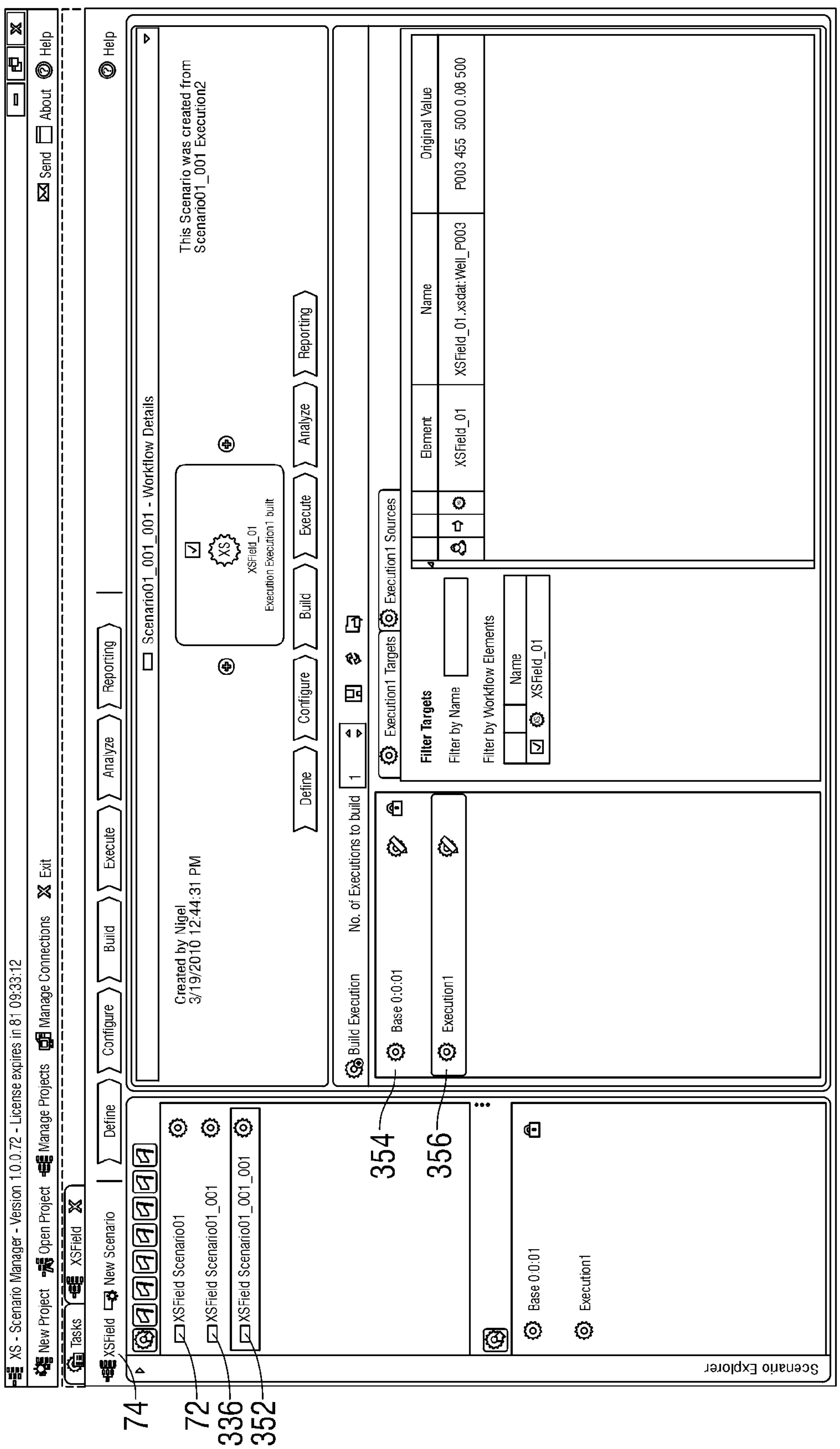
Figure 70:
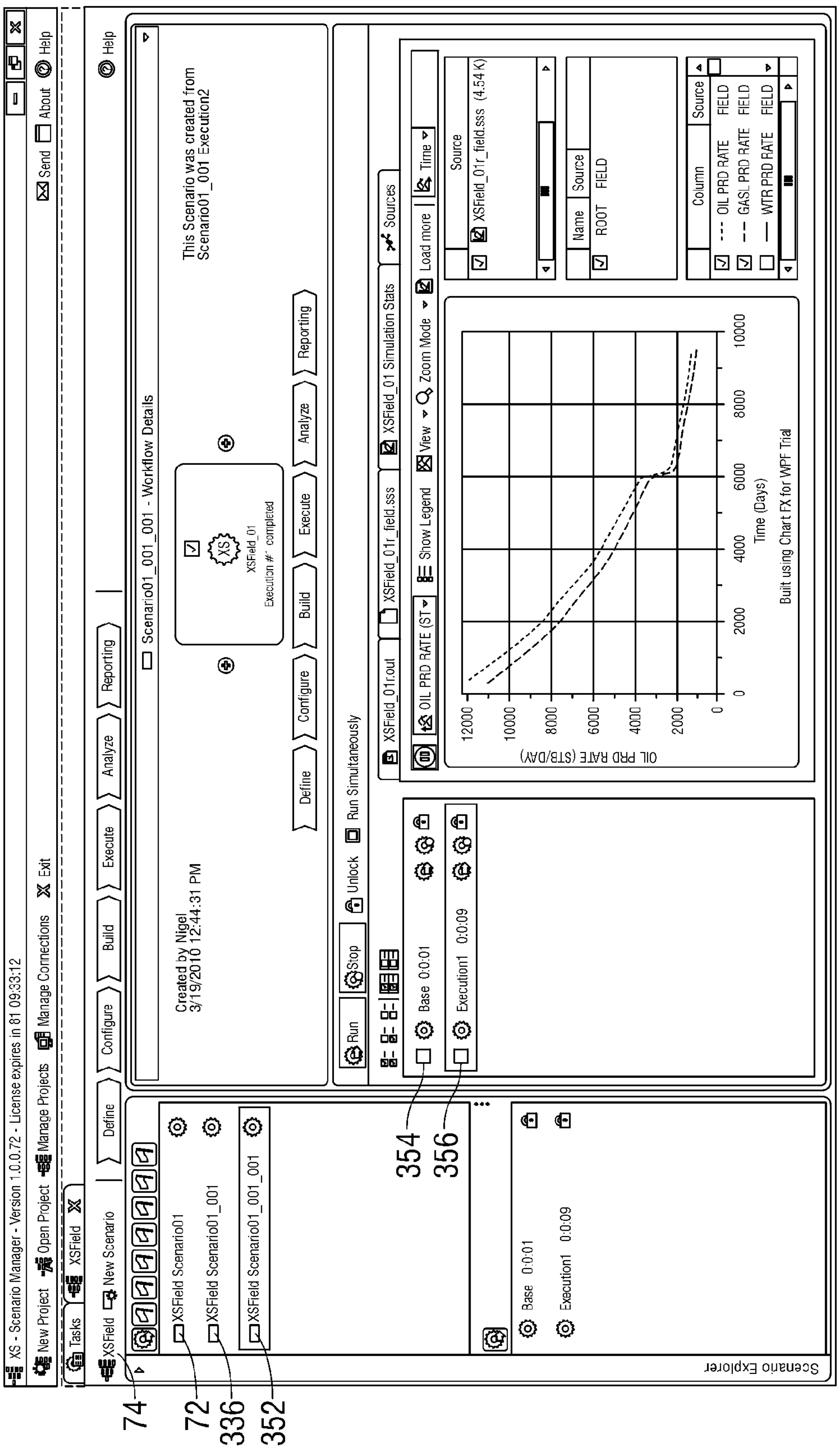
Figure 7P:
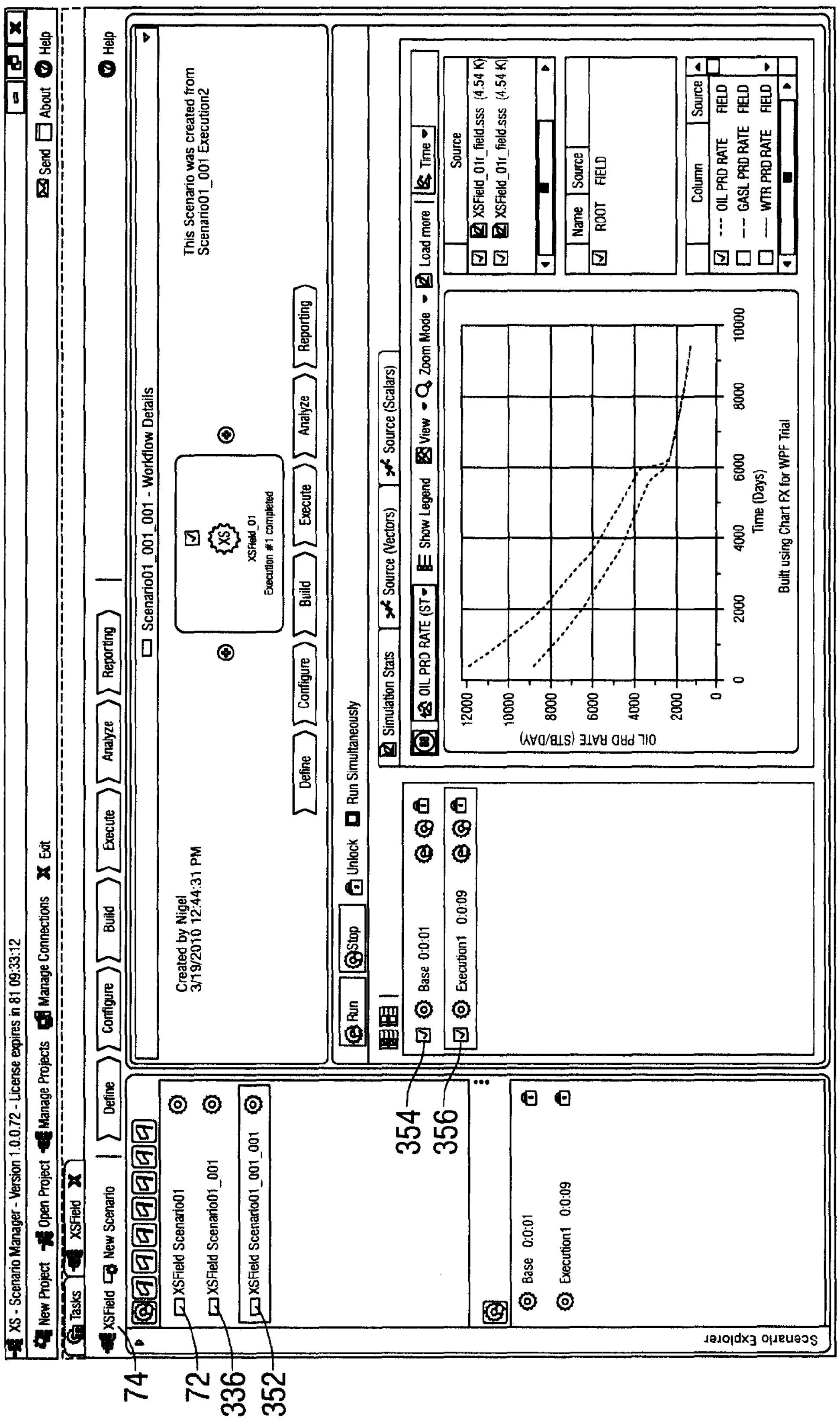

Version explorer module 20 may graphically render 316 scenario 72, child 356 of scenario 72, and grandchild 352 of scenario 72. Version explorer module 20 may allow user 40 to provide one or more unique values for the variables included within grandchild 352, which may result in a plurality of unique executions (e.g., base execution 354, execution 356) based upon grandchild 352 of scenario 72, as shown in FIGS. 7N-7P.

Figure 7Q:
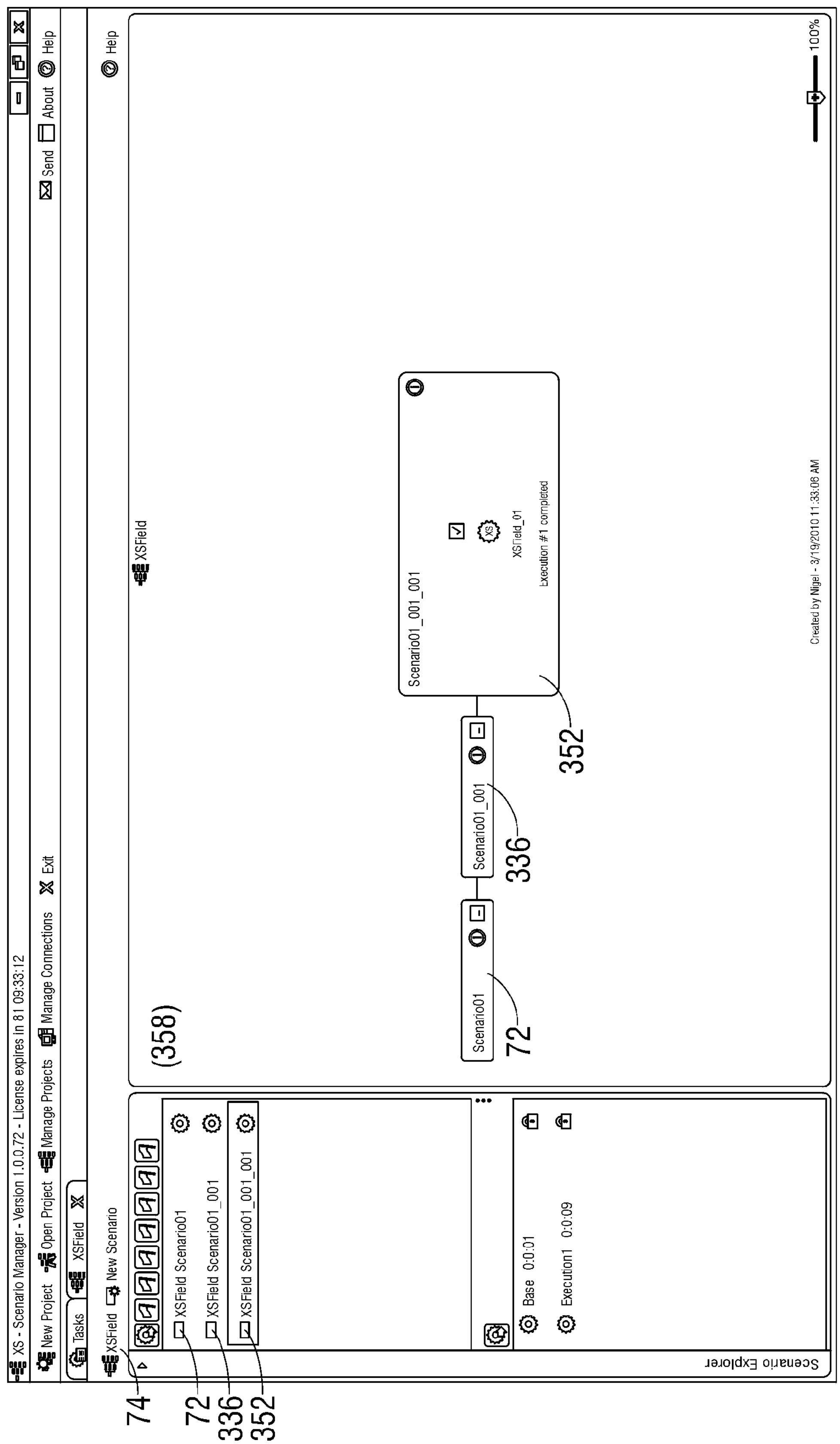

As discussed above, version explorer module 20 may graphically render the various scenarios (e.g., scenario 72), the various children (e.g., child 336 of scenario 72), and the various grandchildren (e.g., grandchild 352 of scenario 72). Referring also to FIG. 7Q, version explorer module 20 may graphically render the various scenarios (e.g., scenario 72), the various children (e.g., child 336 of scenario 72), and the various grandchildren (e.g., grandchild 352 of scenario 72) in the form of directory tree 358 that may allow user 40 to quickly discern the familial relationship between objects.

Figure 7R:
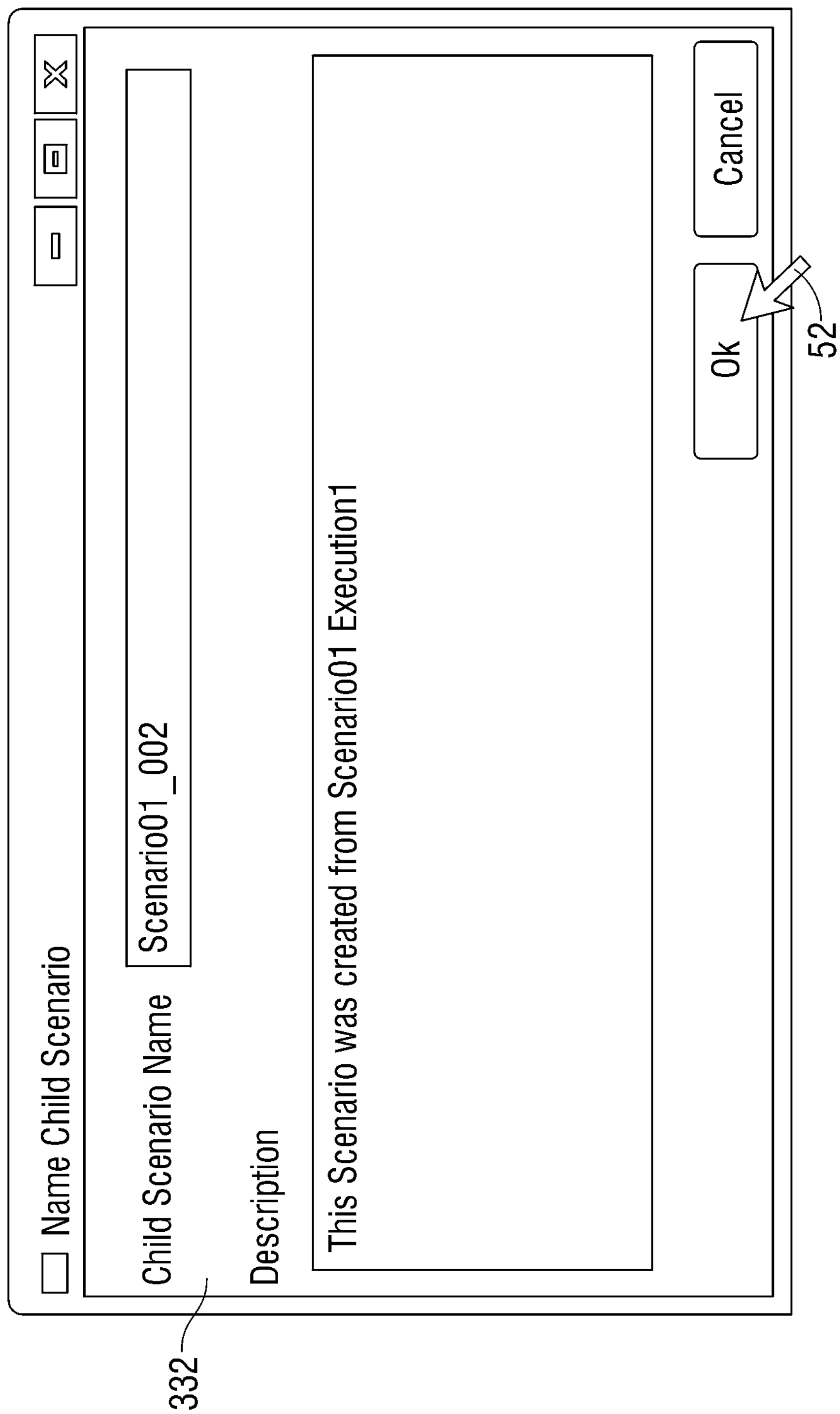
Figure 7S:
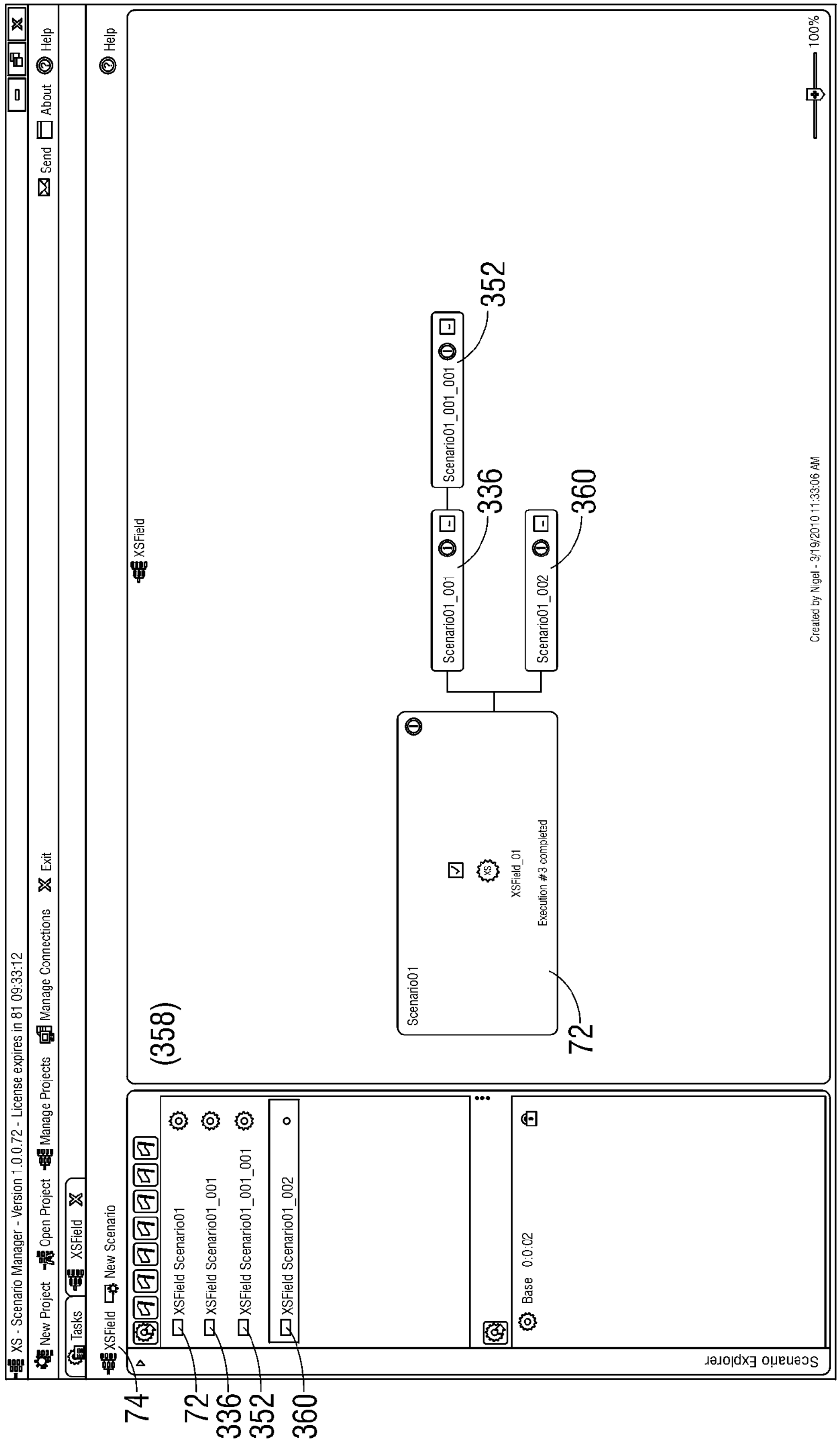
Figure 7T:
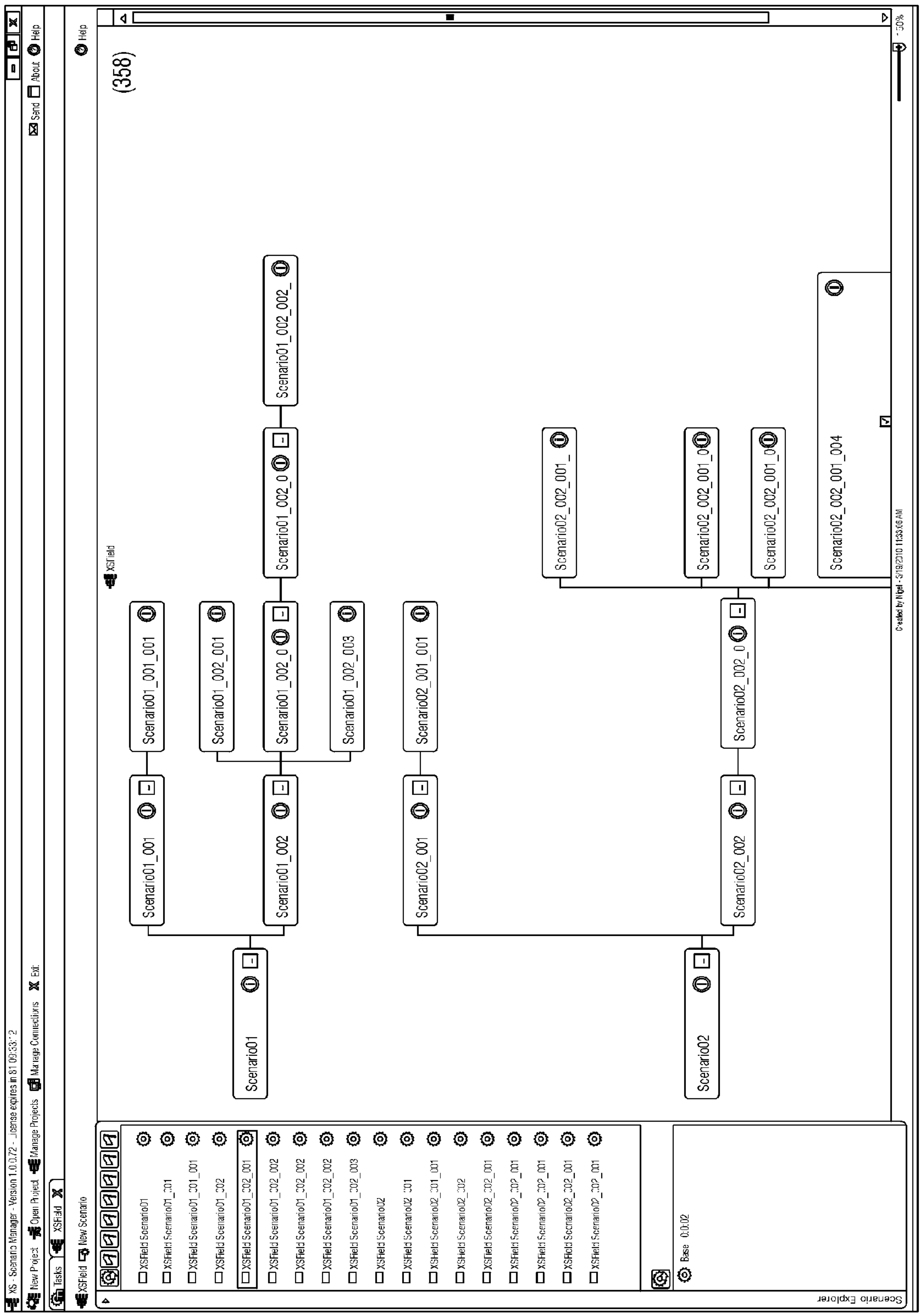
Figure 7U:
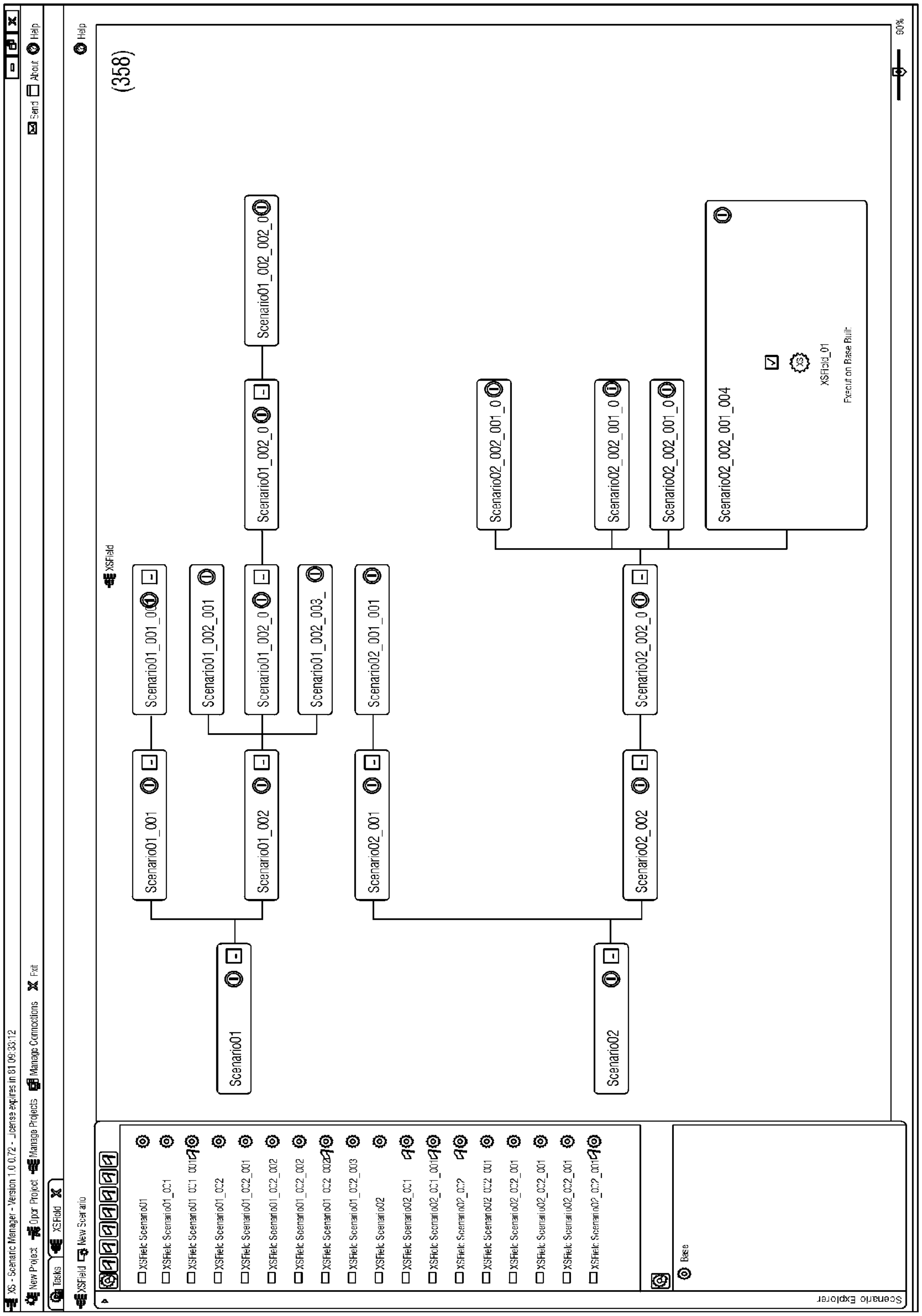

Referring also to FIGS. 7R-7S, version explorer module 20 may allow user 40 to generate additional root level scenarios (e.g., scenario 360) via naming window 332 rendered by version explorer module 20. Further, version explorer module 20 may be configured to allow user 40 to zoom out to get a broader view of directory tree 358 (as shown in FIG. 7T) or zoom in to get a more detailed view of directory tree 358 (as shown in FIG. 7U).

Figure 8:
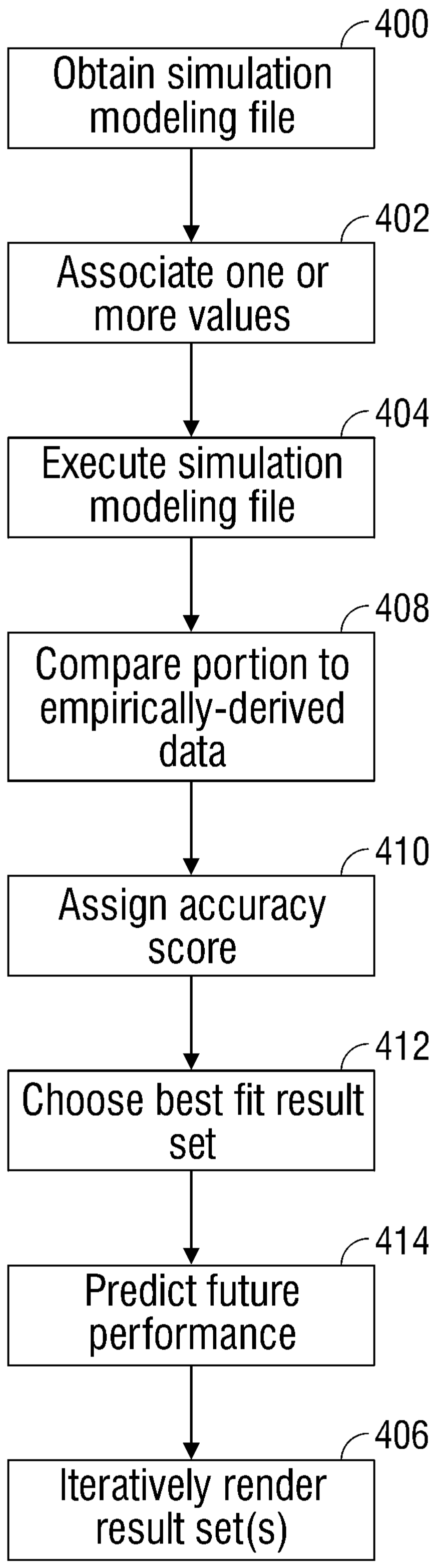
FIG. 8 is a flow chart of the future prediction module of FIG. 2.

Future Prediction Module 22:

As discussed above and referring also to FIG. 8, data analysis process 10 may include a plurality of modules, an example of which may include future prediction module 22. Future prediction module 22 may be configured to perform operations including obtaining 400 an oil field modeling file. Future prediction module 22 may associate 402 one or more values with one or more variables included within the oil field modeling file. Future prediction module 22 may execute 404 the oil field modeling file to generate one or more result sets. Future prediction module 22 may compare 406 a portion of each of the one or more result sets with empirically-derived data related to the portion.

Accordingly and as discussed above, through the use of multi-threaded copying module 12 included within data analysis process 10, user 40 may define at least a portion within an oil field modeling file for copying from an original location, thus allowing user 40 to obtain 400 an oil field modeling file (e.g., XSField_01).

Further and as discussed above, through the use of pre-execution manipulation module 14 included within data analysis process 10, user 40 may be allowed to identify one or more variables included within the oil field modeling file (e.g., XSField_01), thus allowing user 40 to associate 402 one or more values with each of the variables included within the oil field modeling file (e.g., XSField_01).

Further and as discussed above, high-granularity, real-time module 16 included within data analysis process 10 may generate result sets based upon the oil field modeling file, thus allowing for the execution 404 of the oil field modeling file (e.g., XSField_01) to generate one or more result sets. As discussed above, the result sets generated may be iteratively rendered 406 while the result set(s) are being generated. When iteratively rendering 406 the result sets, the result sets may be rendered tabularly (i.e., as a table) and/or graphically (i.e., as a graph).

Future prediction module 22 may compare 406 a portion of each of the one or more result sets with empirically-derived data related to the portion. The empirically-derived data may take many forms, an example of which may include but is not limited to historical oil field production data. For example, some oil fields have been in production for several decades and data concerning certain conditions (e.g., individual well production, individual well pressure, and overall field production) may have been recorded since the oil field went into service.

As discussed above, user 40 may define a plurality of values for different variables within the oil field modeling file (e.g., XSField_01), resulting in a plurality of executions that each give slightly (or vastly) different result sets. Unfortunately, it is often difficult to discern which of these executions (and the related result sets) are the most accurate. Accordingly, future prediction module 22 may compare 408 a portion of each of the result sets generated with the above-referenced empirically-derived data so that future prediction module 22 can assign 410 an accuracy score to each of the result sets based, at least in part, upon comparison 408. Future prediction module 22 may choose 412 a best-fit result set based, at least in part, upon the comparison 408.

For example, future prediction module 22 may use a curve fitting algorithm (such as the Levenberg-Marquardt algorithm) to define a curve for the above-described empirically-derived data. Assume for illustrative purposes that the empirically-derived data concerns overall oil field production for the last forty years. Additionally, future prediction module 22 may use the same curve fitting algorithm (Levenberg-Marquardt algorithm) to define a curve for the overall oil field production result included in each of the result sets generated due to the execution 404 of oil field modeling file (e.g., XSField_01). Once these curves are generated, future prediction module 22 may compare 408 the curve based on the empirically-derived data to the curve of the corresponding data included in each of the result sets so that an accuracy score may be assigned 410 to each of the result sets. This accuracy score may be based on various data points, such as e.g., the sum of the squares of the Y-axis differences at each point along the X-axis. Through the use of this accuracy score, future prediction module 22 may choose 412 a best-fit result set based, at least in part, upon the comparison 408.

In the event that there is only one result set, the one result set may be deemed the best fit result set if the one result set exceeds e.g., a user defined minimum accuracy score. Conversely, in the event that there is only one result set, the one result set may not be deemed the best fit result set if the one result set does not meet e.g., the user defined minimum accuracy score.

Additionally/alternatively, the best-fit result set may include a plurality of result sets if each of the plurality of result sets all exceed e.g., the user defined minimum accuracy score. Conversely, the best-fit result set may be an empty set if each of a plurality of result sets generated fails to meet e.g., the user defined minimum accuracy score.

Future prediction module 22 may use the best-fit result set as a basis (at least in part) for predicting 414 future performance. For example, if the overall oil field production calculated within the best-fit result set accurately (or somewhat accurately) tracked the empirically-derived overall oil field production data for the past forty years, it is probable that the execution that generated the best-fit result set may be capable of being used to predict the manner in which the oil field will perform in the future. For example, the overall oil field production calculated by the execution that generated the best-fit result set may be able to be extended outward into the future to predict 414 the future overall oil field production. Further, as the execution that generated the best-fit result set appears to be the most sound (when compared to the other executions that generated the non-best-fit result sets), this "best-fit" execution may be capable of predicting the performance of other aspects (e.g., well productions/flows/pressures) of the oil field.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

A number of implementations have been described. Nevertheless, it will be understood that various modifications may be made. Accordingly, other implementations are within the scope of the following claims.

What is claimed is:

1. A computer-implemented method comprising:

defining at least a portion within an oil field modeling file for copying from an original location at a remote computing device, wherein the defined portion within the oil field modeling file is an identified portion within the oil field modeling file;

defining a destination location at a client computing device for the identified portion within the oil field modeling file;

effectuating a multi-threaded copying procedure to copy the identified portion within the oil field modeling file from the original location at the remote computing device to the destination location at the client computing device to generate a copied portion of the oil field modeling file at the client computing device;

defining a number of processing threads that will be utilized during the multi-threaded copying procedure, wherein the multi-threaded copying procedure utilizes at least two processing threads;

executing the oil field modeling file to generate at least one result set; and determining whether a failure condition of the at least one result set from the multi-threaded copying procedure occurs before execution of the at least one result set is complete, wherein the failure condition is determined by comparing the at least one result set with empirically-derived historical data, and determining whether a threshold difference between the at least one result set and the empirically-derived historical data occurs.

2. The computer-implemented method of claim 1 wherein the identified portion is a scenario of the oil field modeling file.

3. The computer-implemented method of claim 2 wherein the copied portion is a child of the scenario of the oil field modeling file.

4. The computer-implemented method of claim 1 wherein the identified portion is an execution of the oil field modeling file.

5. The computer-implemented method of claim 4 wherein the copied portion is a child of the execution of the oil field modeling file.

6. The computer-implemented method of claim 1 further comprising:

defining a file name for the copied portion.

7. A computer program product residing on a non-transitory computer readable medium having a plurality of instructions stored thereon that, when executed by a processor, cause the processor to perform operations comprising:

defining at least a portion within an oil field modeling file for copying from an original location at a remote computing device, wherein the defined portion within the oil field modeling file is an identified portion within the oil field modeling file;

defining a destination location at a client computing device for the identified portion within the oil field modeling file;

effectuating a multi-threaded copying procedure to copy the identified portion within the oil field modeling file from the original location at the remote computing device to the destination location at the client computing device to generate a copied portion of the oil field modeling file at the client computing device;

defining a number of processing threads that will be utilized during the multi-threaded copying procedure, wherein the multi-threaded copying procedure utilizes at least two processing threads;

executing the oil field modeling file to generate at least one result set; and determining whether a failure condition of the at least one result set from the multi-threaded copying procedure occurs before execution of the at least one result set is complete, wherein the failure condition is determined by comparing the at least one result set with empirically-derived historical data, and determining whether a threshold difference between the at least one result set and the empirically-derived historical data occurs.

8. The computer program product of claim 7 wherein the identified portion is a scenario of the oil field modeling file.

9. The computer program product of claim 8 wherein the copied portion is a child of the scenario of the oil field modeling file.

10. The computer program product of claim 7 wherein the identified portion is an execution of the oil field modeling file.

11. The computer program product of claim 10 wherein the copied portion is a child of the execution of the oil field modeling file.

12. The computer program product of claim 7 further comprising instructions for:

defining a file name for the copied portion.

13. A computing system comprising:

at least one processor;

at least one memory architecture coupled with the at least one processor;

a first software module executed on the at least one processor and the at least one memory architecture, wherein the first software module is configured to perform operations including defining at least a portion within an oil field modeling file for copying from an original location at a remote computing device, wherein the defined portion within the oil field modeling file is an identified portion within the oil field modeling file;

a second software module configured to perform operations including defining a destination location at a client computing device for the identified portion within the oil field modeling file;

a third software module configured to perform operations including effectuating a multi-threaded copying procedure to copy the identified portion within the oil field modeling file from the original location at the remote computing device to the destination location at the client computing device to generate a copied portion of the oil field modeling file at the client computing device;

a fourth software module configured to perform operations including defining a number of processing threads that will be utilized during the multi-threaded copying procedure, wherein the multi-threaded copying procedure utilizes at least two processing threads;

a fifth software module configured to execute the oil field modeling file to generate at least one result set; and a sixth software module configured to determine whether a failure condition of the at least one result set from the multi-threaded copying procedure occurs before execution of the at least one result set is complete, wherein the failure condition is determined by comparing the at least one result set with empirically-derived historical data, and determining whether a threshold difference between the at least one result set and the empirically-derived historical data occurs.

14. The computing system of claim 13 wherein the identified portion is a scenario of the oil field modeling file.

15. The computing system of claim 14 wherein the copied portion is a child of the scenario of the oil field modeling file.

16. The computing system of claim 13 wherein the identified portion is an execution of the oil field modeling file.

17. The computing system of claim 16 wherein the copied portion is a child of the execution of the oil field modeling file.

18. The computing system of claim 13 further comprising:

a seventh software module configured to perform operations including defining a file name for the copied portion.

* * * * *